(12) United States Patent
Nakatani et al.

(10) Patent No.: US 12,726,467 B2
(45) Date of Patent: Sep. 1, 2026

(54) SYSTEM, METHOD, AND INFORMATION PROCESSING APPARATUS

(71) Applicant: TOYOTA JIDOSHA KABUSHIKI KAISHA, Toyota (JP)

(72) Inventors: Sho Nakatani, Chiyoda-ku (JP); Kenichi Murata, Koto-ku (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 217 days.

(21) Appl. No.: 18/594,118

(22) Filed: Mar. 4, 2024

(65) Prior Publication Data

US 2024/0305621 A1 Sep. 12, 2024

(30) Foreign Application Priority Data

Mar. 8, 2023 (JP) ................................ 2023-035910

(51) Int. Cl.
*H04L 9/40* (2022.01)
*H04L 9/00* (2022.01)

(52) U.S. Cl.
CPC ............ *H04L 63/0807* (2013.01); *H04L 9/50* (2022.05); *H04L 63/102* (2013.01)

(58) Field of Classification Search
CPC ....... H04L 9/3213; H04L 9/3239; H04L 9/40; H04L 9/50; H04L 63/0807; H04L 63/0815; H04L 63/0884; H04L 63/102
See application file for complete search history.

(56) References Cited

U.S. PATENT DOCUMENTS

| | | | | |
|---|---|---|---|---|
| 12,475,259 | B2 * | 11/2025 | Zhang | G06F 21/6263 |
| 2018/0144153 | A1 * | 5/2018 | Pead | H04L 63/102 |
| 2019/0114412 | A1 * | 4/2019 | Zhang | G06F 21/121 |
| 2020/0067907 | A1 * | 2/2020 | Avetisov | H04L 67/133 |
| 2024/0013203 | A1 * | 1/2024 | Holmes | G06Q 30/0601 |

FOREIGN PATENT DOCUMENTS

| | | |
|---|---|---|
| JP | 2019-185658 A | 10/2019 |

* cited by examiner

*Primary Examiner* — Gil H. Lee
(74) *Attorney, Agent, or Firm* — Oblon, McClelland, Maier & Neustadt, L.L.P.

(57) ABSTRACT

A system includes a plurality of service providing servers, a plurality of data holding servers, and a platform server. The platform server acquires, for a first user, a graph having an account as a node, a first linkage between accounts at different service providing servers as a first edge, and a second linkage between an account at the service providing server and an account at the data holding server as a second edge. The platform server notify, when it is possible to reach a second account of a first user at a first data holding server from a first account of the first user at a first service providing server by tracing one or more first edges and one second edge, the first service providing server of information enabling the first service providing server to acquire data corresponding to the second account from the first data holding server.

20 Claims, 32 Drawing Sheets

FIG. 2

DATA REQUEST INFORMATION

REQUEST SOURCE: SERVICE PROVIDER #n2
REQUEST DESTINATION: DATA HOLDER #1
TRANSIT SERVICE PROVIDER: SERVICE PROVIDER #1
TRANSIT SERVICE ACCOUNT ID : SP1_A

2
SERVICE PROVIDER
CONTROL UNIT
21
LINKAGE INFORMATION DB
22

FIG. 7

AUTHORIZATION INFORMATION
IN AUTHORIZATION AUTHENTICATION SERVER

| ACCOUNT ID | ACCESS TOKEN | SCOPE |
|---|---|---|
| SP1_A | abcdEFG | COMPREHENSIVE CONSENT<br>SERVICE PROVIDER #n1 : SPn1_A<br>SERVICE PROVIDER #n1 : SPn1_AX<br>DATA HOLDER #1 |

*FIG. 11*

ACCESS TOKEN INFORMATION

| SERVICE PROVIDER ID | ACCOUNT ID | ACCESS TOKEN |
|---|---|---|
| SERVICE PROVIDER #1 | SP1_A | abcdEFG |
| SERVICE PROVIDER #2 | SP2_A | stuvWXY |

⋮

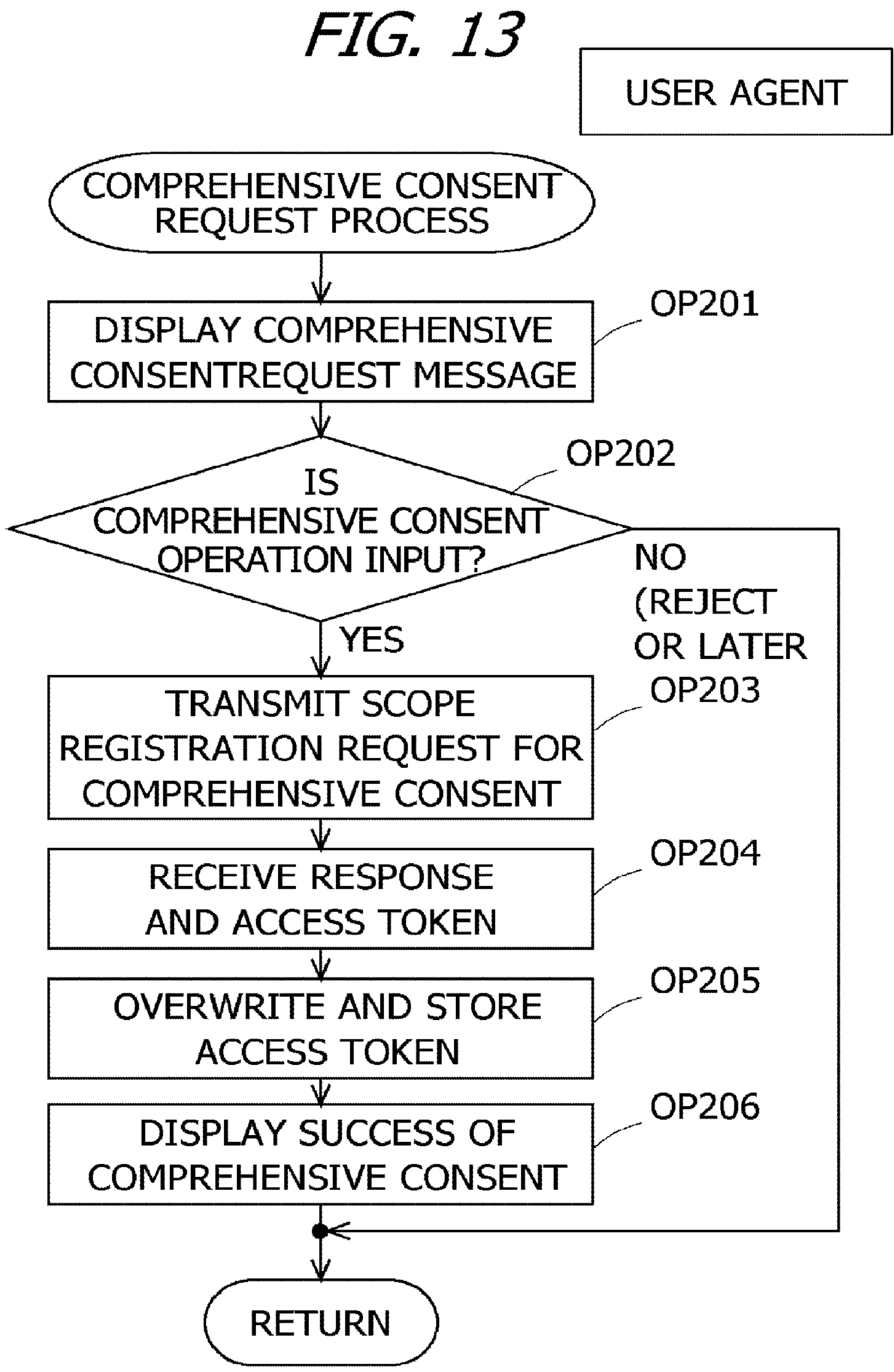
FIG. 13
USER AGENT
COMPREHENSIVE CONSENT REQUEST PROCESS
DISPLAY COMPREHENSIVE CONSENTREQUEST MESSAGE
OP201
IS COMPREHENSIVE CONSENT OPERATION INPUT?
OP202
YES
NO (REJECT OR LATER
TRANSMIT SCOPE REGISTRATION REQUEST FOR COMPREHENSIVE CONSENT
OP203
RECEIVE RESPONSE AND ACCESS TOKEN
OP204
OVERWRITE AND STORE ACCESS TOKEN
OP205
DISPLAY SUCCESS OF COMPREHENSIVE CONSENT
OP206
RETURN

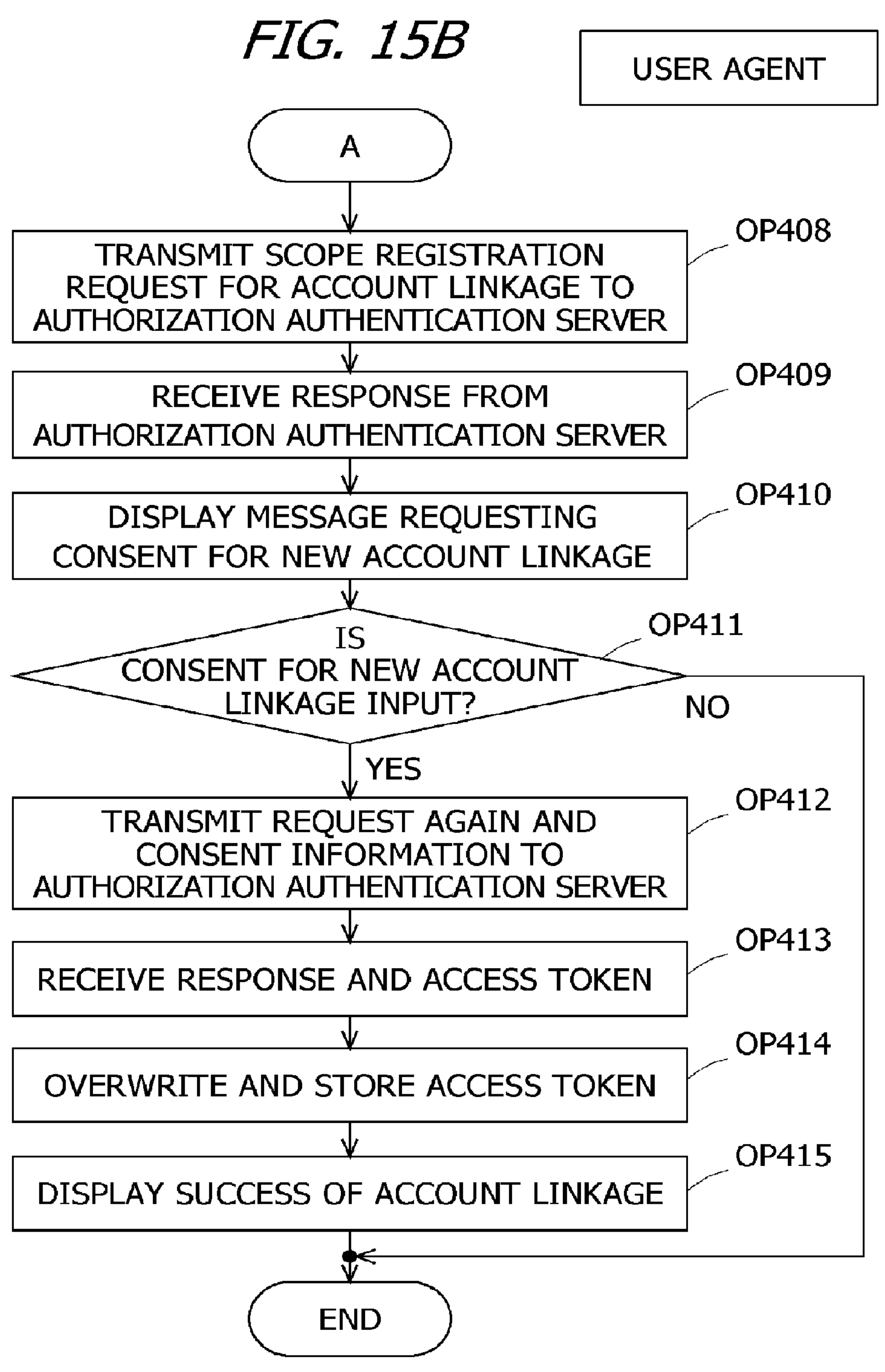
FIG. 15B
USER AGENT
A
TRANSMIT SCOPE REGISTRATION REQUEST FOR ACCOUNT LINKAGE TO AUTHORIZATION AUTHENTICATION SERVER
OP408
RECEIVE RESPONSE FROM AUTHORIZATION AUTHENTICATION SERVER
OP409
DISPLAY MESSAGE REQUESTING CONSENT FOR NEW ACCOUNT LINKAGE
OP410
IS CONSENT FOR NEW ACCOUNT LINKAGE INPUT?
OP411
NO
YES
TRANSMIT REQUEST AGAIN AND CONSENT INFORMATION TO AUTHORIZATION AUTHENTICATION SERVER
OP412
RECEIVE RESPONSE AND ACCESS TOKEN
OP413
OVERWRITE AND STORE ACCESS TOKEN
OP414
DISPLAY SUCCESS OF ACCOUNT LINKAGE
OP415
END DATA HOLDER
LOGIN CONTROL PROCESS
OP601
IS LOGIN REQUEST RECEIVED?
NO
YES
OP602
IS LOGIN SUCCESSFUL?
NO
YES
OP603
IS LOGIN FOR ACCOUNT LINKAGE?
NO
YES
OP604
ADDS TO ACCOUNT LINKAGE INFORMATION
OP605
TRANSMIT RESPONSE
END PLATFORM
SERVICE ACCOUNT GRAPH CREATION PROCESS
TRANSMIT REQUEST FOR ACQUIRING LINKAGE INFORMATION TO EACH SERVICE PROVIDER
OP701
IS LINKAGE INFORMATION RECEIVED?
OP702
NO
YES
UPDATE CONFIGURATION INFORMATION OF SERVICE ACCOUNT GRAPH
OP703
END SERVICE PROVIDER
LINKAGE INFORMATION PROVIDING PROCESS
IS REQUEST FOR ACQUIRING LINKAGE INFORMATION RECEIVED?
OP801
NO
YES
TRANSMIT LINKAGE INFORMATION TO PLATFORM
OP802
END DATA HOLDER
DATA PROVISION PROCESS
IS DATA ACQUISITION REQUEST AND INFORMATION RECEIVED?
OP1101
NO
YES
OP1102
IDENTIFY ACCOUNT OF WHCIH DATA IS READ
OP1103
READ DATA ASSOCIATED WITH IDENTIFIED ACCOUNT
OP1104
TRANSMIT DATA TO SERVICE PROVIDER WHICH IS REQUEST SOURCE
END 5
2-1
3-1
UA
SP
App
SP
Auth
REQUEST
S11
RESPONSE
S12
DISPLAY
LOIN PAGE
S13
REQUEST
S14
LOGIN
SUCSESS
S15
RESPONSE, COMPREHENSIVE CONSENT REQUEST
S16
DISPLAY
COMPREHENSIVE
CONSENT REQUEST
S21
INPUT CONSENT
S22
SCOPE REGISTRATION REQUEST
S23
SCOPE :
COMPREHENSIVE
CONSENT
S24
RESPONSE, ACCESS TOKEN
S25
STORE
ACCESS TOKEN
S26
DISPLAY
COMPREHENSIVE
CONSENT
SUCCESSFUL
S27

SYSTEM, METHOD, AND INFORMATION PROCESSING APPARATUS

CROSS REFERENCE TO RELATED APPLICATION

This application claims the benefit of Japanese Patent Application No. 2023-035910, filed on Mar. 8, 2023, which is hereby incorporated by reference herein in its entirety.

BACKGROUND

Technical Field

The present disclosure relates to account linkage between a plurality of services.

Description of the Related Art

It is disclosed that, when each of different service providers provides ID for one user, a plurality of IDs of the user are registered in association with one service (for example, Patent Document 1).

CITATION LIST

Patent Document

[Patent Document 1] Japanese Patent Laid-Open No. 2019-185658

One aspect of the disclosure is to provide a system, a method, and an information processing apparatus capable of reducing operations for linking accounts of an end user between a plurality of services used by the end user.

SUMMARY

One aspect of the present disclosure is a system including:

a plurality of service providing servers that provide services;

a plurality of data holding servers that hold data; and a processor configured to:

acquire a graph created for a first user, the graph having an account as a node, a first linkage set between accounts at different service providing servers as a first edge, and a second linkage set between an account at a service providing server and an account at a data holding server as a second edge; and notify, when it is possible to reach a second account of a first user at a first data holding server from a first account of the first user at a first service providing server by tracing one or more first edges and one second edge in the graph, the first service providing server of first information enabling the first service providing server to acquire data corresponding to the second account from the first data holding server.

Another aspect of the present disclosure is a method executed by a computer, including:

acquiring a graph created for a first user, the graph having, as a node, an account at each of a plurality of service providing servers that provide services and a plurality of data holding servers that hold data, a first linkage set between accounts at different service providing servers as a first edge, and a second linkage set between an account at a service providing server and an account at a data holding server as a second edge; and notifying, when it is possible to reach a second account of a first user at a first data holding server from a first account of the first user at a first service providing server by tracing one or more first edges and one second edge in the graph, the first service providing server of first information enabling the first service providing server to acquire data corresponding to the second account from the first data holding server.

Another aspect of the present disclosure is an information processing apparatus including:

a processor configured to:

acquire a graph created for a first user, the graph having, as a node, an account at each of a plurality of service providing servers that provide services and a plurality of data holding servers that hold data, a first linkage set between accounts at different service providing servers as a first edge, and a second linkage set between an account at a service providing server and an account at a data holding server as a second edge; and notify, when it is possible to reach a second account of a first user at a first data holding server from a first account of the first user at a first service providing server by tracing one or more first edges and one second edge in the graph, the first service providing server of first information enabling the first service providing server to acquire data corresponding to the second account from the first data holding server.

According to one aspect of the present disclosure, it is possible to reduce the operations for linking accounts of an end user between a plurality of services used by the end user.

BRIEF DESCRIPTION OF DRAWINGS

FIG. 2 is a diagram illustrating an example of a process executed in the account linkage system;

FIG. 7 is a diagram illustrating an example of authorization information held in an authorization information database;

FIG. 11 is an example of access token information held in an access token storage unit;

FIG. 13 is an example of a flowchart of a comprehensive consent request process by the user terminal;

FIGS. 15A and 15B are examples of flowcharts of an account linkage process by the user terminal;

FIG. 28 is a diagram illustrating an example of a system configuration of the account linkage system according to the second embodiment;

FIG. 31 is an example of a flowchart of a data request information notification process by an information notification unit of the service provider according to the second embodiment.

DESCRIPTION OF THE EMBODIMENTS

Figure 1:
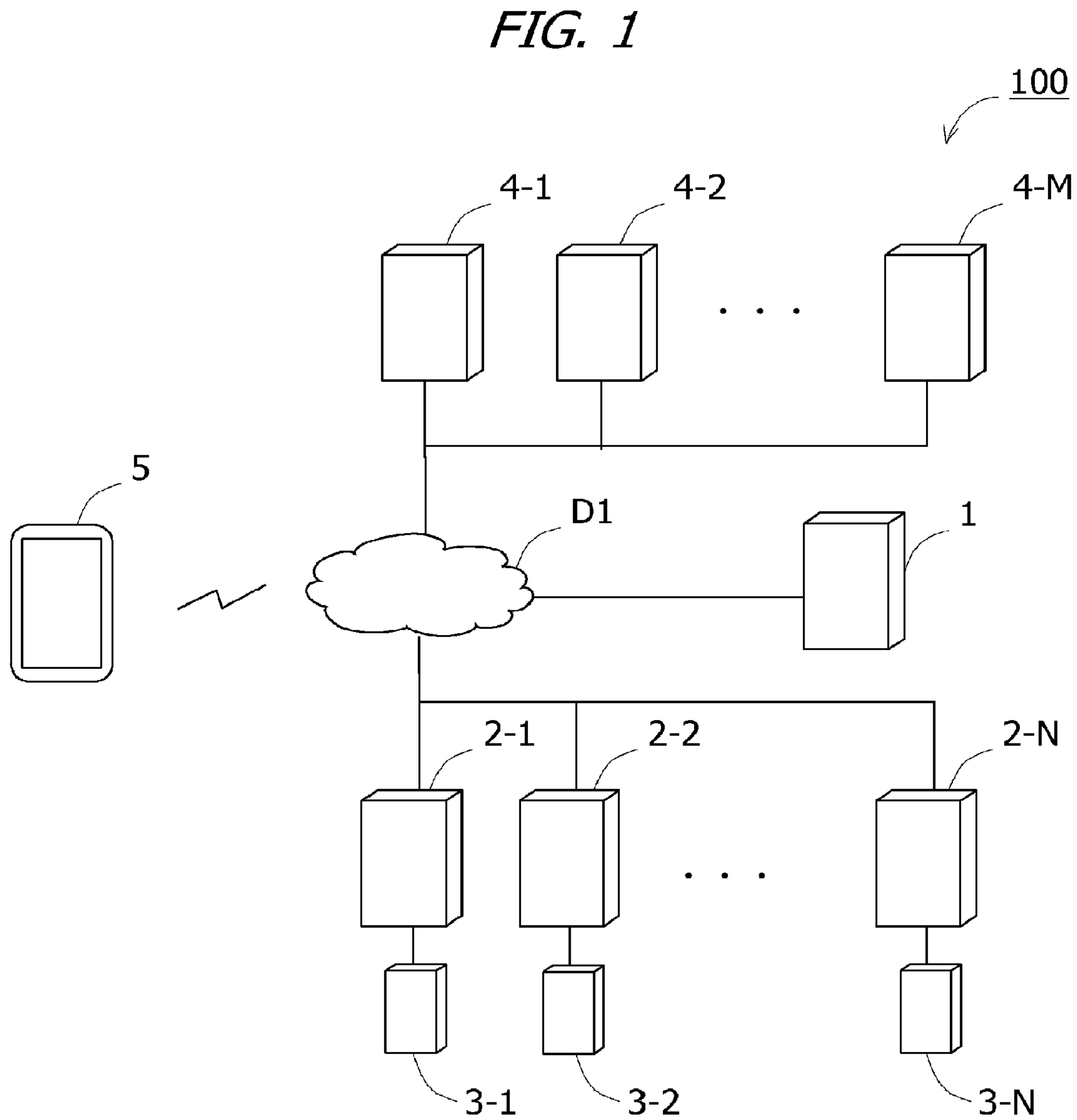
FIG. 1 is a diagram illustrating an example of a system configuration of an account linkage system according to the first embodiment.

By linking a plurality of services, data held by each service can be combined, thereby creating new value. For example, when a plurality of service providers intend to use the data for one end user held by each of the plurality of data holders, the end user is requested to perform operations to link accounts between each of the data holders and each of the service providers. For example, when linking accounts between m data holders and n service providers, assuming that each of the data holders and each of the service providers has one account respectively, the end user performs the operation m×n times.

According to one aspect of the present disclosure, for example, for the user X, even if the account linkage is not set between the service provider A and the data holder B, when the account linkage is set between the service provider A and the service provider C and between the service provider C and the data holder B, it is determined that the service provider A can acquire data of the user X from the data holder B. Thereby, when each of a plurality of the service providers provide a predetermined service by using data held by each of the plurality of data holders for one user, it is possible to reduce the number of operations of account linkage by the user among the plurality of the service providers and the plurality of the data holders.

Specifically, one aspect of the present disclosure is a system including a plurality of service providing servers that provide services, a plurality of data holding servers that hold data, and a processor. The processor may acquire a graph created for a first user. In the graph, for the first user, the account is a node, the first linkage between the accounts of the different service providing servers is a first edge, and the second linkage between an account at a service providing server and an account at a data holding server is a second edge. The processor may notify, when it is possible to reach a second account of the first user at first data holding server from a first account of the first user at a first service providing server by tracing one or more first edges and one second edge in the graph for the first user, the first service providing server of first information enabling the first service providing server to acquire data corresponding to the second account from the first data holding server. The processor is, for example, a processor such as a central processing unit (CPU) and a digital signal processor (DSP) or an integrated circuit such as a field-programmable gate array (FPGA) provided in a predetermined device.

According to one aspect of the present disclosure, when it is possible to reach the second account of the first user at the first data holding server from the first account of the first user at the first service providing server in the graph, the first information that enables the first service providing server to acquire data corresponding to the second account of the first user from the first data holding server is notified. That is, even if a second linkage between the first account at the first service providing server and the second account at the first data holding server is not set, if the first linkage is set directly or indirectly between the first account at the first service providing server and an account at another service providing server for which the second linkage is set with the second account at the first data holding server, the first service providing server may acquire the data of the first user held by the first data holding server by using the first information. As a result, when there are m data holding servers and n service providing servers, by the first user performing the linkage operations between the account in the data holding server and the account in the service providing server at least m times and the account linkage operations between the service providing servers at n−1 times, any service providing server can acquire the data of the first user from any data holding server. As a result, it is possible to reduce the number of times that the first user performs account linkage operations between the service providing servers and between the service providing server and the data holding server. Further, it is possible to reduce the amount of communication data related to setting of account linkage between the service providing servers and between the service providing server and the data holding server by the first user.

In one aspect of the present disclosure, the processor may notify the first service providing server of a third account of the first user at a second service providing server as the first information. The third account of the first user at the second service providing server is able to be reached, in the graph for the first user, from the first account of the first user at the first service providing server by tracing one or more first edges and is connected to the second account of the first user at the first data holding server by the second edge. In this case, the first service providing server may notify the first data holding server of the third account of the first user at the second service providing server to acquire data corresponding to the second account of the first user from the first data holding server.

In one aspect of the present disclosure, the first service providing server is notified of the third account of the first user at the second service providing server for which a second linkage is set with the second account of the first user at the first data holding server. Thereby, the first service providing server can acquire the data of the first user from the first data holding server in which the second linkage is not directly set. Therefore, according to one aspect of the present disclosure, it is possible to achieve, by transmitting and receiving less data in the entire system, that the first service providing server acquires the data of the first user from the first data holding server in which the second linkage is not directly set with the first service providing server.

In one aspect of the present disclosure, each of the plurality of service providing servers may hold, for an account of the first user, first linkage information regarding the first linkage with an account at another service providing server, and second linkage information regarding the second linkage with an account at a data holding server. The processor may acquire the first linkage information and the second linkage information from the plurality of service providing servers to create a graph for the first user. The first linkage information may include, for example, two pieces of identification information of two service providing servers between which the first linkage is set and two pieces of account information of a user at the two service providing servers. The second linkage information may include, for example, identification information of a service providing server in which a second linkage is set, account information of a user at the service providing server, and identification information of a data holding server in which the second linkage for the user with the service providing server is set. Since both the first linkage information and the second linkage information are text data and data size of them is small, the amount of communication for creating the graph in the system can be reduced.

In one aspect of the present disclosure, the processor may notify the first service providing server of the first information when it is determined that second information indicating that comprehensive consent is obtained from the first user is held in the second service providing server. On the other hand, when it is determined that the second information is not held in the second service providing server, the processor may have not to notify the first service providing server of the first information. The comprehensive consent may indicate, for example, that the first user allows another service providing server to acquire data corresponding to an account of the first user at the data holding server by using the third account of the first user at the second service providing server, the account of the first user at the data holding server in which the second linkage with the third account is set. An operation for setting the second linkage performed by a user can also be said to be an operation in which the user agrees to an account linkage between a data holding server and a service providing server. That is, it can be considered that, by obtaining the comprehensive consent in advance, consent is obtained for the acquisition of data of the user between the data holding server and the service providing server that the user does not directly consent to the second linkage. As a result, it is possible to reduce the number of executions of the operations by the user for setting account linkage between a service providing server and a data holding server.

Determining whether or not the second information is held in the second service providing server, that is, determining whether or not the comprehensive consent is obtained from the first user, may be performed by using, for example, an access token. As a mechanism for using an access token, for example, an authorization protocol such as OpenID Connect Core 1.0 and OAuth 2.0 may be used. For example, the system according to one aspect of the present disclosure may further include an authorization server for performing authorization, the authorization server corresponding to the second service providing server. The authorization server may issue an access token associated with the second information to a terminal of the first user. In this case, the terminal of the first user may access the first service providing server together with the access token. When the processor receives the access token from the first service provider together with a request for notification of the first information necessary for acquiring the data of the first user from the first data holding server, the processor may transmit a request for verification of the access token to the authorization server corresponding to the second service providing server. The processor may determine whether or not the second information is held in the second service providing server based on a response from the authorization server to the request for verification. By adopting a mechanism that uses an access token for determining whether or not the comprehensive consent has been obtained from the first user, it is possible to facilitate management of the authority of the comprehensive consent.

In one aspect of the present disclosure, the processor may be provided in an information processing apparatus that is independent of a plurality of service providing servers and a plurality of data holding servers. In this case, the system according to one aspect of the present disclosure is a centralized management system that manages graphs in the information processing apparatus. The information processing apparatus may be, for example, a server that provides a platform.

In one aspect of the present disclosure, the processor may be provided in each of a plurality of service providing servers, or may be provided in each of a plurality of information processing apparatuses including a plurality of service providing servers and a plurality of data holding servers. When the processor is provided in a plurality of devices, the system according to one aspect of the present disclosure is a distributed management system in which graphs are managed by the plurality of devices. In this case, the plurality of devices including the processor may each manage a graph using, for example, a technique such as a blockchain. However, the technique used when the plurality of devices including the processor manage the graph is not limited to the blockchain.

Another aspect of the present disclosure can also be specified as a method in which a device included in the above system executes processing in the above system. Another aspect of the present disclosure can also be specified as an information processing apparatus including a processor in the above system. Another aspect of the present disclosure can also be specified as a program for causing a computer to execute the processing of the information processing apparatus. Another aspect of the present disclosure, the program can also be specified as a computer-readable and non-transitory recording medium.

In the following, embodiments of the present disclosure will be described with reference to the drawings. The configuration of the embodiments described below are examples, and the present disclosure is not limited to the configuration of the embodiments.

First Embodiment

FIG. 1 is a diagram illustrating an example of a system configuration of an account linkage system 100 according to the first embodiment. The account linkage system 100 is a system that makes data regarding a user held by one service available to different services by linking accounts of the user between a plurality of services. Hereinafter, linking accounts between different services is referred to as account linkage. The account linkage system 100 includes a platform 1, a plurality of service providers 2, a plurality of authorization authentication servers 3 attached to each service provider 2, a plurality of data holders 4, and a user terminal 5. When the service provider 2, the authorization authentication server 3, and the data holder 4 are indicated individually, a hyphen and a sign are added after the sign. When it is not distinguished, it is simply referred to as the service provider 2, the authorization authentication server 3, and the data holder 4. Although a plurality of user terminals 5 may be included in the account linkage system 100, in FIG. 1, only one is illustrated as a representative for convenience of description.

The platform 1, the service providers 2, the authorization authentication servers 3, the data holders 4, and the user terminal 5 are each connected to the network D1 and can communicate with each other through the network D1. The network D1 is, for example, a public network such as the Internet.

The service provider 2 is a server that provides a predetermined web service to the user. The authorization authentication server 3 is a server that executes processing related to authentication and authorization with respect to a web service provided by the service provider 2. The data holder 4 is a server that holds information about a predetermined genre for the user. The data holder 4 also provides a service of holding the data. Therefore, from the viewpoint that the service provider 2 and the data holder 4 each provide their own services, the service provider 2 and the data holder 4 are collectively referred to simply as a service. The service provider 2 is an example of a "service providing server". The data holder 4 is an example of a "data holding server". The platform 1 is an example of an "information processing apparatus" in the first embodiment.

The user terminal 5 is a terminal owned by a user who is registered as a user in each service provider 2 and each data holder 4. The user terminal 5 is, for example, a smartphone, a tablet terminal, a personal computer (PC), or the like.

The user performs operations for setting account linkage between the service providers 2 and account linkage between the service providers 2 and the data holders 4 through the user terminal 5. Account linkage between the service providers 2 is sometimes referred to as service linkage hereinafter. Account linkage between the service provider 2 and the data holder 4 is sometimes referred to as data linkage hereinafter. If service linkage and data linkage are not distinguished, it is simply referred to as account linkage. Since the account linkage is not set without the consent of the user, it can be said that the operation for setting the account linkage is an operation in which the user agrees to linkage of accounts between different services. The service linkage is an example of the "first linkage". The data linkage is an example of the "second linkage".

The platform 1 is a server that provides a platform that manages states of a plurality of account linkage in the account linkage system 100 for each account, and enables data acquisition between the service provider 2 and the data holder 4 based on the state of account linkage. The state of account linkage is, for example, whether or not account linkage is set between two different services. Hereinafter, the fact that account linkage is set may be simply referred to as "account linkage existing", "account linked", "linkage existing", or "linked". The fact that account linkage is not set may be referred to as "no account linkage" or "no linkage".

In the account linkage system 100 according to the first embodiment, processing related to authentication, authorization, and obtaining consent for account linkage is performed according to a protocol that enables limited access to HTTP services by a third party, such as, for example, OpenID Connect 1.0 and OAuth 2.0. Therefore, the service provider 2 and the data holder 4 are, in the first embodiment, HTTP servers. However, the service provider 2 and the data holder 4 are not limited thereto. In the first embodiment, the authorization authentication server 3 may operate as an Open ID provider of OpenID Connect 1.0 and/or an authorization server of OAuth 2.0. However, in the first embodiment, the data holder 4 does not implement a function such as an Open ID provider of OpenID Connect 1.0 or an authorization server of OAuth 2.0, and is assumed to perform authentication using account information and password as user authentication. The user terminal 5 operates as a user agent in OpenID Connect 1.0 or OAuth 2.0 through an application program such as a browser, for example. Therefore, the user terminal 5 is sometimes referred to as the user agent 5.

Based on the above premise, an account linked in the account linkage system 100 according to the first embodiment is an account ID used in OpenID Connect 1.0 or OAuth 2.0 in each service. The account ID is an identification number for identifying a user. Note, a user can also have a plurality of accounts in one service. In the account linkage system 100, a protocol adopted for processing related to authentication, authorization, and consent acquisition is not limited to OpenID Connect 1.0 or OAuth 2.0. Hereinafter, when referred to as an account ID, the account information used in OpenID Connect 1.0 or OAuth 2.0 may be indicated. The account ID is an example of "account information".

Figure 2:
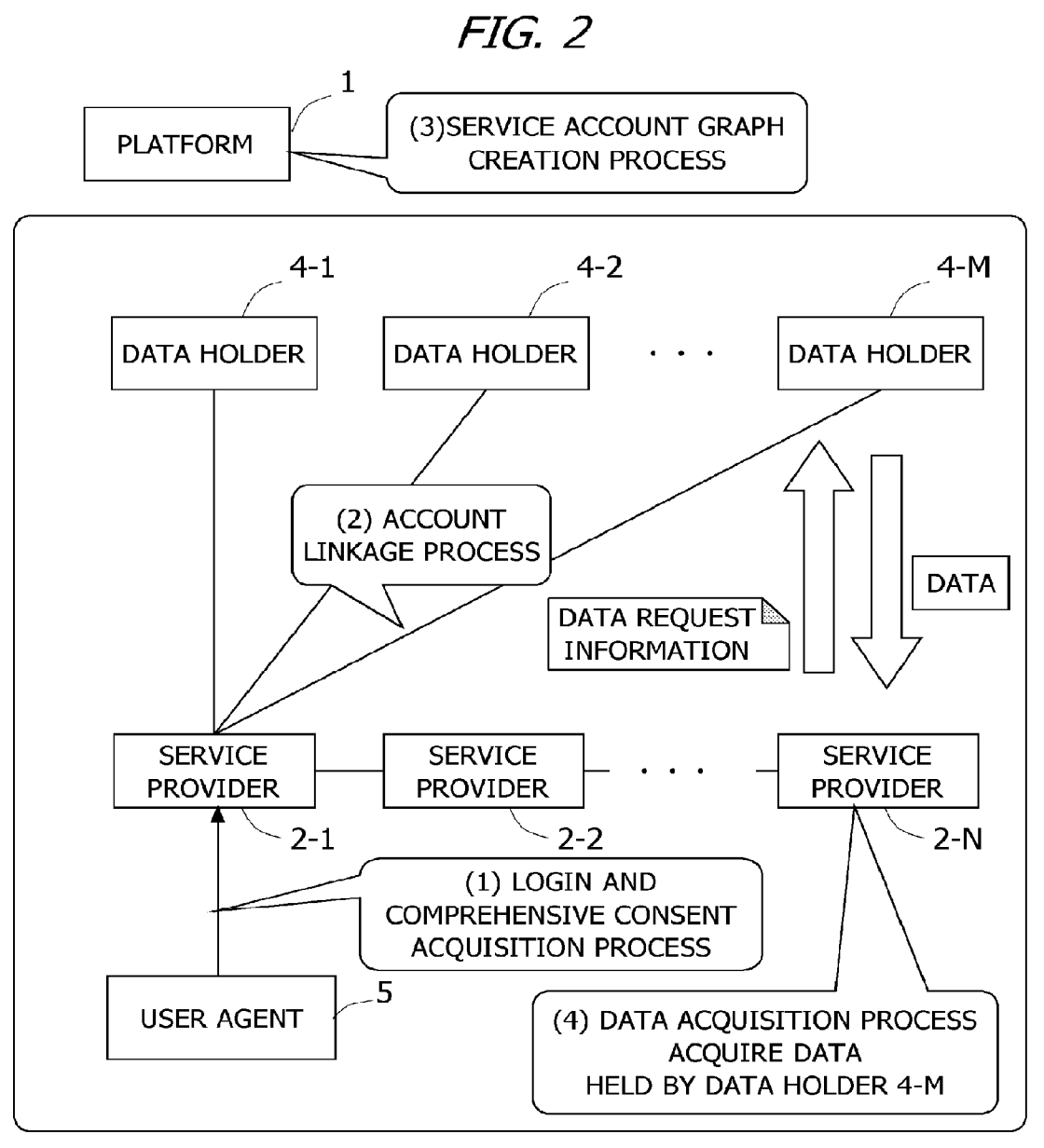

FIG. 2 is a diagram illustrating an example of a process executed in the account linkage system 100. In FIG. 2, each of a line connecting between the service providers 2 and a line connecting the service provider 2 and the data holder 4 is a line indicating that the account linkage is set. The processes executed in the account linkage system 100 are roughly divided into (1) login and comprehensive consent acquisition process, (2) account linkage process, (3) service account graph creation process, and (4) data acquisition process.

In the (1) login and comprehensive consent acquisition process, login to one service provider 2 and processing for obtaining comprehensive consent for the service provider 2 from a user are performed. In FIG. 2, it is assumed that the user agent 5 is to log in to the service provider 2-1 among the plurality of the service providers 2. Hereinafter, the service provider 2-1 to which the user has logged in is the center of account linkage for explanation. In the first embodiment, when the login to the service provider 2-1 is successful, the user agent 5 displays, for example, a screen requesting comprehensive consent, and when an operation to allow comprehensive consent from the user is input, the comprehensive consent is obtained from the user. The operation of granting the comprehensive consent of the user is, for example, the selection of the "YES" button displayed on the screen requesting the comprehensive consent.

Taking the system illustrated in FIG. 2 as an example, the comprehensive consent is an agreement that a service provider 2 other than the service provider 2-1 acquires the user's data from all data holders 4 that have already been linked to the service provider 2-1 using the user's account at the service provider 2-1. The processing of obtaining the comprehensive consent from the user and holding the information indicating that the comprehensive consent has been obtained from the user are performed by the authorization authentication server 3-1 attached to the service provider 2-1.

The (2) account linkage process is a process for setting account linkage between services. The account linkage process includes performing login for linkage to the service of the linkage destination via the service of the linkage source and obtaining consent from the user for account linkage with the service of the linkage source and the service of the linkage destination.

For example, in FIG. 2, when setting the account linkage between the service provider 2-1 and the data holder 4-1, the user agent 5 performs login to the data holder 4-1 for account linkage in state of logging in to the service provider 2-1. When the login is successful, the user agent 5 displays, for example, a screen requesting consent for account linkage between the service provider 2-1 and the data holder 4-1. When an operation to agree from the user is input, consent for account linkage between the service provider 2-1 and the data holder 4-1 is acquired. When the consent for the account linkage is obtained from the user, the account linkage between the service provider 2-1 and the data holder 4-1 is set. Data linkage information indicating that the account linkage is set between the service provider 2-1 and the data holder 4-1 is held by the service provider 2-1 and the authorization authentication server 3-1. The data linkage information includes the identification information of the service provider 2-1, the account information of the user at the service provider 2-1, and the identification information of the data holder 4-1, wherein the data linkage is set between an account of the user at the service provider 2-1 and an account of the user at the data holder 4-1.

For example, the similar process is executed for account linkage between the service provider 2-1 and the service provider 2-2. The service linkage information indicating that the account linkage is set between the service provider 2-1 and the service provider 2-2 is held in the service provider 2-1 and the authorization authentication server 3-1. The service linkage information includes the identification information of the service provider 2-1, the account information of the user at the service provider 2-1, the identification information of the service provider 2-2, and the account information of the user at the service provider 2-2, wherein the service linkage is set between the account of the user at the service provider 2-1 and an account of the user at the service provider 2-2. The account linkage process is performed for each combination of two services that are caused to link accounts. The service linkage information is an example of "first linkage information". The data linkage information is an example of "second linkage information".

The (3) service account graph creation process is a process related to the creation of service account graph. The service account graph is a graph illustrating the states of account linkage among services for one user. Details of the service account graph will be described later. The platform 1 collects information regarding account linkage being set from each service provider 2 and creates a service account graph based on the information. There are service linkage information and data linkage information as the information related to account linkage. Hereinafter, the service account graph may be simply referred to as a graph.

The (4) data acquisition process is a process related to acquisition of data of a predetermined user from the data holder 4 by the service provider 2. In the first embodiment, when trying to acquire data from the data holder 4, the service provider 2 receives a notification of data request information from the platform 1. The data request information includes information necessary for the service provider 2 to acquire data of a target user from the data holder 4 which is the request destination of the data. The data request information is an example of "first information".

The platform 1 generates data request information when it is possible to reach an account of the target user at the data holder 4 which is the request destination of data acquisition from an account of the target user at the service provider 2 which is the request source of data acquisition by tracing account linkage in the service account graph for the target user. The data request information includes the account of the target user at the service provider 2 for which data linkage is set with the account of the target user at the data holder 4. The data holder 4 receives the data request information together with the data acquisition request from the service provider 2, identifies the account of the target user at the data holder 4 based on the received data request information, and provides the data of the target user to the service provider 2.

For example, as illustrated in FIG. 2, it is assumed that the user A has already linked accounts between each service provider 2 and between each service provider 2 and each data holder 4. In FIG. 2, a case where the service provider 2-N acquires the data of the user A held by the data holder 4-M will be described as an example. There is no account linkage for the account of user A between the service provider 2-N and the data holder 4-M. Account linkage is set for the account of user A between the service provider 2-1 and the data holder 4-M. No account linkage is set for the account of the user A between the service provider 2-1 and the service provider 2-N. However, the account of the user A at the service provider 2-N can be reached from the account of the user A at the service provider 2-1 via other service providers 2 in which account linkage are set for the accounts of the user A with each of the service provider 2-1 and the service provider 2-N. That is, it is possible to reach the data holder 4-M from the account #N of the user A at the service provider 2-N via the account #1 of the user A at the service provider 2-1. Therefore, the platform 1 generates, to the service provider 2-N, data request information that is necessary for obtaining the data of the user A from the data holder 4-M. The data request information includes the account #1 of the user A in the service provider 2-1 to be passed through.

The data holder 4-M receives the data request information together with a request for data acquisition from the service provider 2-N. The data holder 4-M identifies the account #M of the user A at the data holder 4 itself associated with the account #1 of the user A at the service provider 2-1 included in the data request information, and transmits the data associated with the account #M of the user A to the service provider 2-N.

Although account linkage is not set between the service provider 2-N and the data holder 4-M for the accounts of the user A, the user A is not requested to set and agree to the account linkage. This is because the comprehensive consent for the service provider 2-1 has obtained from the user A. According to the first embodiment, data acquisition for a predetermined user can be achieved between the service provider 2 and the data holder 4 in which account linkage for the predetermined user is not set, if it is possible to reach the data holder 4 from the account of the predetermined user at the service provider 2 in the service account graph, as like that the service provider 2-N acquires the data of the user A held by the data holder 4-M. As a result, the user does not have to perform the operations for setting account linkage such as the above (2) account linkage process about between all the service providers 2 and all the data holder 4, and it is possible to reduce the number of the operation for setting account linkage between the service providers 2 and between the data holder 4 and the service provider 2. For example, when N service providers 2 and M data holders 4 are included in the system, in the first embodiment, a user can minimize the operations for setting account linkage to N+M−1. On the other hand, when performing the operations for setting account linkage between all the service providers 2 and all the data holder 4, the user performs the operations for setting account linkage N×M times.

<Configuration of Devices>

Figure 3:
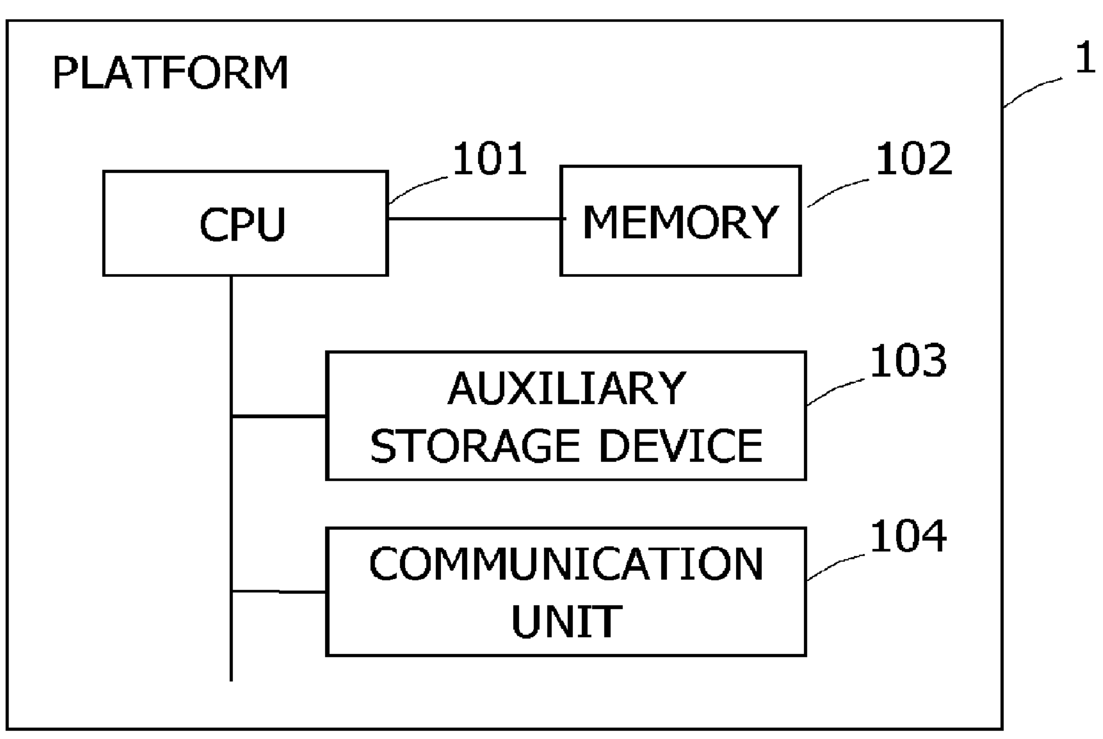
FIG. 3 is an example of a hardware configuration of a platform.

FIG. 3 is an example of a hardware configuration of the platform 1. The platform 1 includes a CPU 101, a memory 102, an auxiliary storage device 103, and a communication unit 104 as hardware configurations. The memory 102 and the auxiliary storage device 103 are examples of computer-readable recording media, respectively.

The auxiliary storage device 103 stores various programs and data used by the CPU 101 when executing each program. The auxiliary storage device 103 is, for example, a hard disk drive (HDD) and a solid state drive (SSD). The programs held in the auxiliary storage device 103 include, for example, an OS (Operation System), a plurality of other programs, and the like.

The memory 102 is a memory that provides the CPU 101 with a storage area and a work area for loading programs stored in the auxiliary storage device 103, or is used as a buffer. The memory 102 includes, for example, a semiconductor memory such as a ROM (Read Only Memory) and a RAM (Random Access Memory).

The CPU 101 loads the OS and various other programs held in the auxiliary storage device 103 into the memory 102 to execute various processes. The CPU 101 is not limited to one, and may include a plurality of CPUs. The CPU 101 is an example of a "processor".

The communication unit 104 is, for example, a module, such as a LAN (Local Area Network) card and an optical module, that connects a network cable and includes a signal processing circuit. The communication unit 104 is not limited to a circuit that can be connected to a wired network, and may be a wireless signal processing circuit that can process wireless signals of a wireless communication network such as WiFi. Note that the hardware configuration of the platform 1 is not limited to that illustrated in FIG.

The service provider 2, the authorization authentication server 3, and the data holder 4 include a CPU, a memory, an auxiliary storage device, and a communication unit as hardware configurations similar to the platform 1.

The user terminal 5 is, for example, a tablet terminal, a smartphone, a PC, or the like. The user terminal 5 includes a CPU, a memory, an auxiliary storage device, a wireless communication unit, a touch panel display, a speaker, a microphone, and the like as hardware configurations. For example, an application program of a predetermined browser is installed in the auxiliary storage device of the user terminal 5, and through the execution of the browser, the user terminal 5 operates as a user agent.

Figure 4:
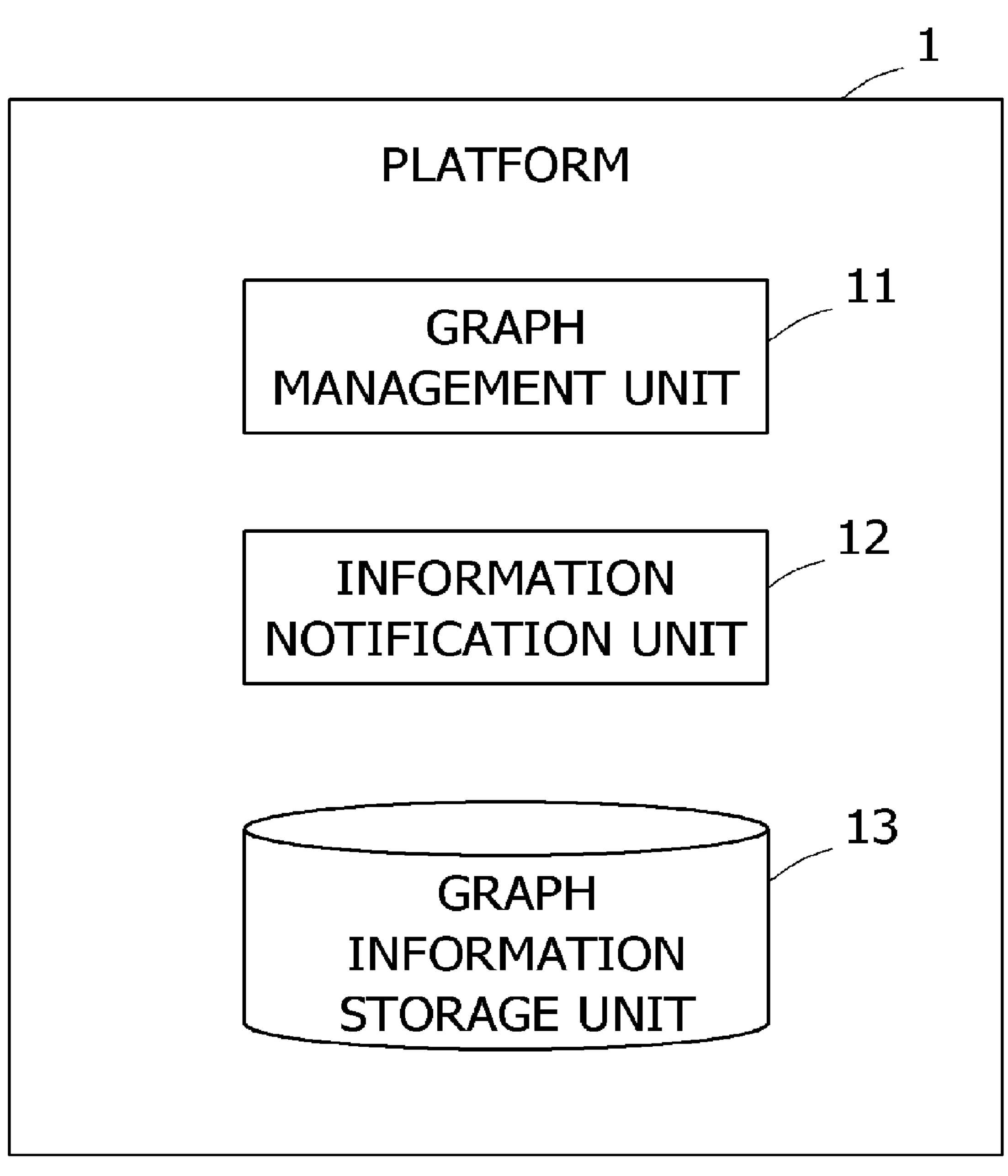
FIG. 4 is a diagram illustrating an example of a functional configuration of the platform.

FIG. 4 is a diagram illustrating an example of a functional configuration of the platform 1. The platform 1 includes a graph management unit 11, an information notification unit 12, and a graph information storage unit 13 as functional configurations. The processing by these functional components is, for example, processing achieved by the CPU 101 of the platform 1 executing a predetermined program held in the auxiliary storage device 103.

The graph management unit 11 manages the service account graph for each user. For example, the graph management unit 11 collects service linkage information and data linkage information from each service provider 2 by a predetermined period, and stores them in the graph information storage unit 13. When the service linkage information and the data linkage information are collectively referred to, they are referred to as linkage information. The linkage information collected from each service provider 2 may be difference information, or may be all linkage information held by each service provider 2. When the linkage information collected from each service provider 2 is difference information, the graph management unit 11 updates the information held in the graph information storage unit 13 with the collected linkage information. When the linkage information collected from each service provider 2 is all linkage information held by each service provider 2, the graph management unit 11 overwrites and stores the information held in the graph information storage unit 13 with the collected linkage information.

Further, the graph management unit 11 creates a service account graph based on the information held in the graph information storage unit 13. The graph management unit 11 may, for example, create a service account graph at a predetermined period, or may create a service account graph for the target user in response to a request from the information notification unit 12.

The information notification unit 12 receives an information notification request requesting notification of the data request information from the service provider 2. Along with the information notification request, for example, the identification information of the service provider 2 which is the data request source, the account of the target user at the service provider 2 which is the data request source, and the identification information of the data holder 4 which is a data request destination are also received from the service provider 2.

When the information notification request is received from the service provider 2, the information notification unit 12 determines whether the account linkage can be traced from the account at the service provider 2 which is the data request source to the data holder 4 which is the data request destination in the service account graph created based on the account at the service provider 2 which is the data request source. The service account graph is obtained by requesting the graph management unit 11.

In the service account graph, when it is possible to reach the data holder 4 which is the data request destination from the account at the service provider 2 which is the data request source, the information notification unit 12 generates the data request information and notifies the service provider 2. The data request information includes, for example, the identification information of the service provider 2 which is the request source, the identification information of the data holder 4 which is the request destination, the identification information of the transit service provider, and account information at the transit service provider.

In the service account graph, when it is impossible to reach the data holder 4 which is the data request destination from the account at the service provider 2 which is the data request source, the service provider 2 transmits notification that information generation is not possible as a response to the information notification request. The service provider 2, which has received the notification that information generation is not possible, may, for example, may request the user setting up account linkage between the service provider 2 and the data holder 4, by sending a request to the user terminal 5 for setting up account linkage with the data holder 4, which is the data request destination, for example.

The graph information storage unit 13 is created, for example, in the storage area of the auxiliary storage device 103 of the platform 1. The graph information storage unit 13 holds the configuration information of the service account graph based on the linkage information collected from each service provider 2. The data structure of the configuration information of the service account graph is not limited to a specific structure. Details of the information held in the graph information storage unit 13 will be described later. Note that the functional configuration of the platform 1 is not limited to the functional configuration illustrated in FIG. 4. Further, the apparatus including the graph management unit 11 and the graph information storage unit 13 may be different from the apparatus including the information notification unit 12.

Figure 5:
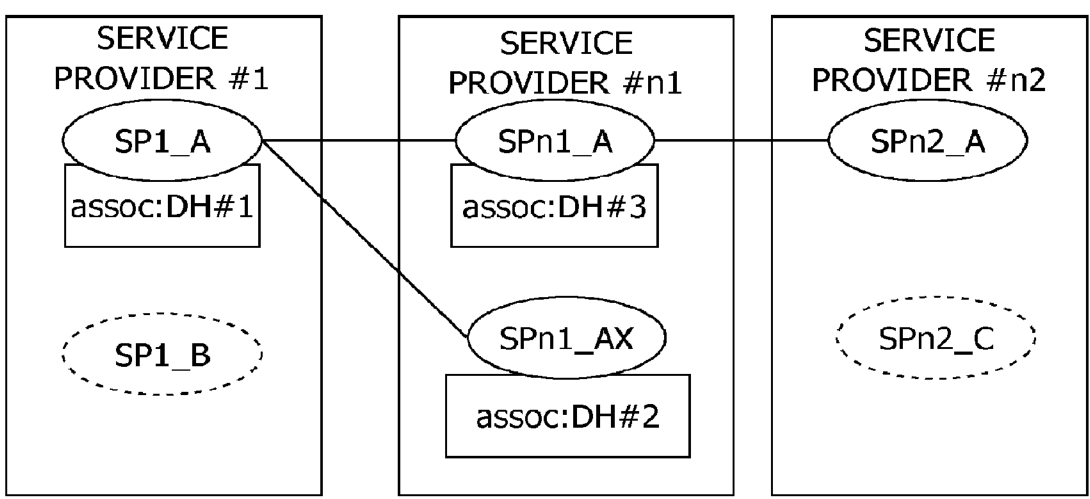
FIG. 5 is a diagram illustrating an example of service account graph and data request information.

FIG. 5 is a diagram illustrating an example of service account graph and data request information. The service account graph illustrated in FIG. 5 is a graph based on the account ID: SP1_A of the user A at the service provider #1. In the service account graph illustrated in FIG. 5, it is assumed that the account is a node, and the service linkage between the service providers 2 is an edge connecting the nodes. Further, in the service account graph illustrated in FIG. 5, as an attribute of the service provider 2, the data holder 4 at which account linkage is set with the service provider 2 is illustrated. In FIG. 5, the data holder is illustrated as "DH". The service account graph is an example of a "graph".

In the example illustrated in FIG. 5, the user A has two accounts each for the service provider #1, the service provider #n1, and the service provider #n2. In FIG. 5, the accounts for which account linkage is set are indicated by solid lines. In FIG. 5, accounts for which account linkage is not set are indicated by a dashed line. However, this is for convenience only, and in practice, accounts for which account linkage is not set are not listed in the service account graph.

Here, for example, when the service account graph is formed as in the example illustrated in FIG. 5, the graph information storage unit 13 holds, as configuration information of the service account graph, the association between the two nodes connected by the edge, and the attribute information of the node. The association between the two nodes connected by the edge is, for example, taking, as an example, the service provider #1 and the service provider #n1 at which the service linkage is set in FIG. 5, association among the identification information of the service provider #1, the account information at the service provider #1, the identification information of the service provider #n1, and the account information at the service provider #n1. The attribute information of the node is, for example, taking, as an example, the service provider #1 and the data holder #1 at which the data linkage is set in FIG. 5, an association among the identification information of the service provider #1, the account information at the service provider #1, and the identification information of the data holder #1.

The configuration information of the service account graph held in the graph information storage unit 13 is not limited to the above. For example, in the graph information storage unit 13, for each account at each service provider 2, a list may be held, the list including the identification information of another service provider 2, the account information at the other service provider 2 in which the account linkage is set, and the identification information of the data holder 4.

The graph management unit 11 collects linkage information from each service provider 2, converts the collected linkage information into a format according to, for example, the data structure held in the graph information storage unit 13 to acquire the configuration information of the service account graph, and stores it in the graph information storage unit 13. Further, the graph management unit 11 creates the service account graph, for the configuration information of the service account graph held in the graph information storage unit 13, by searching for a node which is connected to, by an edge, a node corresponding to one account at a predetermined service provider 2 as a base point.

For example, in the example illustrated in FIG. 5, the account ID: SPn2_A at the service provider #n2 can follow the edge to reach the account ID: SP1_A at the service provider #1. The account ID at service provider #1: SP1_A has account linkage with the data holder #1 as an attribute. Therefore, the information notification unit 12 can generate data request information for acquiring data held by the data holder #1 for the user of the account ID: SPn2_A, for the service provider #n2. The data request information generated at this time includes the identification information of the service provider #n2 as the request source, the identification information of the data holder #1 as the request destination, the identification information of the service provider #1 as the transit service provider, and the account ID: SP1_A at the service provider #1 as the account ID in the transit service.

In the example illustrated in FIG. 5, in addition to the above, the information notification unit 12 can generate the following data request information.

(A) The data request information that can be generated for the information notification request about account ID: SP1_A from service provider #1

(Data Request Information #1)
Request source: Service provider #1
Request destination: Data holder #1
Transit service provider: Service provider #1
Transit service account ID: SP1_A (Data Request Information #2)
Request source: Service provider #1
Request destination: Data holder #2
Transit service provider: Service provider #n1
Transit service account ID: SPn1_AX (Data Request Information #3)
Request source: Service provider #1
Request destination: Data holder #3
Transit service provider: Service provider #n1
Transit service account ID: SPn1_A (B) The Data request information that can be generated in response to the information notification request about account ID: SPn1_A and SPn1_AX from service provider #n1

(Data Request Information #4)
Request source: Service provider #n1
Request destination: Data holder #1
Transit service provider: Service provider #1
Transit service account ID: SP1_A (Data Request Information #5)
Request source: Service provider #n1
Request destination: Data holder #2
Transit service provider: Service provider #n1
Transit service account ID: SPn1_AX (Data Request Information #6)

Request source: Service provider #n1

Request destination: Data holder #3

Transit service provider: Service provider #n1

Transit service account ID: SPn1_A (C) The data request information that can be generated in response to the information notification request about the account ID: SP2_A from the service provider #n2 (the data request information with the data holder #1 as the request destination has been described above, so omitted)

(Data Request Information #7)

Request source: Service provider #n2

Request destination: Data holder #2

Transit service provider: Service provider #n1

Transit service account ID: SPn1_AX (Data Request Information #8)

Request source: Service provider #n2

Request destination: Data holder #3

Transit service provider: Service provider #n1

Transit service account ID: SPn1_A

On the other hand, in the example illustrated in FIG. 5, in response to the information notification request regarding the account ID: SP1_B from the service provider #1 and the account ID: SPn2_C from the service provider #n2, the information notification unit 12 does not generate any data request. This is because these accounts cannot reach any of the data holders #1 to #3.

The service account graph illustrated in FIG. 5 is an example, and the service account graph is not limited thereto. For example, in the service account graph, the data holder itself may be one of the nodes, and the account and account linkage in the service provider may be one of the edges. The edge corresponding to the account linkage between the service providers is an example of the "first edge". The edge corresponding to the account linkage between the service provider and the data holder is an example of the "second edge".

Further, the service account graph illustrated in FIG. 5 is an undirected graph, but the service account graph may be a directed graph. When the service account graph is a directed graph, the edge may be an arrow from the node corresponding to the account at the service provider of the linkage source to the node corresponding to the account at the service provider of the linkage destination. In the case of the directed graph, the configuration information of the service account graph held in the graph information storage unit 13 is, for example, for account linkage between the service providers 2, held as a list of association between the identification information and the account ID of the service provider 2 of the linkage source, and the identification information and the account ID of the service provider 2 of the linkage destination. The service account graph of the directed graph may be ignored in its orientation when data request information is generated. For example, in the data acquisition, the service account graph as the directed graph may be used when the incentive is given to the service provider 2 that is the trigger for account linkage with the transit service provider. Depending on how the service account graph is configured, the configuration information of the service account graph held in the graph information storage unit 13 may also be changed.

Figure 6:
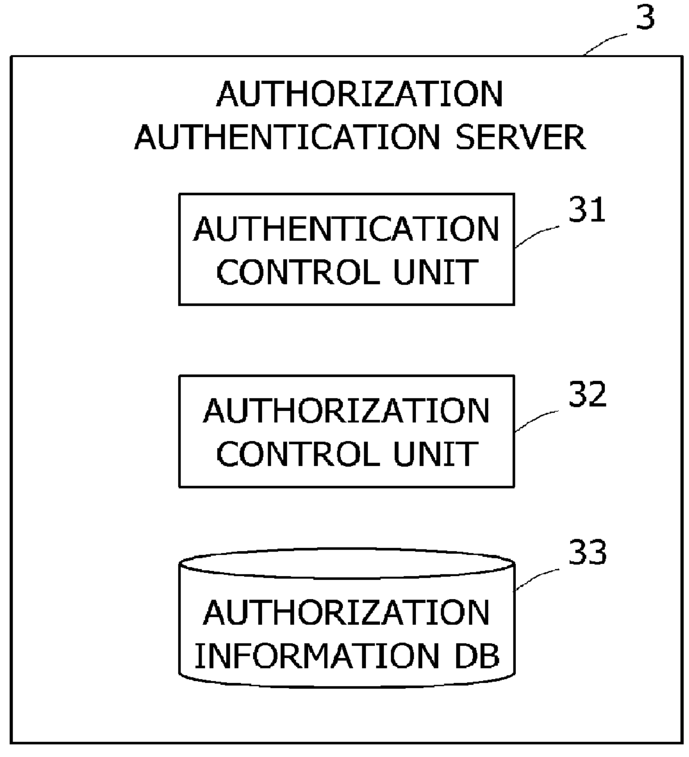
FIG. 6 is a diagram illustrating an example of a functional configuration of a service provider and an authorization authentication server attached to the service provider.

FIG. 6 is a diagram illustrating an example of a functional configuration of the service provider 2 and the authorization authentication server 3 attached to the service provider 2. The service provider 2 includes a control unit 21 and a linkage information DB 22 as functional configurations. The processing of the control unit 21 and the linkage information DB 22 is achieved by, for example, the CPU of the service provider 2 executing a predetermined program.

The control unit 21 performs processing related to a predetermined service provided by the service provider 2. In the first embodiment, when the control unit 21 receives a request to acquire the linkage information from the platform 1, the control unit 21 transmits the linkage information held in the linkage information DB 22 described later to the platform 1. In addition, when a request for data acquisition is received from the user terminal 5, the control unit 21 executes the processing related to the above-described (4) data acquisition process. In the (4) data acquisition process, when the control unit 21 transmits the information notification request to the platform 1 and receives the data request information from the platform 1, the control unit 21 transmits the data request information together with the request for data acquisition to the data holder 4 which is the data request destination, and acquires the data.

The linkage information DB 22 is created in the storage area of the auxiliary storage device of the service provider 2. The service provider 2 holds service linkage information and data linkage information regarding account linkage set to the account at the service provider 2. The service linkage information and the data linkage information are transmitted from the authorization authentication server 3 when consent for account linkage is obtained from the user in the authorization authentication server 3 described later, and are received and stored in the linkage information DB 22 by the control unit 21.

Next, the authorization authentication server 3 includes an authentication control unit 31, an authorization control unit 32, and an authorization information DB 33 as functional configurations. The authentication control unit 31, the authorization control unit 32, and the authorization information DB 33 are each achieved by, for example, the CPU of the authorization authentication server 3 executing a predetermined program.

The authentication control unit 31 performs an authentication process at login of the user. The authentication control unit 31 is achieved, for example, by the CPU of the authorization authentication server 3 executing a program for the OpenID provider of the OpenID Connect. When a login request is received from the user terminal 5, the authentication control unit 31 performs user authentication according to the login information received together with the request. In the first embodiment, when authentication is successful, the authentication control unit 31 issues an access token that allows access to the corresponding service provider 2 to the user terminal 5. The access token is, for example, a character string of a predetermined length randomly created. When accessing the service provider 2, the user terminal 5 also transmits the access token.

The authorization control unit 32 authorizes the user to perform an action that can be performed on the service provider 2 and other service providers 2 for which account linkage with the service provider 2 is set. The authorization control unit 32 is achieved, for example, by the CPU of the authorization authentication server 3 executing a program for the authorization server of the OAuth 2.0.

For example, in the first embodiment, when consent information indicating that consent has been obtained from the user for comprehensive consent or account linkage with another service is received from the user terminal 5, the authorization control unit 32 updates the scope of authority for the user and issues an access token for the user. At this time, when the account linkage is newly set, the authorization control unit 32 transmits the linkage information regarding the account linkage to the service provider 2. The consent information indicating that the comprehensive consent has been obtained is an example of "second information".

When the authorization control unit 32 receives a verification request for requesting a verification of authenticity for an access token issued by the authorization control unit 32 from another device, the authorization control unit 32 transmits the authorization information corresponding to the access token as a response, for example, referring to the authorization information DB 33 described later. The details of the processing of the authorization control unit 32 will be described later.

The authorization information DB 33 is created, for example, in a storage area of an auxiliary storage device of the authorization authentication server 3. The authorization information DB 33 holds authorization information for each account. Details of the information held in the authorization information DB 33 will be described later. The functional configuration of the service provider 2 and the authentication server 3 illustrated in FIG. 6 is an example, and is not limited to the example illustrated in FIG. 6. Further, the service provider 2 and the authorization authentication server 3 may be configured with one server.

FIG. 7 is a diagram illustrating an example of authorization information held in the authorization information DB 33. The authorization information includes, for example, an account ID at the service provider 2, an access token, and a scope. The scope is the scope of permissions granted to the user who has the account. One access token is issued for one account ID. In addition, when there is a change in the scope, by the authorization control unit 32, a new access token is issued, and the access token corresponding to the account ID held in the authorization information DB 33 is also overwritten and saved with the newly issued access token.

The scope includes the identification information of another service provider 2 and the account ID at another service provider 2, and the identification information of the data holder #1, wherein the account linkages have been set for another service provider 2 and the data holder #1, and wherein consent for the account linkages have been obtained by the user corresponding to the account ID in the authorization information. Further, the scope includes information indicating that the comprehensive consent has been obtained when the comprehensive consent has been obtained from the user (in FIG. 7, "comprehensive consent").

The scope change will be described in detail later, but occurs when a scope registration request is received from the user terminal 5. When the authorization control unit 32 receives the verification request for the access token issued by the authorization control unit 32 from another device, the authorization control unit 32 refers to the authorization information DB 33 and transmits the authorization information corresponding to the access token to the device which is a source of the verification request. The device which is the source of the verification request determines the authenticity of the access token according to whether or not the scope corresponding to the access token includes itself. The process related to the verification of the access token is an example, and the process related to the verification of the access token changes according to the format of the access token adopted in the account linkage system 100.

Further, the user terminal 5 stores the access token issued by the authorization authentication server 3. When a new account linkage is set, an access token is issued from the authorization authentication server 3 each time, so that the user terminal 5 overwrites and saves the access token already held for the account of the corresponding service with a new access token. When the user terminal 5 accesses the authorization authentication server 3 and then accesses another service provider 2 or the like for which the account has been linked, the user terminal 5 transmits the access token to the device to which the account has been linked. As a result, the user terminal 5 can access the device to which the account linkage has been set. The information included in the authorization information is not limited to the example illustrated in FIG. 7.

Figure 8:
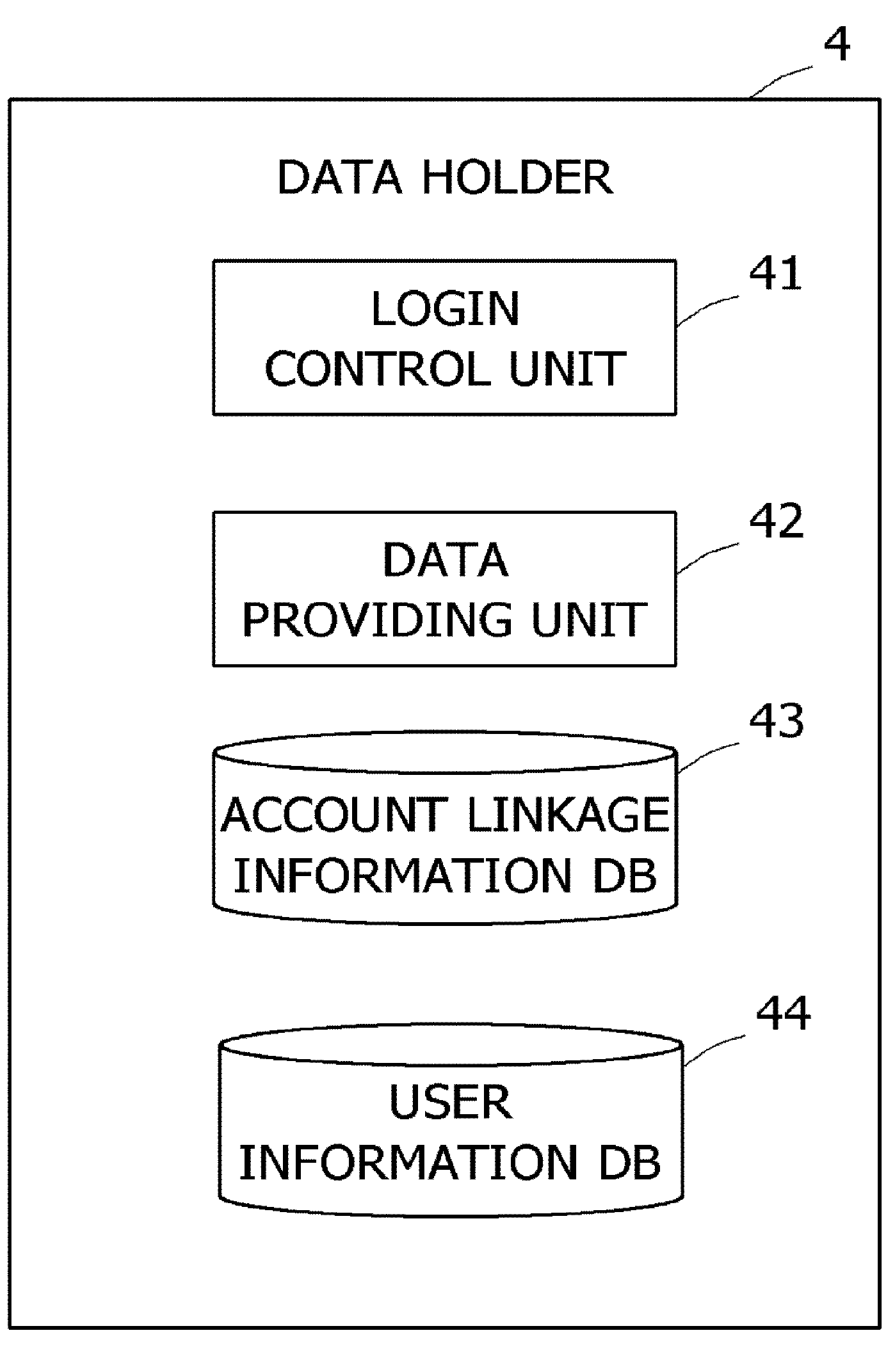
FIG. 8 is an example of a functional configuration of a data holder.

FIG. 8 is an example of a functional configuration of the data holder 4. The data holder 4 includes a login control unit 41, a data providing unit 42, an account linkage information DB 43, and a user information DB 44 as functional configurations. The functions of the login control unit 41, the data providing unit 42, the account linkage information DB 43, and the user information DB 44 are achieved by, for example, the CPU of the data holder 4 executing a predetermined program.

The login control unit 41 controls login to a service provided by the data holder 4. The login control unit 41 receives a login request from the user terminal 5. Along with the login request, login information is also received. The login control unit 41 performs user authentication using the received login information, and returns a response corresponding to the result of user authentication to the user terminal 5. The login information includes, for example, account information and a password.

In the account linkage system 100, it is assumed that HTTP is used in communication between each device. The login control unit 41 determines based on the URL of the access destination whether the login from the user terminal 5 is a direct login to the data holder 4 or a login via the service of the linkage source for account linkage. Further, when the login is performed via the service of the linkage source for account linkage, the identification information of the linkage source service and the account information are included in the URL of the access destination in the message of the login request from the user terminal 5. When the login request is a login via the service of the linkage source for account linkage, the login control unit 41 associates the account information (account information of the linkage destination) at the data holder 4 included in the login information with the account information (account information of the linkage source) at the service provider 2 included in the URL of the access destination and registers it in the account linkage information DB 43.

When the data providing unit 42 receives a request for data acquisition from the service provider 2, the data providing unit 42 reads and provides the corresponding data from the user information DB 44. When the data request information is received together with the request for data acquisition from the service provider 2, the data providing unit 42 refers to the account linkage information DB 43 described later to determine the presence or absence of an account at the data holder 4 associated with the account ID of the transit service provider included in the data request information. When there is an account at the data holder 4 associated with the account ID of the transit service provider, the data providing unit 42 reads the data associated with the account from the user information DB 44 and transmits the data to the service provider 2.

The account linkage information DB 43 and the user information DB 44 are created in the storage area of the auxiliary storage device of the data holder 4. The account linkage information DB 43 holds account linkage information. The account linkage information includes, for example, the association between the account at the data holder 4 and the identification information and the account information of the service provider 2 that has already been linked to the account at the data holder 4. The user information DB 44 holds information about the user for each account at the data holder 4. The content of the information about the user held in the user information DB 44 depends on the service provided by the data holder 4. The functional configuration of the data holder 4 is not limited to that illustrated in FIG. 8.

Figure 9:
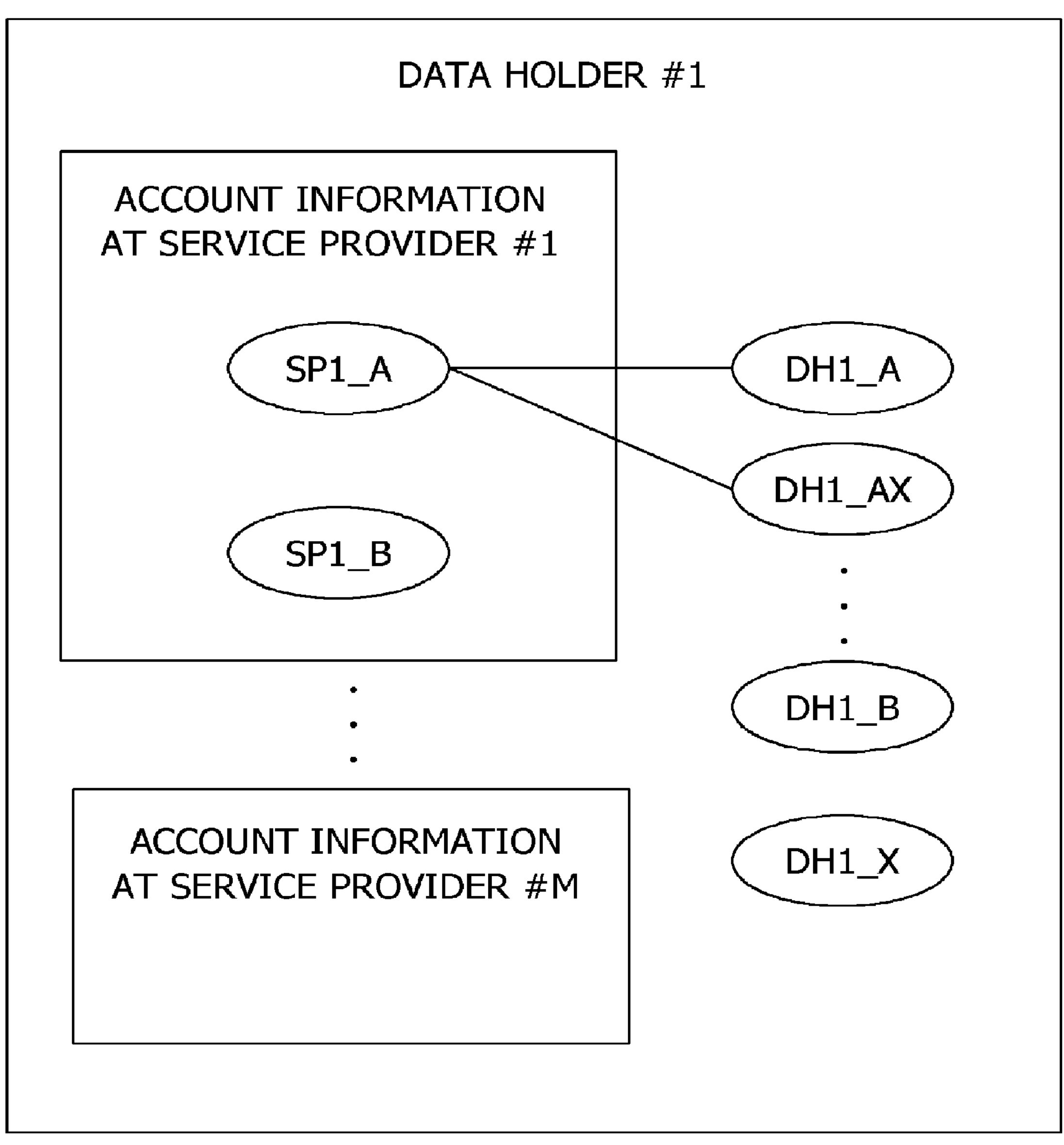
FIG. 9 is an example of an account linkage state managed by the data holder.

FIG. 9 is an example of an account linkage state managed by the data holder 4. In FIG. 9, the state of account linkage managed by the data holder 4 based on the account linkage information held in the account linkage information DB 43 is represented as a graph. In this graph, the account is a node and the data linkage is an edge. When the data providing unit 42 receives the data request information together with the data acquisition request from the service provider 2, the data providing unit 42 specifies the account at the data holder 4 from the account information of the service provider 2 included as an account at the transit service in the data request information. The data providing unit 42 reads data associated with the specified account from the user information DB 44 and transmits the data to the service provider 2 of the data requesting source.

For example, one user may hold multiple accounts at the data holder #1. Further, as in the example illustrated in FIG. 9, the account linkage between the account at one service provider #1 of the user: SP1_A and the plurality of accounts at the data holder #1: DH1_A, DH1_AX may be set. When the data request information including the account ID: SP1_A at the service provider #1 is received as the account at the transit service, the data providing unit 42 specifies DH1_A and DH1_AX as the accounts associated with the account ID: SP1_A at the service provider #1. The data providing unit 42 reads the data associated with the specified accounts DH1_A and DH1_AX from the user information DB 44, and transmits the data to the service provider 2 of the data requesting source.

Figure 10:
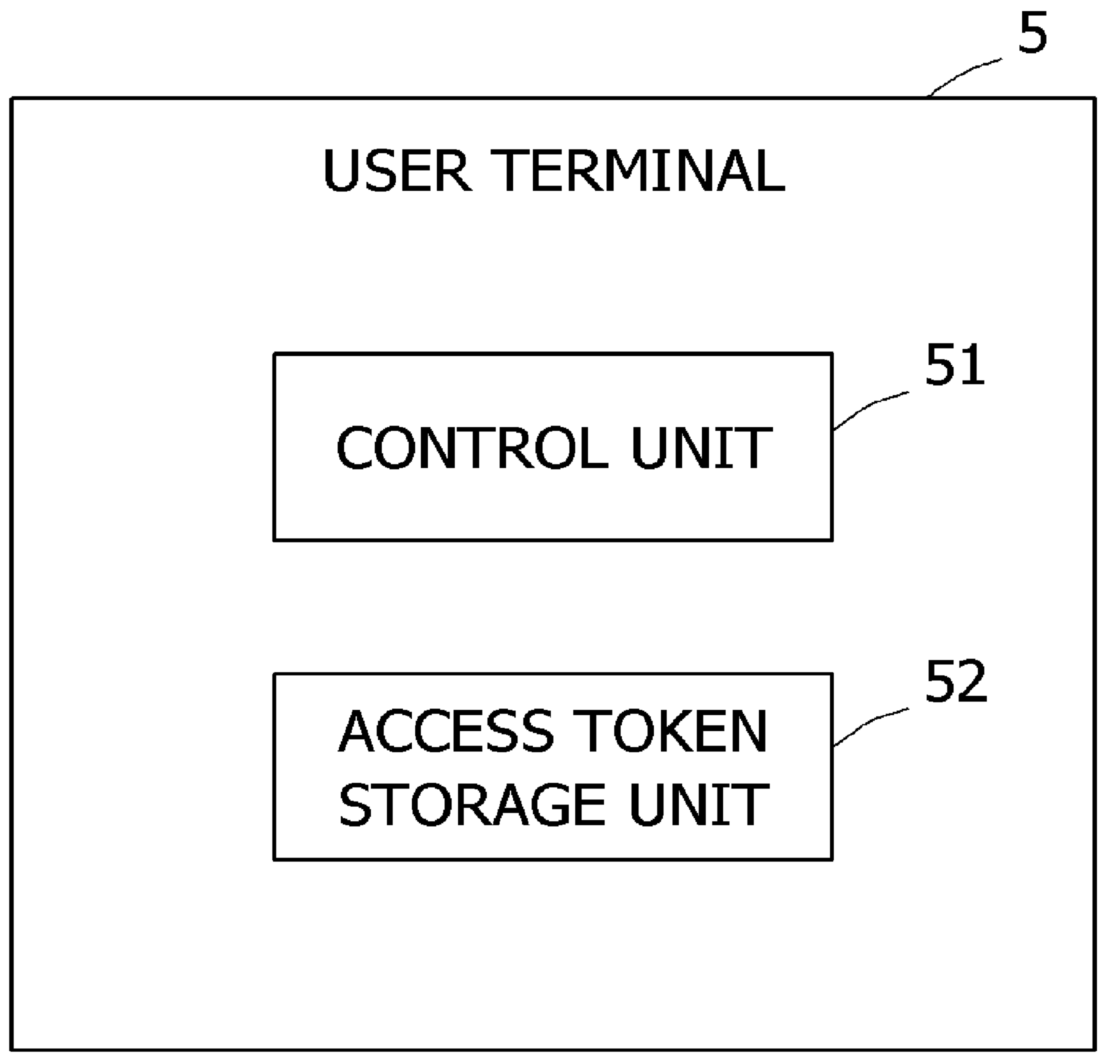
FIG. 10 is an example of a functional configuration of a user terminal.

FIG. 10 is an example of a functional configuration of the user terminal 5. The user terminal 5 includes a control unit 51 and an access token storage unit 52 as functional configurations. In the first embodiment, the functions of the control unit 51 and the access token storage unit 52 are achieved by the CPU of the user terminal 5 executing the application program of the web browser. For example, the control unit 51 accesses the service provider 2 according to the operation input from the user in the screen displayed on the display, or causes the screen to be output according to the instruction from the service provider 2. When the access token is received from the service provider 2, the control unit 51 overwrites and stores the access token in the access token storage unit 52.

The access token storage unit 52 is created, for example, in a storage area in the memory of the user terminal 5. The access token storage unit 52 holds the access token issued from the service provider 2. Details of the information held in the access token storage unit 52 will be described later. Note that the functional configuration of the user terminal 5 illustrated in FIG. 10 is an example, and the functional configuration of the user terminal 5 is not limited to the functional configuration illustrated in FIG. 10.

FIG. 11 is an example of access token information held in the access token storage unit 52. The access token information includes identification information of the service provider 2 of the issuer, the account ID at the service provider 2 of the issuer, and the access token. When accessing the service provider 2 of the issuer, the user terminal 5 also transmits the corresponding access token together. Further, since one access token is issued for one account at one service, when a new access token is issued from the service provider 2, it is overwritten and saved. The information held in the access token storage unit 52 is not limited to the example illustrated in FIG. 11.

<Processing Flow>

Figure 12:
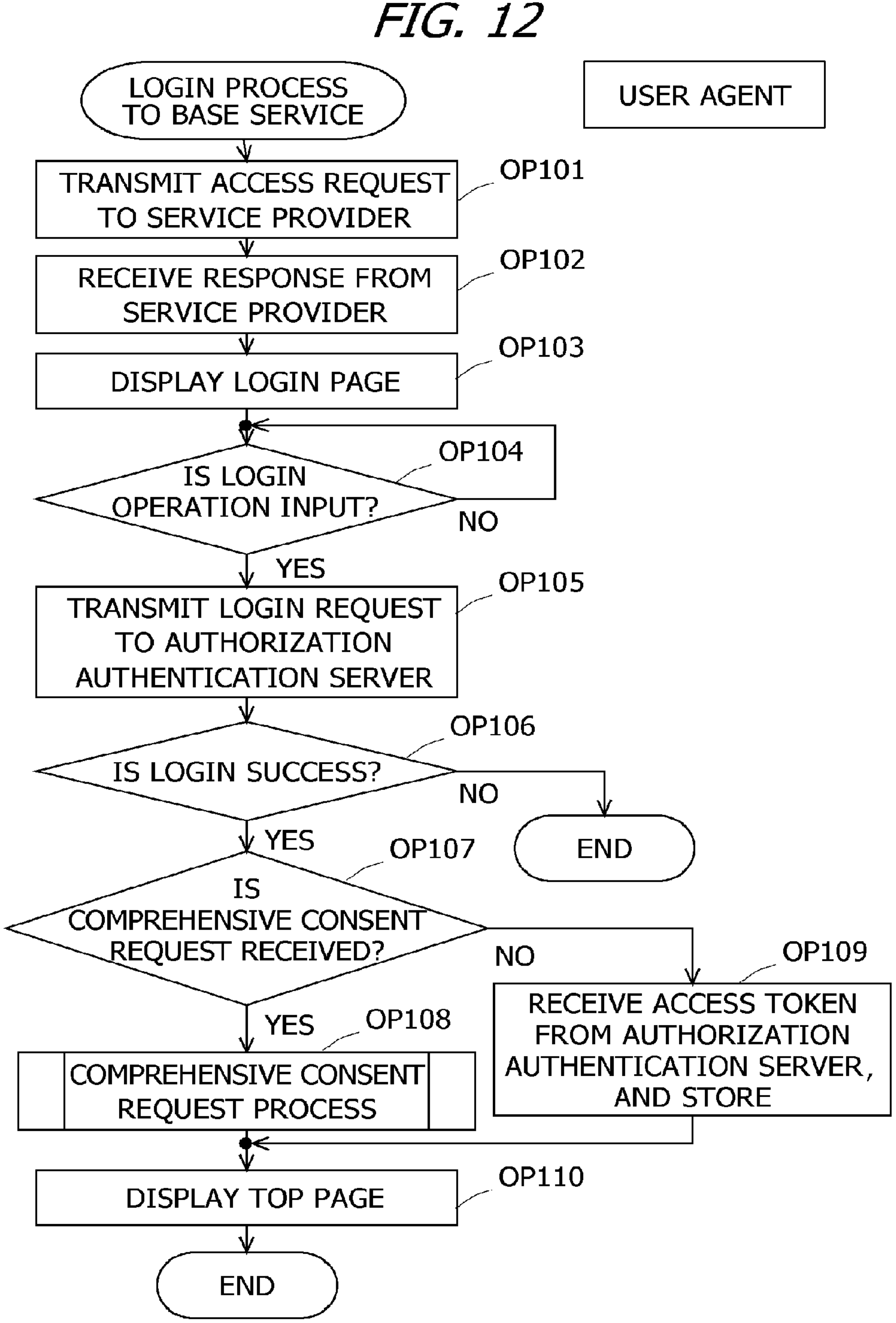
FIG. 12 is a flowchart of a login process to a base service by the user terminal.
Figure 14:
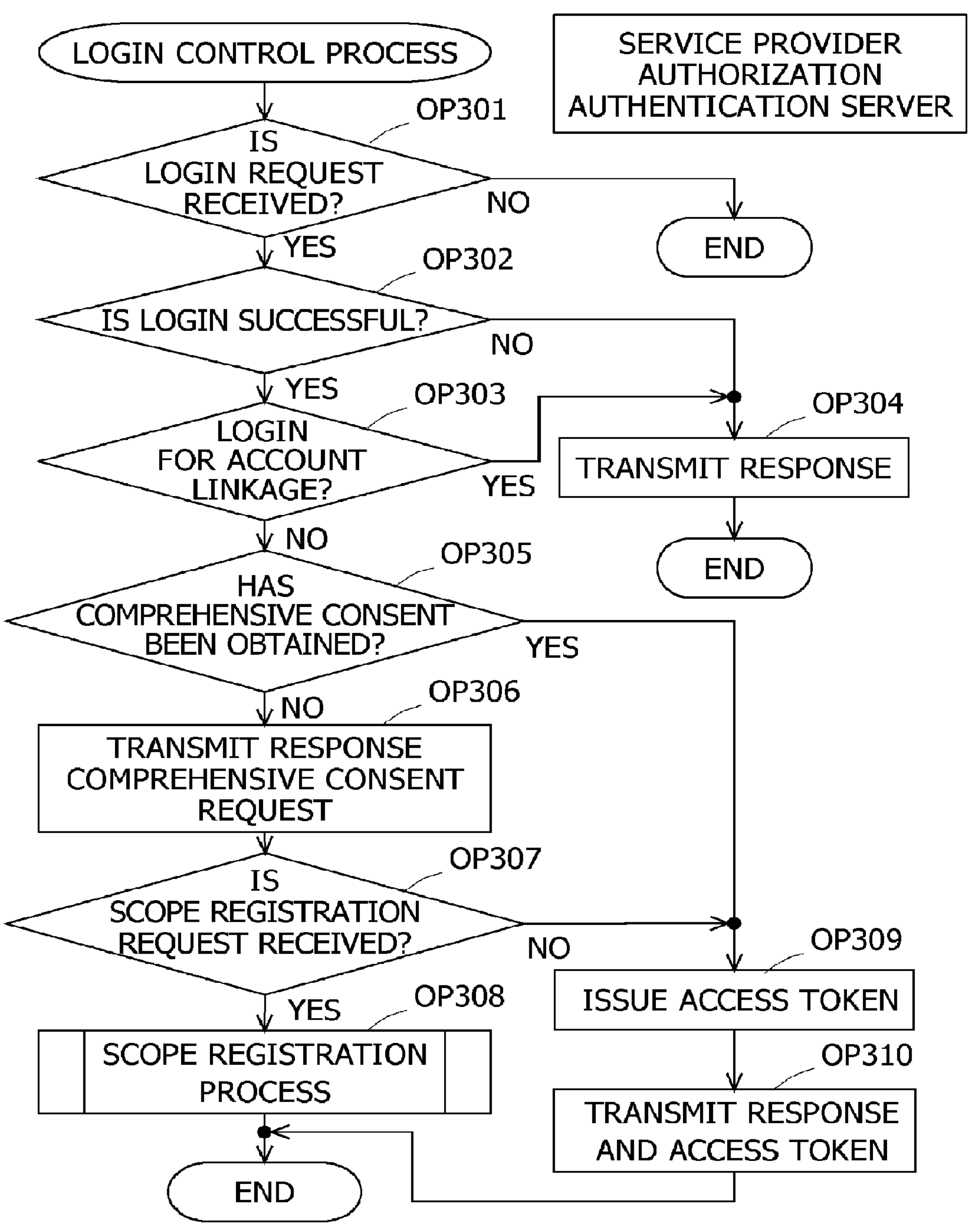
FIG. 14 is an example of a flowchart of a login control process in the authorization authentication server.

The flow of processing in each device will be described separately for the above (1) login and comprehensive consent acquisition process, (2) account linkage process, (3) service account graph creation process, and (4) data acquisition process. FIGS. 12 to 14 are flowcharts of the processes of the user terminal 5 and the authorization authentication server 3 related to the processes of (1) login and comprehensive consent acquisition, respectively. Hereinafter, the service in which the user terminal 5 first logs in and becomes a linkage source of account linkage is referred to as the base service.

FIG. 12 is a flowchart of a login process to the base service by the user terminal 5. The process illustrated in FIG. 12 is started, for example, when a user operation of accessing a web page of the base service is input in the user terminal 5. The execution subject of the process illustrated in FIG. 12 is the CPU of the user terminal 5, but for convenience, it is explained assuming that the functional component is the execution subject. The similar assumption applies to the description of the flowchart of the process relating to the user terminal 5 below. In the first embodiment, the communication between the user terminal 5 and the service provider 2 or the authorization authentication server 3 is performed in accordance with HTTP. In the user terminal 5, the application program of the web browser is executed, and basically, the user terminal 5 executes the following processing according to the instruction included in the HTTP message received from the service provider 2 or the authorization authentication server 3.

In OP101, the control unit 51 transmits an access request to the service provider 2 of the base service. In the OP 102, the control unit 51 receives a response to the access request from the service provider 2 of the base service. The response includes an instruction to redirect to the login page.

In OP103, the control unit 51 accesses the login page of the base service and displays the login page on the display. In OP104, the control unit 51 determines whether or not a login operation has been input. For example, the login operation is input to the user terminal 5 by selecting the "login" button included in the login page. If the login operation is entered (OP104: YES), the process proceeds to OP105. The control unit 51 enters the standby state until the login operation is input (OP104: NO).

In OP105, the control unit 51 transmits a login request to the authorization authentication server 3 of the base service. The URL for accessing the authorization authentication server 3 of the base service is included, for example, in the data of the login page. Login information is also sent along with the login request. The login information includes, for example, account information and a password.

In OP106, the control unit 51 determines whether or not a response indicating successful login has been received from the authorization authentication server 3. If a response indicating successful login is received (OP106: YES), the process proceeds to OP107. When a response indicating successful login is not received (OP 106: NO), the process illustrated in FIG. 12 ends. Note that it is not limited thereto.

For example, the process may return to OP103, and the control unit 51 may display the login page again.

In OP107, the control unit 51 determines whether or not the comprehensive consent request has been received together with the response from the authorization authentication server 3. The comprehensive consent request is a message requesting to obtain comprehensive consent from a user. As the comprehensive consent request, the response from the authorization authentication server may include an instruction to redirect to a page displaying a message requesting comprehensive consent. When the comprehensive consent request is received together with the response from the authorization authentication server 3 (OP107: YES), the process proceeds to OP108. In the OP 108, the comprehensive consent request process, which is a process for obtaining comprehensive consent from the user, is executed. Details of the comprehensive consent request process will be described later.

When the comprehensive consent request is not received together with the response from the authorization authentication server 3 (OP107: NO), the process proceeds to OP109. In this case, comprehensive consent has already been obtained from the user, and the access token is received from the authorization authentication server 3 together with a response indicating successful login. In the OP109, the control unit 51 overwrites and stores the access token received from the authorization authentication server 3 in the access token storage unit 52.

In OP 110, since the login to the base service is successful, the control unit 51 displays the top page of the base service. Thereafter, the process illustrated in FIG. 12 is terminated.

FIG. 13 is an example of a flowchart of the comprehensive consent request process by the user terminal 5. The process illustrated in FIG. 13 is started when the user terminal 5 receives the comprehensive consent request.

In OP201, the control unit 51 causes the display to display a message requesting the user to obtain the comprehensive consent. In the OP 202, the control unit 51 determines whether or not a user operation that allows comprehensive consent has been input. The user operation that allows the comprehensive consent is input to the user terminal 5, for example, by selecting a "YES" button indicating that the comprehensive consent is allowed, which is displayed on the screen together with a message requesting the comprehensive consent. When the user operation that allows comprehensive consent is input (OP202: YES), the process proceeds to OP203.

When a user operation that does not allow comprehensive consent or a user operation that instructs to process later is input (OP202: NO), the process illustrated in FIG. 13 ends. The user operation that does not allow the comprehensive consent is input to the user terminal 5 by selecting, for example, a "NO" button indicating that the comprehensive consent is not allowed, which is displayed on the screen together with a message requesting the comprehensive consent. The user operation instructing to process later is input to the user terminal 5, for example, by selecting a "process later" button indicating to process later, which is displayed on the screen with a message requesting comprehensive consent.

In OP203, the control unit 51 transmits a scope registration request requesting registration in the scope for the comprehensive consent to the authorization authentication server 3. In the OP 203, together with the scope registration request, the consent information indicating that the comprehensive consent has been obtained is also transmitted to the authorization authentication server 3.

In OP204, the control unit 51 receives a response to the scope registration request and a newly issued access token from the authorization authentication server 3. In the OP205, the control unit 51 overwrites and stores the received access token in the access token storage unit 52. In OP206, the control unit 51 displays a message indicating the success of the comprehensive consent on the screen. Thereafter, the process illustrated in FIG. 13 is terminated.

FIG. 14 is an example of a flowchart of a login control process in the authorization authentication server 3. The process illustrated in FIG. 14 is repeatedly executed in a predetermined period, for example. The execution subject of the process illustrated in FIG. 14 is the CPU of the authorization authentication server 3, but for convenience, it is explained assuming that the functional component is the execution subject. The similar assumption applies to the following description of the flowchart of the authorization authentication server 3.

In OP301, the authentication control unit 31 determines whether or not a login request has been received from the user terminal 5. When a login request is received (OP301: YES), the process proceeds to OP302. If the login request has not been received (OP301: NO), the process illustrated in FIG. 14 ends.

In OP302, the authentication control unit 31 performs authentication using the login information received together with the login request, and determines whether or not the login is successful. If the login is successful (OP302: YES), the process proceeds to OP303. If the login fails (OP302: NO), the process proceeds to OP304.

In OP303, the authentication control unit 31 determines whether or not the login request received in OP301 is a login request for account linkage. The determination of the OP 303 is made based on the contents of the HTTP message received as the login request from the user terminal 5. If it is a login request for account linkage (OP303: YES), the process proceeds to OP304. If it is not a login request for account linkage, that is, it is a login request as a base service (OP303: NO), the process proceeds to OP305.

In OP304, the authentication control unit 31 transmits a response based on the result of authentication of login in OP302 to the user terminal 5. Thereafter, the process illustrated in FIG. 14 is terminated.

In OP305, the authorization control unit 32 determines whether or not the comprehensive consent has been obtained from the user of the corresponding account by referring to, for example, the authorization information DB 33. If the comprehensive consent has already been obtained from the corresponding user (OP305: YES), the process proceeds to OP309. If the comprehensive consent is not obtained from the corresponding user (OP305: NO), the process proceeds to OP306.

In OP306, the authorization control unit 32 transmits a comprehensive consent request to the user terminal 5 together with a response of successful login. In the OP307, the authorization control unit 32 determines whether or not a scope registration request for the comprehensive consent has been received from the user terminal 5. When the scope registration request for the comprehensive consent is received from the user terminal 5 (OP307: YES), the process proceeds to OP308. In the OP 308, a scope registration process, which is a process of adding a new account linkage destination to the scope, is executed for the account corresponding to the user of the user terminal 5. Details of the scope registration process will be described later. In the scope registration process executed in OP308, "comprehensive consent" is added to the scope of the authorization information of the corresponding account. When the scope registration process is completed, the process illustrated in FIG. 14 is subsequently terminated.

When a scope registration request for comprehensive consent is not received from the user terminal 5 (OP307: NO), the process proceeds to OP309. For example, when a message indicating that the comprehensive consent is not allowed or a message indicating that the comprehensive consent is to be processed later is received from the user terminal 5, the determination of the OP307 becomes a negative determination.

In OP309, since the login is successful, the authorization control unit 32 issues a new access token. At this time, the authorization control unit 32 overwrites and saves the access token for the authorization information of the corresponding account. In OP310, the authorization control unit 32 transmits a response indicating success in the login request and an access token to the user terminal 5. Thereafter, the process illustrated in FIG. 14 is terminated.

Figure 15A:
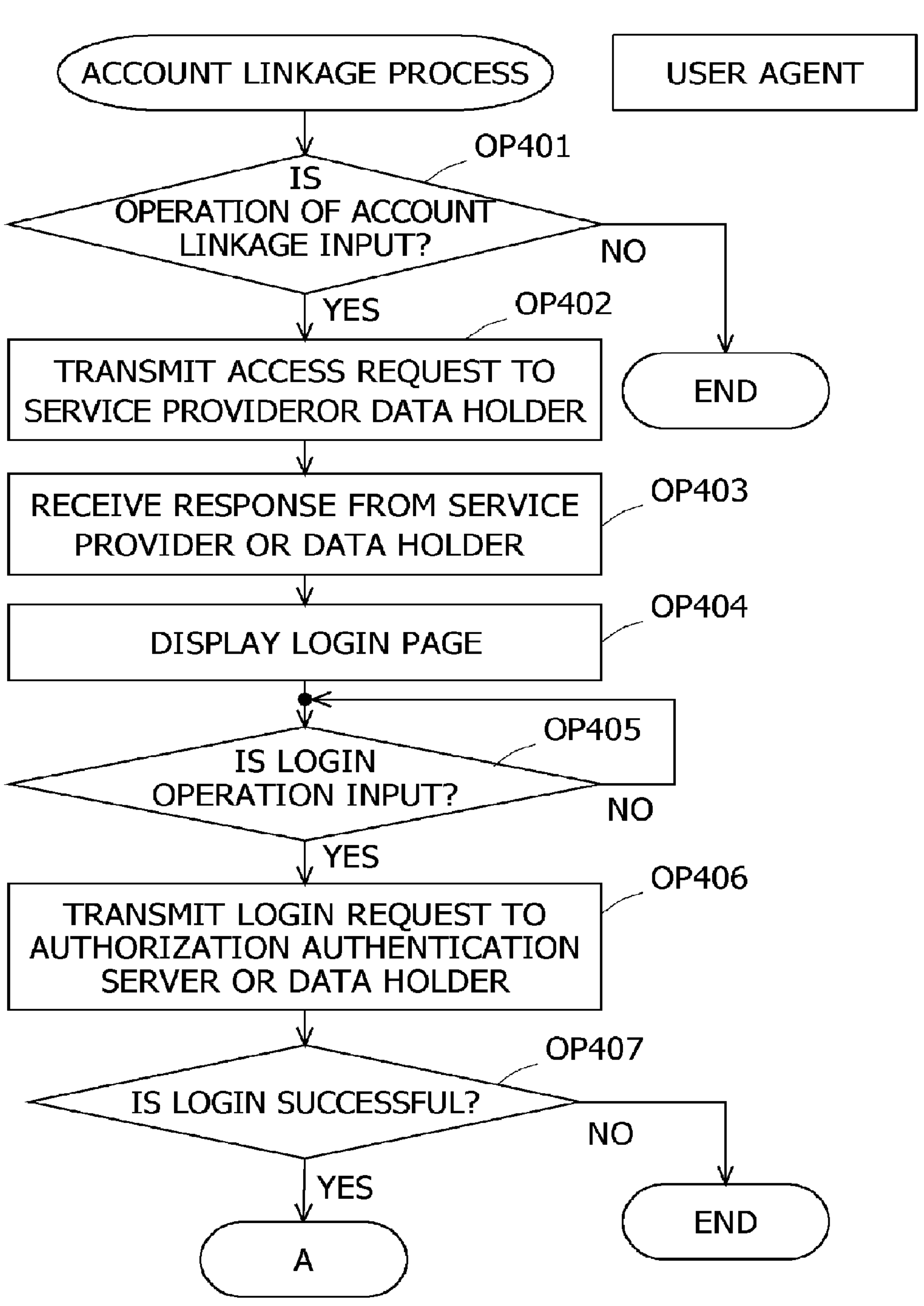

Next, FIGS. 15A to 17 are flowcharts of the processing of the user terminal 5, the authorization authentication server 3, and the data holder 4 related to the (2) account linkage process, respectively. FIGS. 15A and 15B are examples of flowcharts of account linkage process by the user terminal 5. The processing illustrated in FIGS. 15A and 15B, for example, is started after successful login to the base service, and is repeatedly executed at a predetermined period during access to the base service.

In OP401, the control unit 51 determines whether or not the user operation of account linkage has been input. The user operation of account linkage is input by, for example, selecting a button in the screen of the user terminal 5 that instructs the user to perform account linkage between the base service and another service provider 2 or the data holder 4. If the user operation of account linkage is input (OP401: YES), the process proceeds to OP402. When the user operation of account linkage is not input (OP401: NO), the process illustrated in FIG. 15A ends.

In OP402, the control unit 51 transmits an access request to the service provider 2 or the data holder 4 which is the account linkage destination. The information of the access destination to the service provider 2 or the data holder 4 which is the account linkage destination is included in, for example, the source data of the screen on which a button instructing account linkage is displayed. In the OP 403, the control unit 51 receives a response from the service provider 2 or the data holder 4 which is the account linkage destination. In the OP404, for example, the control unit 51 displays the login page of the service provider 2 or the data holder 4 which is the account linkage destination on the display according to the redirect included in the response from the service provider 2 or the data holder 4 which is the account linkage destination.

In OP405, the control unit 51 determines whether or not a login user operation has been input. If the login user operation is input (OP405: YES), the process proceeds to OP406. The control unit 51 is in a standby state until the login user operation is input.

In the OP 406, the control unit 51 transmits a login request to the authorization authentication server 3 corresponding to the service provider 2 which is the account linkage destination or the data holder 4 which is the account linkage destination. Login information is also sent along with the login request. The access destination of the authorization authentication server 3 corresponding to the service provider 2 which is the account linkage destination is included in, for example, the source data of the login page.

In OP407, the control unit 51 determines whether or not a response indicating successful login has been received from the authorization authentication server 3 corresponding to the service provider 2 which is the account linkage destination or the data holder 4 which is the account linkage destination. If a response indicating successful login is received (OP407: YES), the process proceeds to OP408 in FIG. 15B. When the login is successful, the control unit 51 stores a session with the service provider 2 or the data holder 4 which is the account linkage destination.

When a response indicating successful login is not received (OP407: NO), the process illustrated in FIG. 15A ends. When a response indicating a successful login is not received, for example, when a response indicating a failed login is received, or when the response is not received even after a predetermined time has elapsed. If the response indicating the successful login is not received, the process proceeds to OP 404, and the user may be requested to log in again.

In OP 408 of FIG. 15B, the control unit 51 transmits a scope registration request for account linkage to the authorization authentication server 3 of the base service. In OP409, the control unit 51 receives a response from the authorization authentication server 3 of the base service. In addition to the response, an account linkage consent request requesting for the user to consent for the new account linkage is also received from the authorization authentication server 3. In the OP 410, the control unit 51 displays, on the display, a message requesting consent for new account linkage with the account linkage destination.

In OP 411, the control unit 51 determines whether or not a user operation that consents to the new account linkage with the account linkage destination has been input. The user operation that consents to the new account linkage with the account linkage destination is input to the user terminal 5, for example, by selecting the "YES" button indicating that the user consents to the new account linkage displayed on the screen together with a message requesting consent for the new account linkage with the account linkage destination. If a user operation that consents to the new account linkage is input (OP411: YES), the process proceeds to OP412.

When a user operation that does not consent to the new account linkage is input (OP411: NO), the process illustrated in FIG. 15B ends. The user operation that does not consent to the new account linkage is input to the user terminal 5, for example, by selecting a "NO" button indicating that the user does not consent to the new account linkage, which is displayed on the screen together with a message requesting consent to the new account linkage.

In OP 412, the control unit 51 transmits the scope registration request again and the consent information indicating that consent has been obtained for new account linkage with the account linkage destination to the authorization authentication server 3 of the base service. When the new account linkage destination is the service provider 2, the identification information and the account information of the service provider 2 are also transmitted to the authorization authentication server 3 of the base service. When the new account linkage destination is the data holder 4, the identification information of the data holder 4 is also transmitted to the authorization authentication server 3 of the base service.

In OP413, the control unit 51 receives a response indicating successful registration of the scope registration request and a newly issued access token from the authorization authentication server 3 of the base service. In the OP414, the control unit 51 overwrites and stores the received access token in the access token storage unit 52. In the OP 415, the control unit 51 displays a message indicating the success of account linkage with the new account destination on the screen. Thereafter, the process illustrated in FIG. 15B ends.

Figure 16:
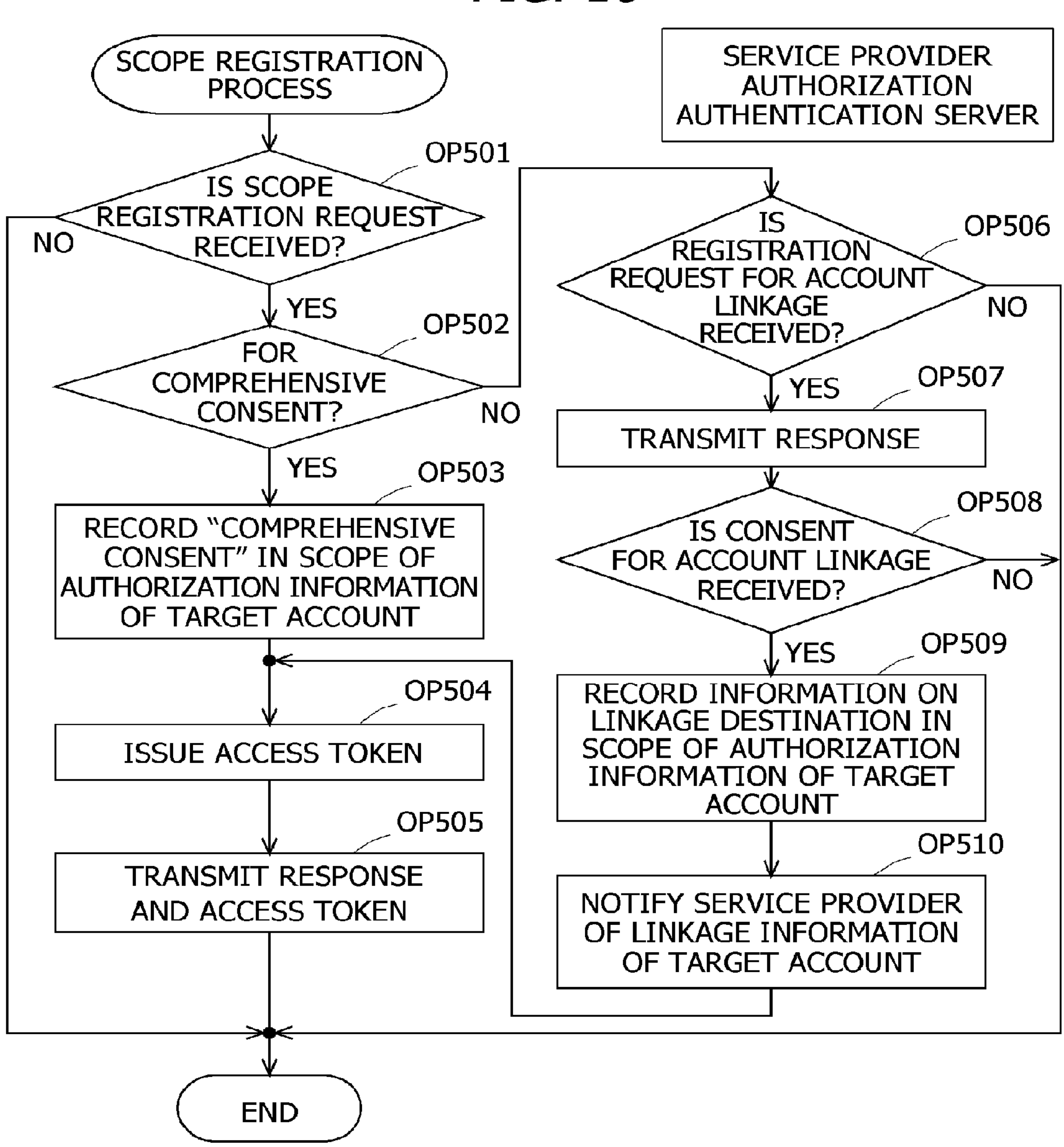
FIG. 16 is an example of a flowchart of a scope registration process by the authorization authentication server.

FIG. 16 is an example of a flowchart of the scope registration process by the authorization authentication server 3. The process illustrated in FIG. 16 is repeatedly executed at a predetermined period.

In OP501, the authorization control unit 32 determines whether or not a scope registration request has been received from the user terminal 5. If a scope registration request is received (OP501: YES), the process proceeds to OP502. If the scope registration request has not been received (OP501: NO), the process illustrated in FIG. 16 ends.

In OP502, the authorization control unit 32 determines whether or not the scope registration request is a request for comprehensive consent. The scope registration request may be determined based on, for example, a code or a flag included in the message of the scope registration request. Alternatively, the determination may be made based on receiving the consent information indicating that the comprehensive consent is granted or the consent information indicating that the account linkage is consented, together with the request.

If the scope registration request is a request for comprehensive consent (OP502: YES), the process proceeds to OP503. If the scope registration request is not a request for comprehensive consent (OP502: NO), the process proceeds to OP506.

OP503 to OP505 are processes when the scope registration request is a request for comprehensive consent. In the OP503, the authorization control unit 32 records "comprehensive consent" in the scope of the authorization information of the target account. The target account can be specified based on the fact that a session is established between the authorization authentication server 3 and the user terminal 5.

In OP504, the authorization control unit 32 newly issues an access token for the target account. The authorization control unit 32 overwrites and updates the access token included in the authorization information of the target account with the issued access token. In the OP505, the authorization control unit 32 transmits the registration success response and the newly issued access token to the user terminal 5. Thereafter, the process illustrated in FIG. 16 is terminated.

In OP506, the authorization control unit 32 determines whether or not the scope registration request is a request for account linkage. If the scope registration request is a request for account linkage (OP506: YES), the process proceeds to OP507. If the scope registration request is not a request for account linkage (OP506: NO), the corresponding process is executed and the process illustrated in FIG. 16 ends.

The process from OP507 to OP510 is a process when the scope registration request is a request for account linkage. In the OP507, the authorization control unit 32 transmits a response and an account linkage consent request requesting to user for consenting new account linkage, to the user terminal 5.

In OP508, the authorization control unit 32 determines whether or not consent information indicating that consent has been obtained for new account linkage with the account linkage destination has been received from the user terminal 5 together with the scope registration request again. When the scope registration request and the consent information are received from the user terminal 5 (OP508: YES), the process proceeds to OP509. For example, when the scope registration request and the consent information are not received from the user terminal 5 even after a predetermined time has elapsed (OP508: NO), the process illustrated in FIG. 16 ends.

In OP509, the authorization control unit 32 records information on a linkage destination for which a new account linkage is set in the scope of the authorization information of the target account. When the new account linkage destination is the service provider 2, identification information and account information of the service provider 2 which is the new account linkage destination are recorded in the scope. When the new account linkage destination is the data holder 4, the identification information of the data holder 4 is recorded in the scope.

In OP 510, the authorization control unit 32 notifies the corresponding service provider 2 of the linkage information regarding the new account linkage. In the service provider 2, the control unit 21 registers the received linkage information in the linkage information DB 22. After that, the process proceeds to OP504, an access token is issued in OP504, a response and an access token are transmitted to the user terminal 5 in OP505, and the process illustrated in FIG. 16 ends.

Figure 17:
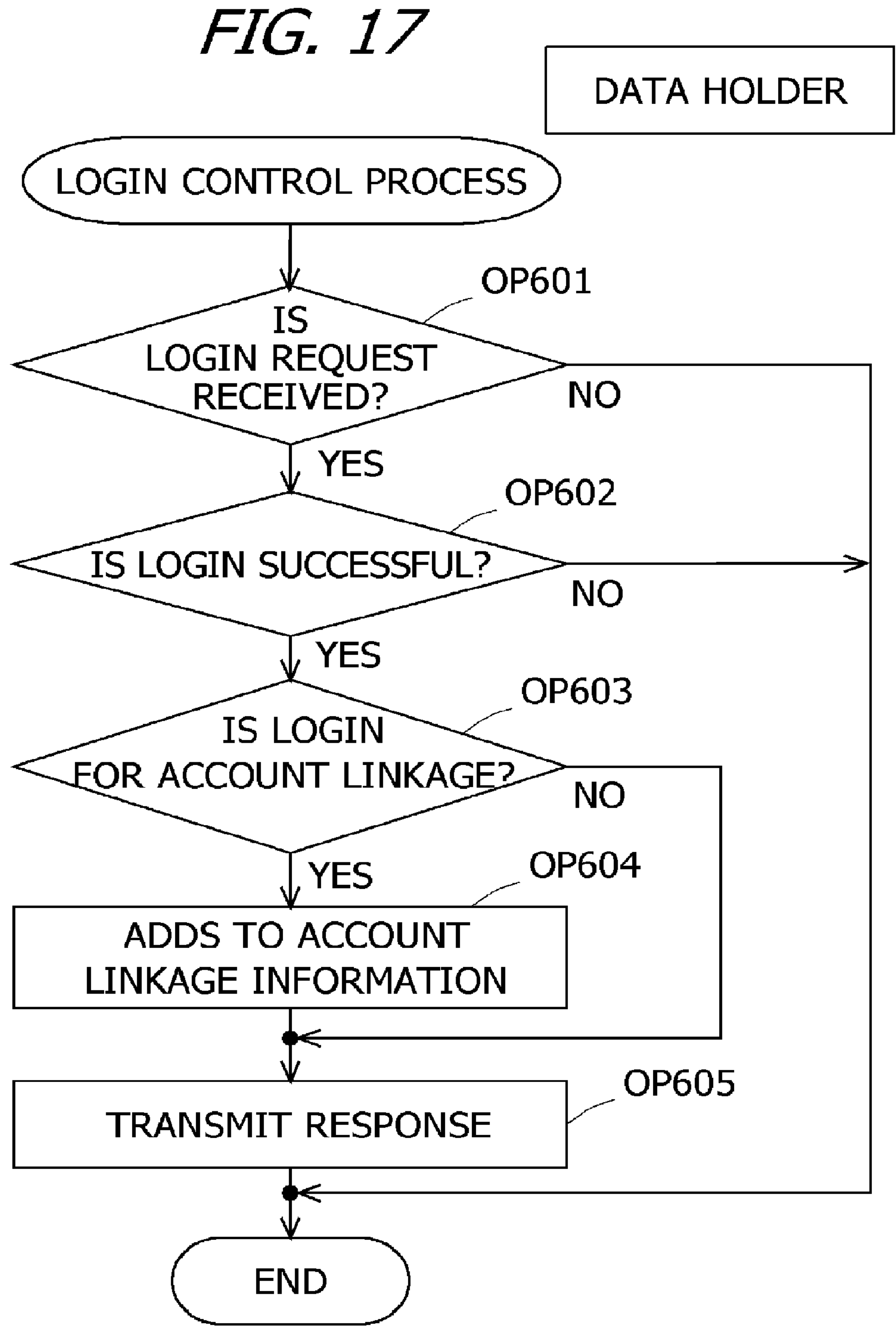
FIG. 17 is an example of a flowchart of a login control process by the data holder.

FIG. 17 is an example of a flowchart of a login control process by the data holder 4. The process illustrated in FIG. 17 is repeatedly executed in a predetermined period, for example. The execution subject of the process illustrated in FIG. 17 is the CPU of the data holder 4, but for convenience, it is explained assuming that the functional component is the execution subject. The similar assumption applies to the flowchart of the processing of the following data holder 4.

In OP601, the login control unit 41 determines whether or not a login request has been received from the user terminal 5. When a login request is received from the user terminal 5 (OP 601: YES), the process proceeds to OP 602. When the login request has not been received from the user terminal 5 (OP 601: NO), the process illustrated in FIG. 17 ends.

In OP602, the login control unit 41 performs authentication using the login information received together with the login request to determine whether or not the login is successful. If the login is successful (OP602: YES), the process proceeds to OP603. When the login fails (OP602: NO), for example, the response of the login failure is transmitted to the user terminal 5, and the process illustrated in FIG. 17 ends.

In OP603, the login control unit 41 determines whether or not the login request received in OP601 is a login request for account linkage. The determination of the OP603 is made based on the contents of the HTTP message received as a login request from the user terminal 5. If it is a login request for account linkage (OP603: YES), the process proceeds to OP604. If it is not a login request for account linkage, that is, it is a normal login request (OP603: NO), the process proceeds to OP605.

In OP604, the login control unit 41 adds account linkage information including association between account information in the data holder 4 and identification information and account information of the base service included in the HTTP message received as a login request to the account linkage information DB 43. In OP605, the login control unit 41 transmits a response indicating successful login to the user terminal 5. Thereafter, the process illustrated in FIG. 17 is terminated.

Figure 18:
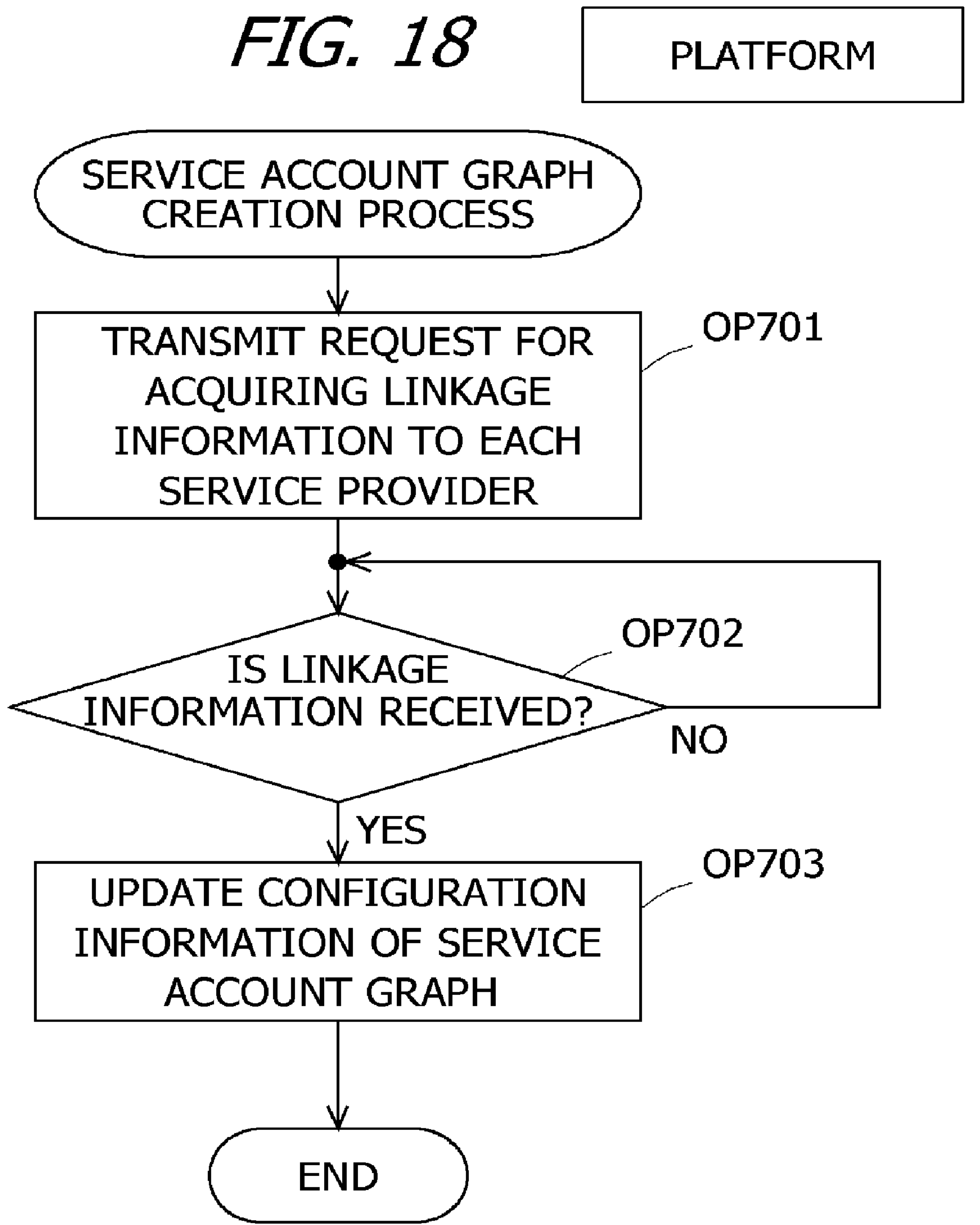
FIG. 18 is an example of a flowchart of a service account graph creation process by the platform.
Figure 19:
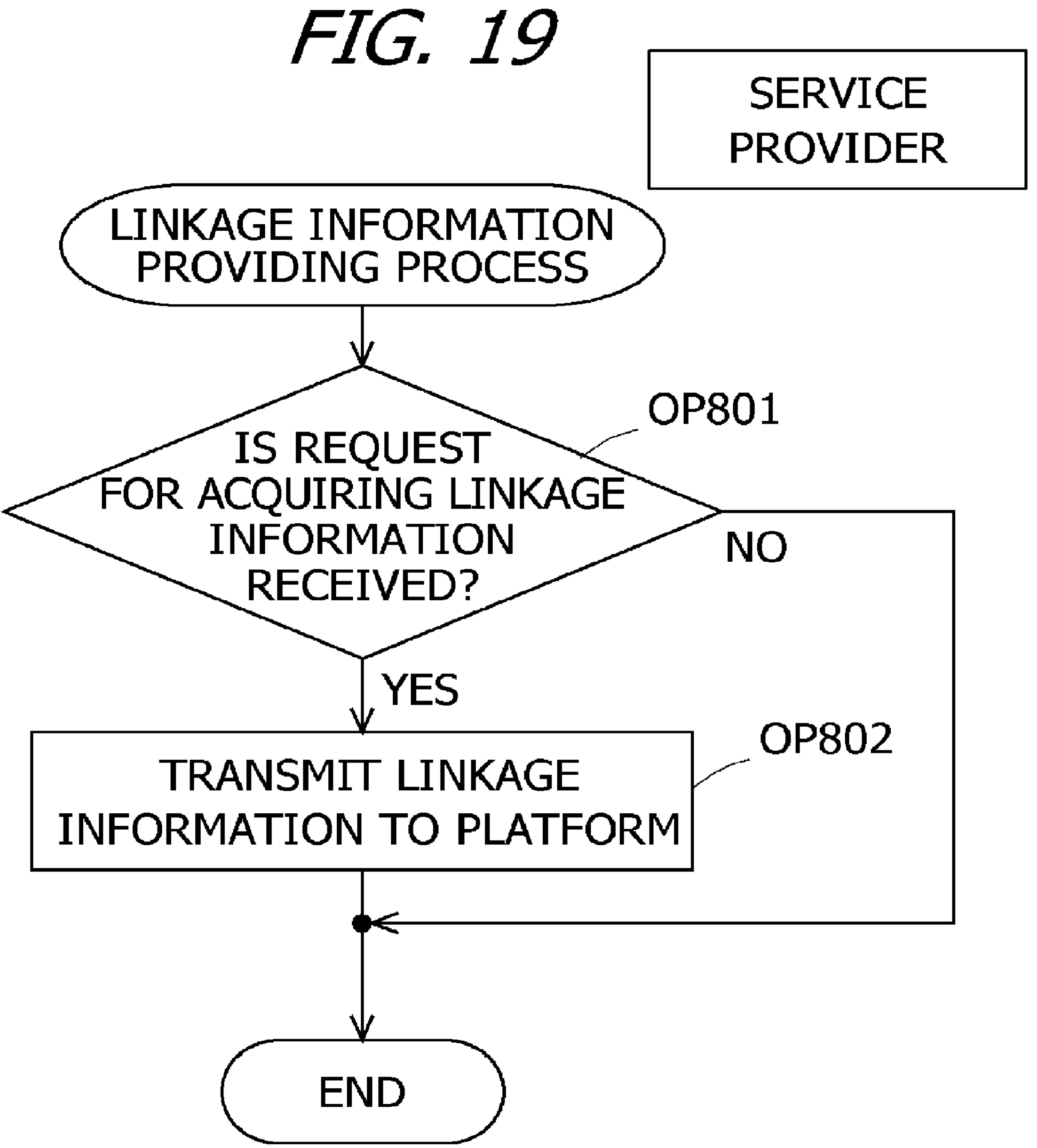
FIG. 19 is an example of a flowchart of a linkage information providing process by the service provider.

Next, FIGS. 18 and 19 are examples of flowcharts of the processes by the platform 1 and the service provider 2 related to the (3) service account graph creation process, respectively. FIG. 18 is an example of a flowchart of the service account graph creation process by the platform 1. The process illustrated in FIG. 18 is repeatedly executed in a predetermined period. The processing period illustrated in FIG. 18 can be arbitrarily set by the administrator of the account linkage system 100, for example, in seconds, minutes, hours, and days. The execution subject of the process illustrated in FIG. 18 is the CPU 101, but for convenience, it is explained assuming that the functional component is the execution subject.

In OP701, the graph management unit 11 transmits a request for acquiring linkage information to each service provider 2. In the OP702, the graph management unit 11 determines whether or not the linkage information is received from all the service providers 2. When the linkage information is received from all the service providers 2 (OP702: YES), the process proceeds to OP703. The graph management unit 11 is in a standby state until the linkage information is received from all the service providers 2.

In OP703, the graph management unit 11 updates, based on the linkage information received from each service provider 2, the configuration information of the service account graph held in the graph information storage unit 13. Thereafter, the process illustrated in FIG. 18 ends. The graph management unit 11 may update the configuration information of the service account graph each time the linkage information is received from each service provider 2 without waiting for the reception of the linkage information from all the service providers 2 in the OP 702.

FIG. 19 is an example of a flowchart of a linkage information providing process by the service provider 2. The process illustrated in FIG. 19 is repeatedly executed in a predetermined period.

In OP801, the control unit 21 determines whether or not a request for acquiring linkage information has been received from the platform 1. When a request for acquiring linkage information is received from the platform 1 (OP801: YES), the process proceeds to OP802. When the request for acquiring the linkage information has not been received from the platform 1 (OP801: NO), the process illustrated in FIG. 19 ends.

In OP802, the control unit 21 reads the linkage information from the linkage information DB 22 and transmits the linkage information to the platform 1. The linkage information transmitted to the platform 1 in the OP 802 may be difference information or may be all linkage information. Thereafter, the process illustrated in FIG. 19 ends.

Figure 20:
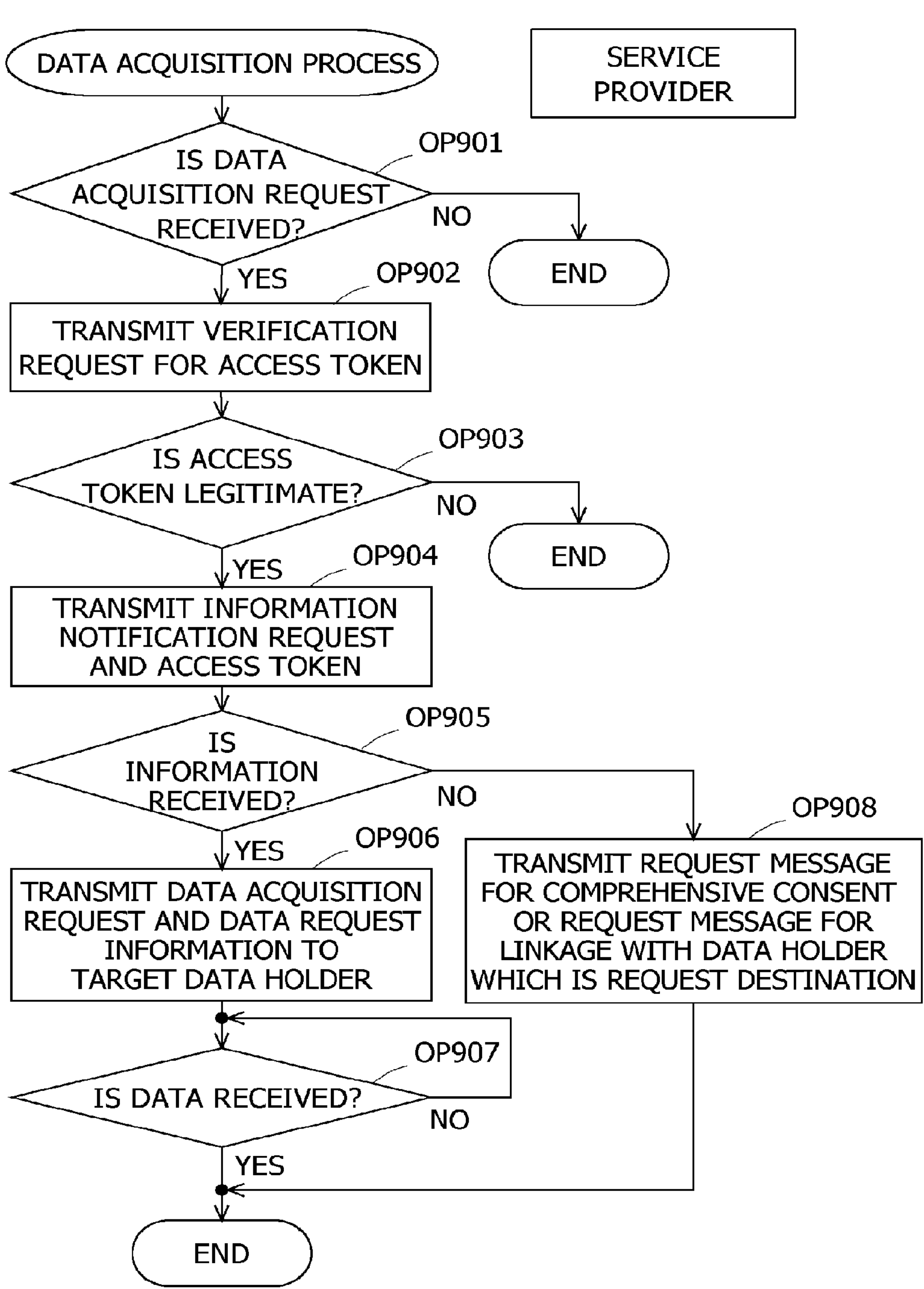
FIG. 20 is an example of a flowchart of a data acquisition process from the data holder by the service provider.
Figure 21:
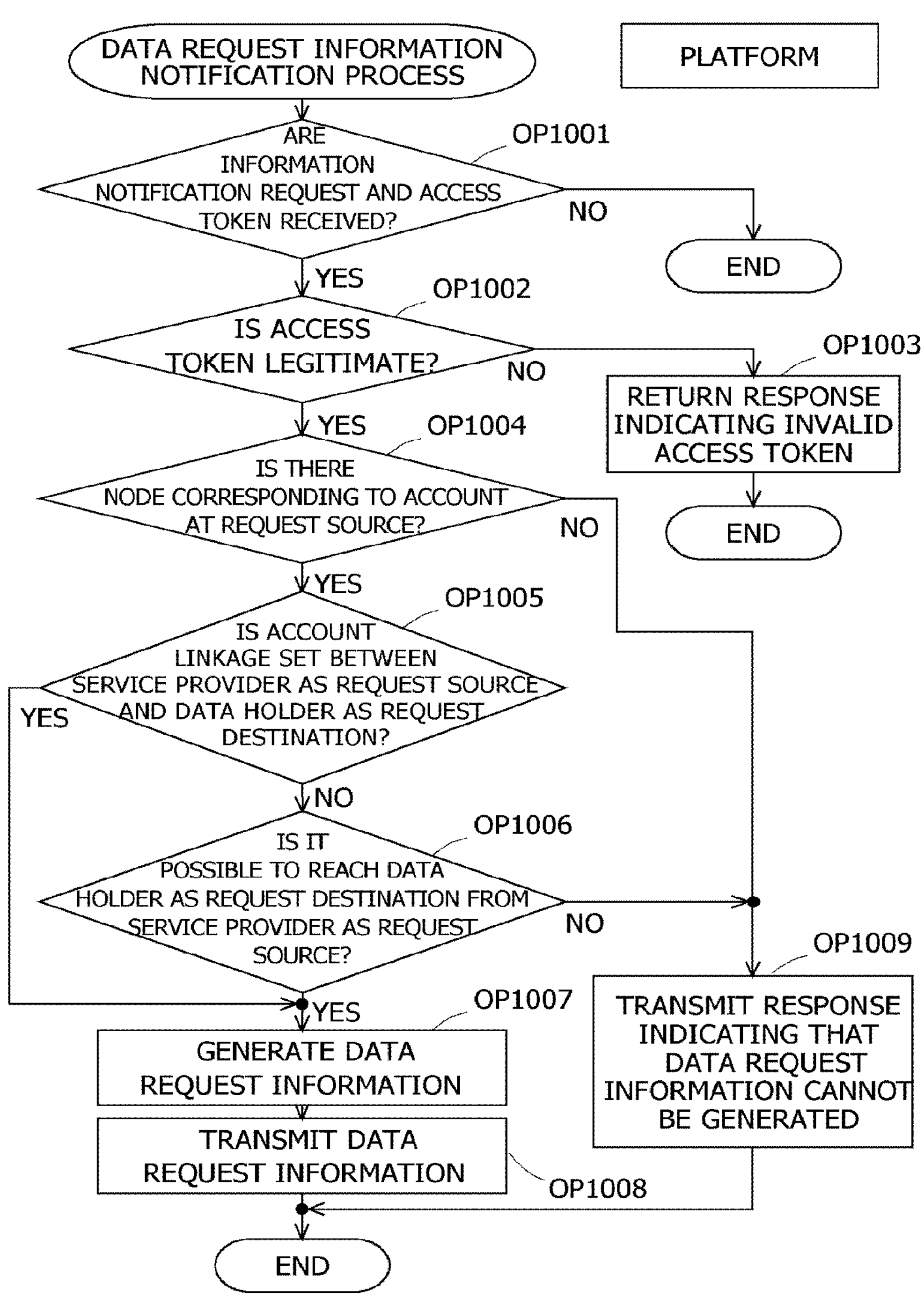
FIG. 21 is an example of a flowchart of a data request information notification process by the platform.
Figure 22:
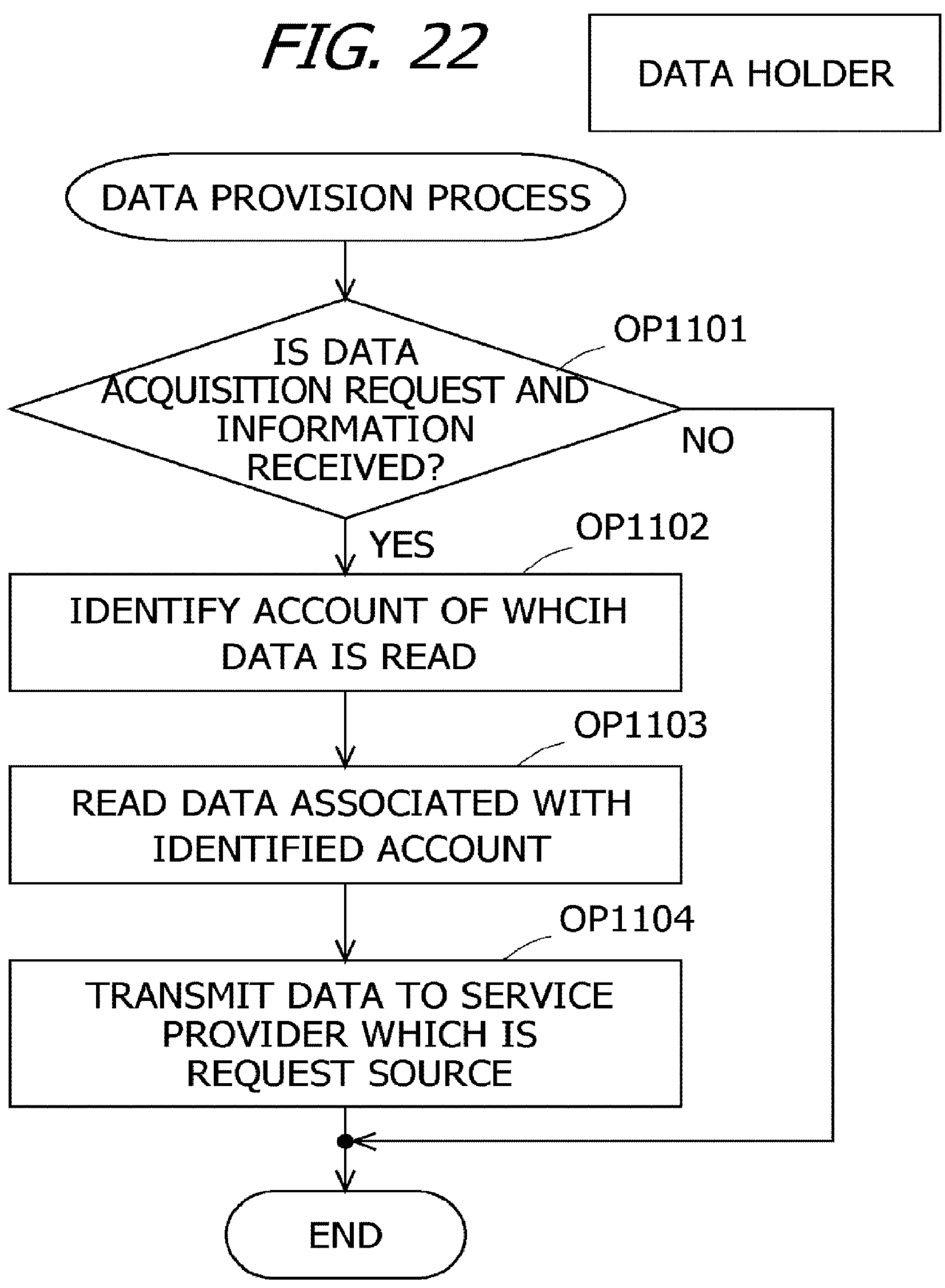
FIG. 22 is an example of a flowchart of a data provision process by the data holder.

Next, FIGS. 20 to 22 are an example of a flowchart of processing of each apparatus related to the (4) data acquisition process. FIG. 20 is an example of a flowchart of a data acquisition process from the data holder 4 by the service provider 2. The process illustrated in FIG. 20 is executed at a predetermined period.

In OP901, the control unit 21 determines whether or not a data acquisition request has been received from the user terminal 5. Together with the data acquisition request, the information of the data request destination and the access token are also received from the user terminal 5. When the data acquisition request is received from the user terminal 5 (OP901: YES), the process proceeds to OP902. When the data acquisition request is not received from the user terminal 5 (OP 901: NO), the process illustrated in FIG. 20 ends.

In OP902, the control unit 21 transmits a verification request together with the access token to the authorization authentication server 3, which is an issuer of the access token. The information of the issuer of the access token is received, for example, accompanying the access token.

In OP903, the control unit 21 receives a response to the verification request from the authorization authentication server 3 that is the issuer of the access token, and determines whether or not the access token is legitimate based on the response. For example, when the authorization information corresponding to the access token is received as a response to the verification request, the control unit 21 determines that the access token is legitimate because the identification information of the service provider 2 itself is included in the scope in the authorization information. If the access token is legitimate (OP903: YES), the process proceeds to OP904. If the access token is not legitimate (OP903: NO), the process illustrated in FIG. 20 ends. At this time, the control unit 21 may return an error to the user terminal 5.

In OP904, the control unit 21 transmits an information notification request to the platform 1. Together with the information notification request, the identification information of the service provider 2 which is the request source, the account information at the service provider 2, the identification information of the data holder 4 which is the request destination of the data, and the access token are also transmitted.

In OP905, the control unit 21 determines whether or not the data request information has been received from the platform 1. If the data request information is received from platform 1 (OP905: YES), the process proceeds to OP906. In the OP906, the control unit 21 transmits the data acquisition request and the data request information to the data holder 4 which is the data request destination. In OP907, the control unit 21 determines whether or not data has been received from the data holder 4 which is the data request destination. When data is received from the data holder 4 which is the data request destination (OP907: YES), the process illustrated in FIG. 20 ends. Predetermined processing is performed by the control unit 21 for the acquired data. The control unit 21 is in a standby state until data is received from the data holder 4 which is the data request destination. For example, when the data is not received from the data holder 4 which is the data request destination even after a predetermined time has elapsed, the control unit 21 may return an error to the user terminal 5.

In the OP905, if the data request information is not received from the platform 1 (OP905: NO), the process proceeds to OP908. The data request information is not received from the platform 1, for example, when the comprehensive consent is not obtained from the corresponding user, or when it is impossible to reach the data holder 4 which is the data request destination by tracing the account linkage from the account at the service provider 2. If the data request information is not received from the platform 1, for example, a response containing information indicating the reason is received from the platform 1.

In OP908, the platform 1 transmits a request message for comprehensive consent for the base service to the user terminal 5 based on the reason why the data request information is not generated, or transmits a message requesting account linkage between the data holder which is the request destination and the service provider 2 or the base service. Thereafter, the process illustrated in FIG. 20 is ended.

FIG. 21 is an example of a flowchart of the data request information notification process by the platform 1. The process illustrated in FIG. 21 is repeatedly executed in a predetermined period, for example.

In OP1001, the information notification unit 12 determines whether or not the information notification request has been received from the service provider 2. Together with the information notification request, the access token, the identification information of the data holder 4 which is the data request destination, the identification information of the service provider 2 which is the data request source, and account information at the service provider 2 which is the data request source are also received. When the information notification request is received (OP1001: YES), the process proceeds to OP1002. When the information notification request has not been received (OP1001: NO), the process illustrated in FIG. 21 ends.

In OP1002, the information notification unit 12 transmits a verification request for the received access token to the authorization authentication server 3, which is the issuer of the received access token, and determines whether or not the access token is legitimate based on the response. For example, when the authorization information corresponding to the access token is received as a response to the verification request, the information notification unit 12 determines that the access token is legitimate because "comprehensive consent" is included in the scope in the authorization information. When the scope in the authorization information does not include "comprehensive consent", the information notification unit 12 determines that the access token is not legitimate. If the access token is legitimate (OP1002: YES), the process proceeds to OP1004.

If the access token is not legitimate (OP1002: NO), the process proceeds to OP1003. In the OP1003, the information notification unit 12 returns a response indicating an invalid access token to the service provider 2. Thereafter, the process illustrated in FIG. 21 is terminated.

In OP1004, the information notification unit 12 determines whether or not there is a node corresponding to the account at the service provider 2 which is the data request source by referring to the graph information storage unit 13. If there is no node corresponding to the account which is the data request source, it is indicated that account linkage is not set for any of other services for the account. If there is a node corresponding to the account which is the data request source (OP1004: YES), the process proceeds to OP1005.

If there is no node corresponding to the account which is the data request source (OP1004: NO), the process proceeds to OP1009. In the OP 1009, the information notification unit 12 transmits a response indicating that the data request information cannot be generated to the service provider 2. Thereafter, the process illustrated in FIG. 21 is terminated.

In OP1005, the information notification unit 12 refers to the service account graph whose base point is the account information at the service provider 2 which is the data request source, and determines whether account linkage is set between the service provider 2 which is the data request source and the data holder 4 which is the data request destination. When the account linkage is set between the service provider 2 which is the data request source and the data holder 4 which is the data request destination (OP1005: YES), the process proceeds to OP1007. When the account linkage is not set between the service provider 2 which is the data request source and the data holder 4 which is the data request destination (OP1005: NO), the process proceeds to OP1006.

In OP1006, the information notifier 12 refers to the service account graph and determines whether or not it is possible to reach the data holder 4 which is the data request destination from the account information at the service provider 2 which is the data request source. When it is possible to reach the data holder 4 which is the data request destination from the account information at the service provider 2 which is the data request source (OP1006: YES), the process proceeds to OP1007. In the OP1007, the information notification unit 12 generates data request information for the service provider 2. In the OP1008, the information notification unit 12 transmits the data request information to the service provider 2. Thereafter, the process illustrated in FIG. 21 is terminated.

When it is not possible to reach the data holder 4 which is the data request destination from the account information at the service provider 2 which is the data request source (OP1006: NO), the process proceeds to OP1009. In the OP 1009, the information notification unit 12 transmits a response indicating that the data request information cannot be generated to the service provider 2. Thereafter, the process illustrated in FIG. 21 is terminated.

FIG. 22 is an example of a flowchart of a data provision process by the data holder 4. The process illustrated in FIG. 22 is repeatedly executed in a predetermined period, for example.

In OP1101, the data providing unit 42 determines whether or not the data acquisition request and the data request information have been received from the service provider 2. If the data acquisition request and the data request information are received (OP1101: YES), the process proceeds to OP1102. When the data acquisition request and the data request information have not been received (OP1101: NO), the process illustrated in FIG. 22 ends.

In OP1102, the data providing unit 42 refers to the account linkage information DB 43 and identifies the account at the data holder 4 associated with the account at the service provider 2 which is the transit service provider included in the received data request information. In the OP 1103, the data providing unit 42 reads data associated with the identified account from the user information DB 44. In the OP 1104, the data providing unit 42 transmits the read data to the service provider 2 which is the request source. Thereafter, the process illustrated in FIG. 22 ends.

All of the processes illustrated in FIGS. 15A to 22 may be appropriately changed according to the embodiment. For example, in FIG. 20, when the service provider 2 receives a data acquisition request from the user terminal 5, the service provider 2 transmits an information notification request to the platform 1. However, when data linkage is set between the data holder 4 which is the data request destination and the service provider 2, the service provider 2 may directly transmit the data acquisition request and the account information of the user at the service provider 2 to the data holder 4 which is the data request destination without sending an information notification request to the platform 1, and may acquire the data from the data holder 4.

Next, a sequence of processing in the account linkage system 100 will be described with reference to FIGS. 23 to 27. In FIGS. 23 to 27, the user agent is described as "UA". The service provider is described as "SP App". The authorization authentication server is described as "SP Auth". The data holder is described as "DH". The platform is described as "PF".

Figure 23:
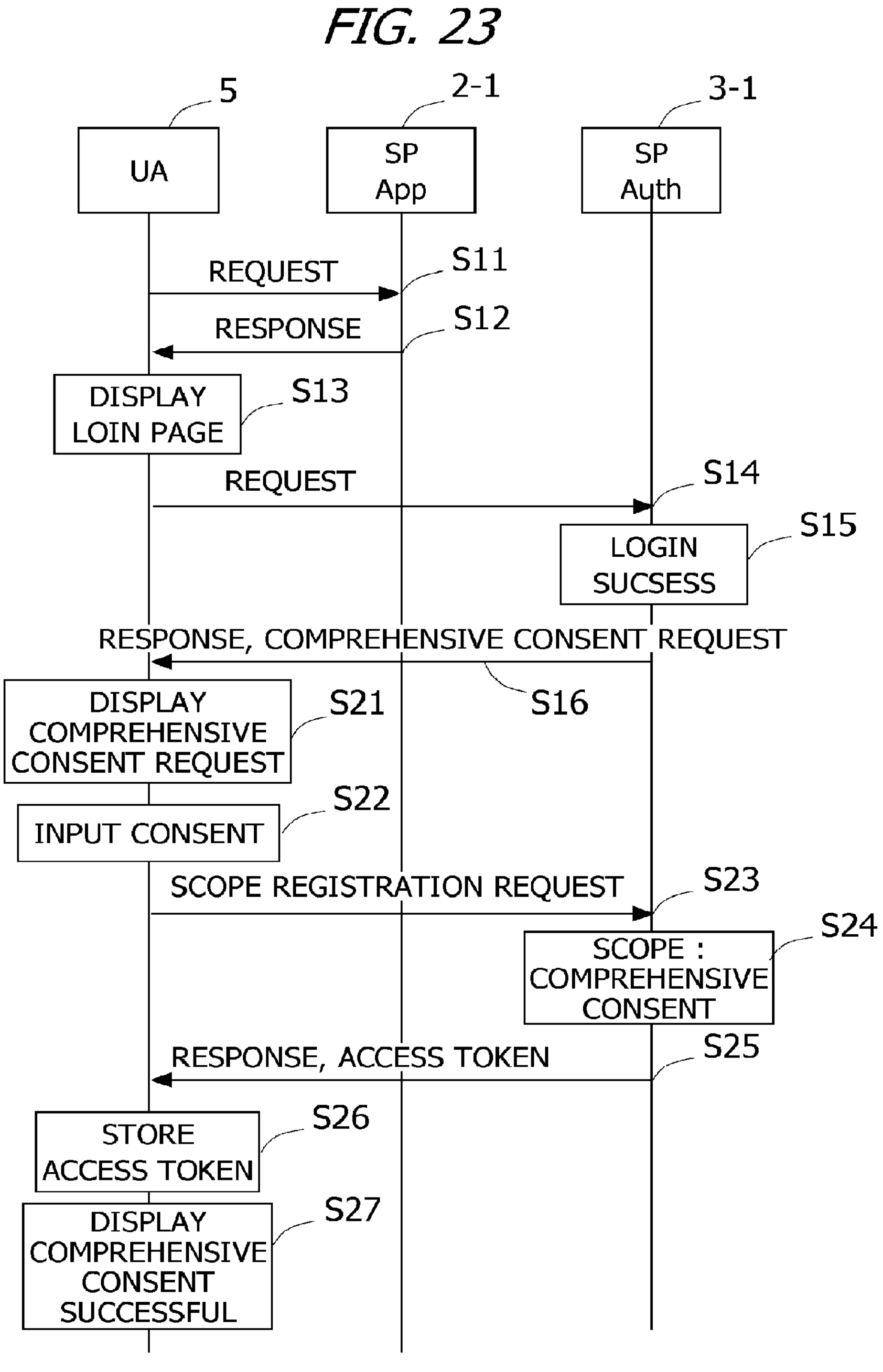
FIG. 23 is a diagram illustrating an example of a sequence in a (1) login and acquisition of comprehensive consent process.

FIG. 23 is a diagram illustrating an example of a sequence in the (1) login and acquisition of comprehensive consent process. In FIG. 23, among the devices included in the account linkage system 100, the user terminal 5, the service provider 2-1, and the authorization authentication server 3-1 are illustrated as devices related to the (1) login and comprehensive consent acquisition process. In FIG. 23, the user terminal 5 logs in to the service of the service provider 2-1 as the base service. In the initial state of FIG. 23, it is assumed that the user of the user terminal 5 does not set account linkage between any of the services.

In S11, the user terminal 5 receives, for example, an input of a user operation to access a web page of a service of the service provider 2-1, and transmits an access request to the service provider 2-1 (OP101 in FIG. 12). In S12, the service provider 2-1 receives the access request from the user terminal 5 and transmits a response including a redirect to a login web page. In S13, the user terminal 5 receives the response (OP102 in FIG. 12) and displays the login page (OP103 in FIG. 12).

In S14, the user terminal 5 receives an input of a login operation from the user (OP104: YES in FIG. 12) and sends a login request to the authorization authentication server 3-1 (OP105 in FIG. 12). Along with the login request, login information is also sent to the authorization authentication server 3-1. In S15, the authorization authentication server 3-1 receives the login request from the user terminal 5 (OP301: YES in FIG. 14) and performs authentication. As a result, the user of the user terminal 5 successfully logs in to the base service (OP302: YES in FIG. 14). In FIG. 23, it is assumed that the login is a normal login (OP303: NO in FIG. 14), and that no comprehensive consent has been obtained for the account of the user terminal 5 (OP305: NO in FIG. 14). Therefore, in S16, the authorization authentication server 3-1 transmits a comprehensive consent request to the user terminal 5 together with a response indicating successful login (OP306 in FIG. 14).

In S21, the user terminal 5 receives the response indicating successful login from the authorization authentication server 3-1 and the comprehensive consent request (OP106: YES, OP107: YES in FIG. 12), and displays a message requesting comprehensive consent to the user on the display (OP201 in FIG. 13). In S22, the user terminal 5 receives an input of a user operation that allows comprehensive consent (OP202: YES in FIG. 13). In S23, the user terminal 5 transmits a scope registration request for comprehensive consent to the authorization authentication server 3-1 (OP203 in FIG. 12). Along with the scope registration request, consent information indicating that comprehensive consent has been obtained is also transmitted to the authorization authentication server 3-1.

In S24, the authorization authentication server 3-1 receives the scope registration request for the comprehensive consent from the user terminal 5 (OP307: YES in FIG. 14, OP501: YES in FIG. 16, OP502: YES in FIG. 16), and records the "comprehensive consent" in the scope of the authorization information corresponding to the account of the user of the user terminal 5 (OP503 in FIG. 16). In S25, the authorization authentication server 3-1 issues an access token to the account of the user of the user terminal 5 (OP504 in FIG. 16), and transmits a registration success response and the access token to the user terminal 5 (OP505 in FIG. 16).

In S26, the user terminal 5 receives the response and the access token from the authorization authentication server 3-1 (OP204 in FIG. 13) and stores the access token (OP205 in FIG. 13). In S27, the user terminal 5 displays a message indicating the success of the comprehensive consent on the screen (OP206 in FIG. 13).

Figure 24:
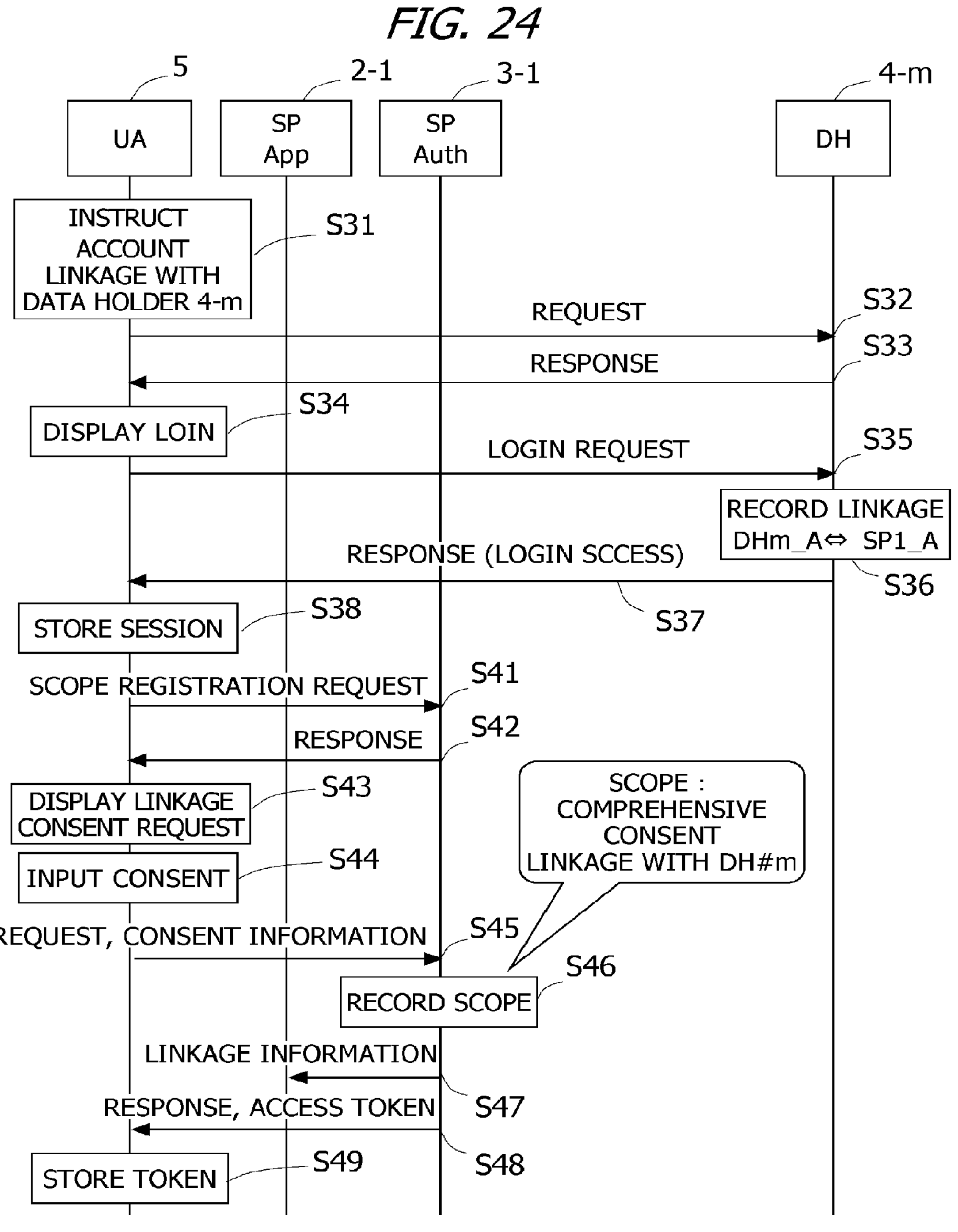
FIG. 24 is an example of a sequence of processes related to setting of account linkage between the service provider and the data holder.
Figure 25:
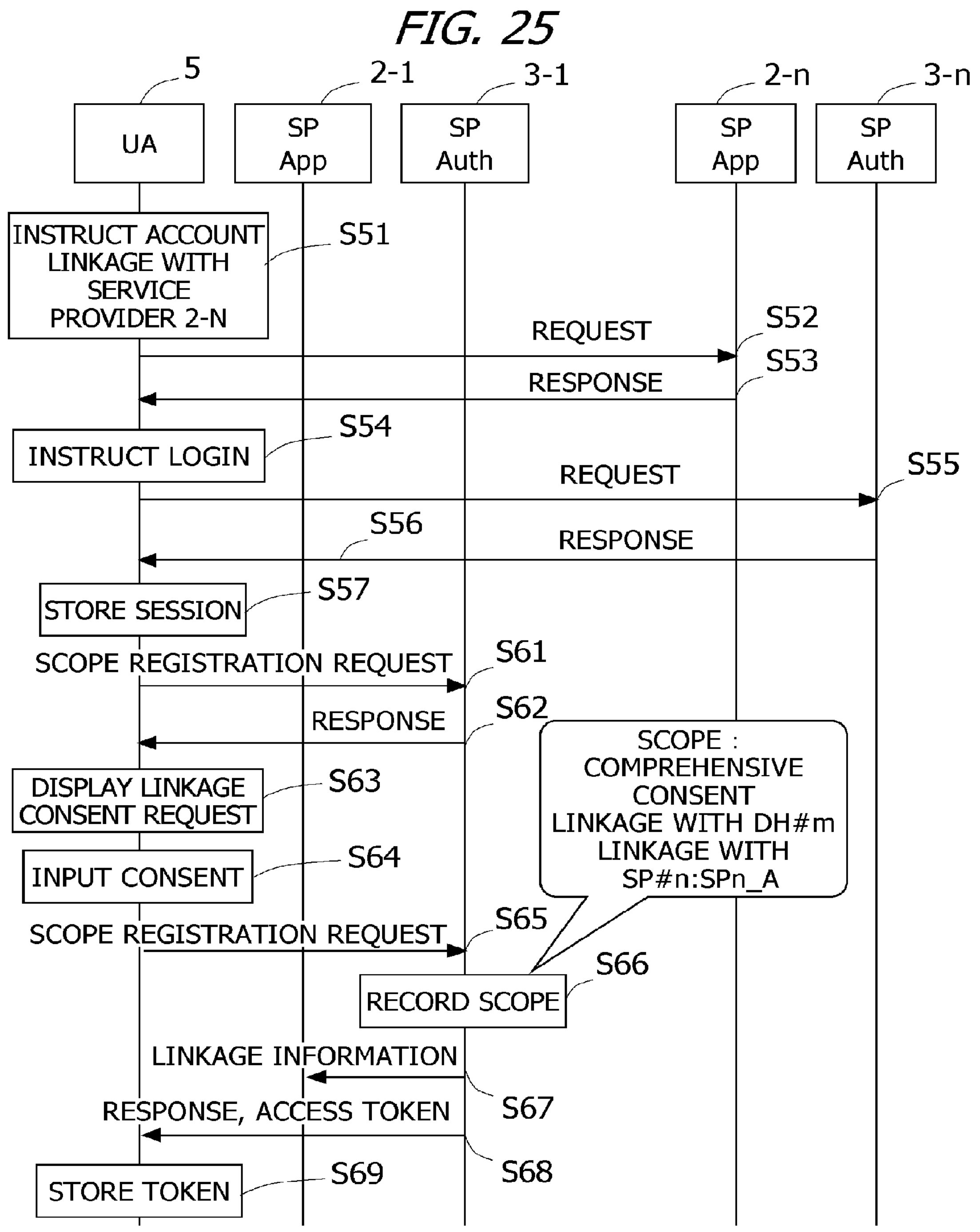
FIG. 25 is an example of a sequence of processes related to the setting of account linkage between the service providers.

FIG. 24 and FIG. 25 are diagrams illustrating an example of a sequence of the (2) account linkage process, respectively. FIG. 24 is an example of a sequence of processes related to the setting of account linkage between the service provider 2-1 and the data holder 4-*m*. In FIG. 24, the user terminal 5, the service provider 2-1, the authorization authentication server 3-1, and the data holder 4-*m* related to the setting of account linkage between the service provider 2-1 and the data holder 4-*m* are illustrated.

In S31, the user terminal 5 receives an input of a user operation indicating an instruction for account linkage with the data holder 4-*m* (OP401: YES in FIG. 15A). In S32, the user terminal 5 transmits an access request to the data holder 4-*m* (OP402 in FIG. 15A). In S33, the data holder 4-*m* receives the access request from the user terminal 5 and transmits a response including a redirect to a login page to the user terminal 5.

In S34, the user terminal 5 receives the response from the data holder 4-*m* (OP403 in FIG. 15A) and displays the login page to the data holder 4-*m* (OP404 in FIG. 15A). In S35, the user terminal 5 receives an input of a login operation from the user (OP405: YES in FIG. 15A) and sends a login request to the data holder 4-*m* (OP406 in FIG. 15A). Login information is also sent to the data holder 4-*m* along with the login request.

In S36, the data holder 4-*m* receives the login request from the user terminal 5 (OP601: YES in FIG. 17) and performs authentication. As a result, the user of the user terminal 5 successfully logs in to the data holder 4-*m* (OP602: YES in FIG. 17). Since the login is a login for account linkage (OP603: YES in FIG. 17), the data holder 4-*m* adds an association between the account of the user at the data holder 4-*m* ("DHm_A" in the figure) and the account of the user at the service provider 2-1 ("SP1_A" in the figure) to the account linkage information DB 43 (OP604 in FIG. 17). In S37, the data holder 4-*m* sends a response indicating a successful login to the user terminal 5 (OP605 in FIG. 17). In S38, the user terminal 5 receives, from the data holder 4-*m*, the response indicating successful login and saves the session (OP407: YES in FIG. 15A).

In S41, the user terminal 5 sends a scope registration request for account linkage to the authorization authentication server 3-1 (OP408 in FIG. 15B). In S42, the authorization authentication server 3-1 receives the scope registration for account linkage from the user terminal 5 (OP501: YES, OP502: NO, OP503: YES in FIG. 16), and transmits a response to the user terminal 5 (OP507 in FIG. 16). In addition to the response, an account linkage consent request requesting the user to consent for the new account linkage is also sent to the user terminal 5.

In S43, the user terminal 5 receives the response and the account linkage consent request from the authorization authentication server 3-1 (OP409 in FIG. 15B), and displays a message requesting consent for account linkage with the data holder 4-*m* (OP410 in FIG. 15B). In S44, the user terminal 5 receives input of a user operation consenting to the new account linkage with the data holder 4-*m* (OP411: YES in FIG. 15B). In S45, the user terminal 5 transmits a scope registration request and consent information indicating that consent has been obtained for account linkage with the data holder 4-*m* to the authorization authentication server 3-1 (OP412 in FIG. 15B). To the authorization authentication server 3-1, along with the scope registration request, identification information of the data holder 4-*m*, which is the access linkage destination, is also transmitted.

In S46, the authorization authentication server 3-1 receives the consent information indicating that consent has been obtained for account linkage with the data holder 4-*m* from the user terminal 5 (OP508 in FIG. 16), and records the identification information of the data holder 4-*m* in the scope of the authorization information of the account of the user the user terminal 5 (OP509 in FIG. 16). In S47, the authorization authentication server 3-1 notifies the service provider 2-1 of linkage information including association between the account of the user of the user terminal 5 at the service provider 2-1 and the identification information of the data holder 4-*m* (OP510 in FIG. 16). The service provider 2-1 stores the received linkage information in the linkage information DB 22.

In S48, the authorization authentication server 3-1 issues an access token for the account of the user of the user terminal 5 (OP504 in FIG. 16) and transmits it to the user terminal 5 with a response indicating successful registration (OP505 in FIG. 16). The authorization authentication server 3-1 overwrites and stores the access token in the authorization information of the account of the user of the user terminal 5. In S49, the user terminal 5 receives the access token together with the response indicating successful registration from the authorization authentication server 3-1 (OP413 in FIG. 15B), and overwrites and saves the access token (OP414 in FIG. 15B). The similar processing as the sequence illustrated in FIG. 24 is performed for account linkage between the service provider 2-1 and another data holder 4.

FIG. 25 is an example of a sequence of processes related to the setting of account linkage between the service provider 2-1 and the service provider 2-*n*. In FIG. 25, the user terminal 5, the service provider 2-1, the authorization authentication server 3-1, the service provider 2-*n*, and the authorization authentication server 3-*n* are illustrated in relation to the setting of account linkage between the service provider 2-1 and the service provider 2-*n*.

In S51, the user terminal 5 receives an input of a user operation indicating an instruction for account linkage with the service provider 2-*n* (OP401: YES in FIG. 15A). In S52, the user terminal 5 transmits an access request to the service provider 2-*n* (OP402 in FIG. 15A). In S53, the service provider 2-*n* receives the access request from the user terminal 5 and transmits a response including a login page to the user terminal 5.

In S54, the user terminal 5 receives a response from the service provider 2-*n* (OP403 in FIG. 15A) and displays the login page to the service provider 2-*n* (OP404 in FIG. 15A). In S55, the user terminal 5 receives an input of a login operation from the user (OP405: YES in FIG. 15A) and sends a login request to the authorization authentication server 3-*n* (OP406 in FIG. 15A). Login information is also sent to the authorization authentication server 3-*n* along with the login request.

In S56, the authorization authentication server 3-*n* receives the login request from the user terminal 5 (OP301: YES in FIG. 14) and performs authentication. As a result, the user of the user terminal 5 successfully logs in to the service provider 2-*n* (OP302: YES in FIG. 14). Since the login is a login for account linkage (OP 303: YES in FIG. 14), the service provider 2-*n* transmits a response indicating a successful login to the user terminal 5 (OP 304 in FIG. 14). In S57, the user terminal 5 receives the response indicating successful login from the service provider 2-*n* and saves the session (OP407: YES in FIG. 15A).

In S61, the user terminal 5 transmits a scope registration request for account linkage to the authorization authentication server 3-1 (OP408 in FIG. 15B). In S62, the authorization authentication server 3-1 receives the scope registration for account linkage from the user terminal 5 (OP501: YES, OP502: NO, OP503: YES in FIG. 16), and transmits a response to the user terminal 5 (OP507 in FIG. 16). In addition to the response, an account linkage consent request requesting the user to consent for the new account linkage is also sent to the user terminal 5.

In S63, the user terminal 5 receives the response and the account linkage consent request from the authorization authentication server 3-1 (OP409 in FIG. 15B), and displays a message requesting consent for account linkage with the service provider 2-*n* (OP410 in FIG. 15B). In S64, the user terminal 5 receives input of a user operation consenting to the new account linkage with the service provider 2-*n* (OP411: YES in FIG. 15B). In S65, the user terminal 5 transmits a scope registration request and consent information indicating that consent has been obtained for account linkage with the service provider 2-*n* to the authorization authentication server 3-1 (OP 412 in FIG. 15B). Along with the scope registration request, identification information of the service provider 2-*n*, which is the access linkage destination, and account information at the service provider 2-*n* are also transmitted to the authorization authentication server 3-1.

In S66, the authorization authentication server 3-1 receives the consent information indicating that consent has been obtained for account linkage with the service provider 2-*n* from the user terminal 5 (OP508 in FIG. 16), and records the identification information of the service provider 2-*n* and the account information at the service provider 2-*n* in the scope of the authorization information of the account of the user of the user terminal 5 (OP509 in FIG. 16). In S67, the authorization authentication server 3-1 notifies the service provider 2-1 of linkage information including association between the account of the user of the user terminal 5 at the service provider 2-1, the identification information of the service provider 2-*n*, and the account of the user at the service provider 2-*n* (OP510 in FIG. 16). The service provider 2-1 stores the received linkage information in the linkage information DB 22.

In S68, the authorization authentication server 3-1 issues an access token for the account of the user of the user terminal 5 (OP504 in FIG. 16) and transmits it to the user terminal 5 with a response indicating successful registration (OP505 in FIG. 16). The authorization authentication server 3-1 overwrites and stores the access token in the authorization information of the account of the user of the user terminal 5. In S69, the user terminal 5 receives the access token from the authorization authentication server 3-1 together with the response indicating successful registration (OP413 in FIG. 15B), and overwrites and saves the access token (OP414 in FIG. 15B). The similar processing as the sequence illustrated in FIG. 25 is performed for account linkage between the service provider 2-1 and another service provider 2.

Figure 26:
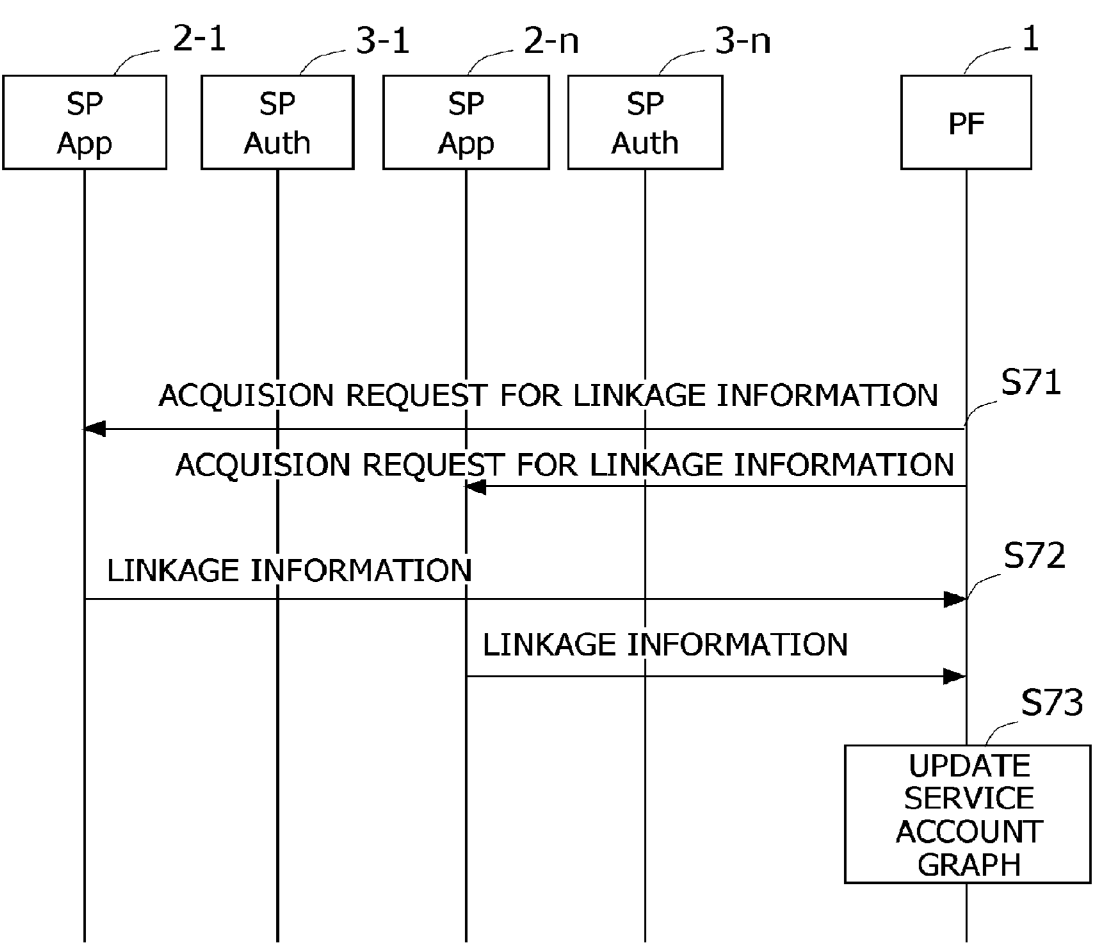
FIG. 26 is a diagram illustrating an example of a sequence in a (3) service account graph creation process.

FIG. 26 is a diagram illustrating an example of a sequence in the (3) service account graph creation process. In FIG. 26, among the devices included in the account linkage system 100, the service provider 2-1, the authorization authentication server 3-1, the service provider 2-*n*, the authorization authentication server 3-*n*, and the platform 1 are illustrated as devices related to the (3) service account graph creation process.

In S71, the platform 1 transmits a request for acquiring linkage information to each service provider 2 (OP701 in FIG. 18). In S72, each service provider 2 receives the request for acquiring linkage information from the platform 1 (OP801: YES in FIG. 19), and transmits the holding linkage information to the platform 1 (OP802 in FIG. 19). In S73, the platform 1 receives the linkage information from each service provider 2 (OP702: YES in FIG. 18), and updates the configuration information of the service account graph based on the linkage information received from each service provider 2 (OP703 in FIG. 18).

Figure 27:
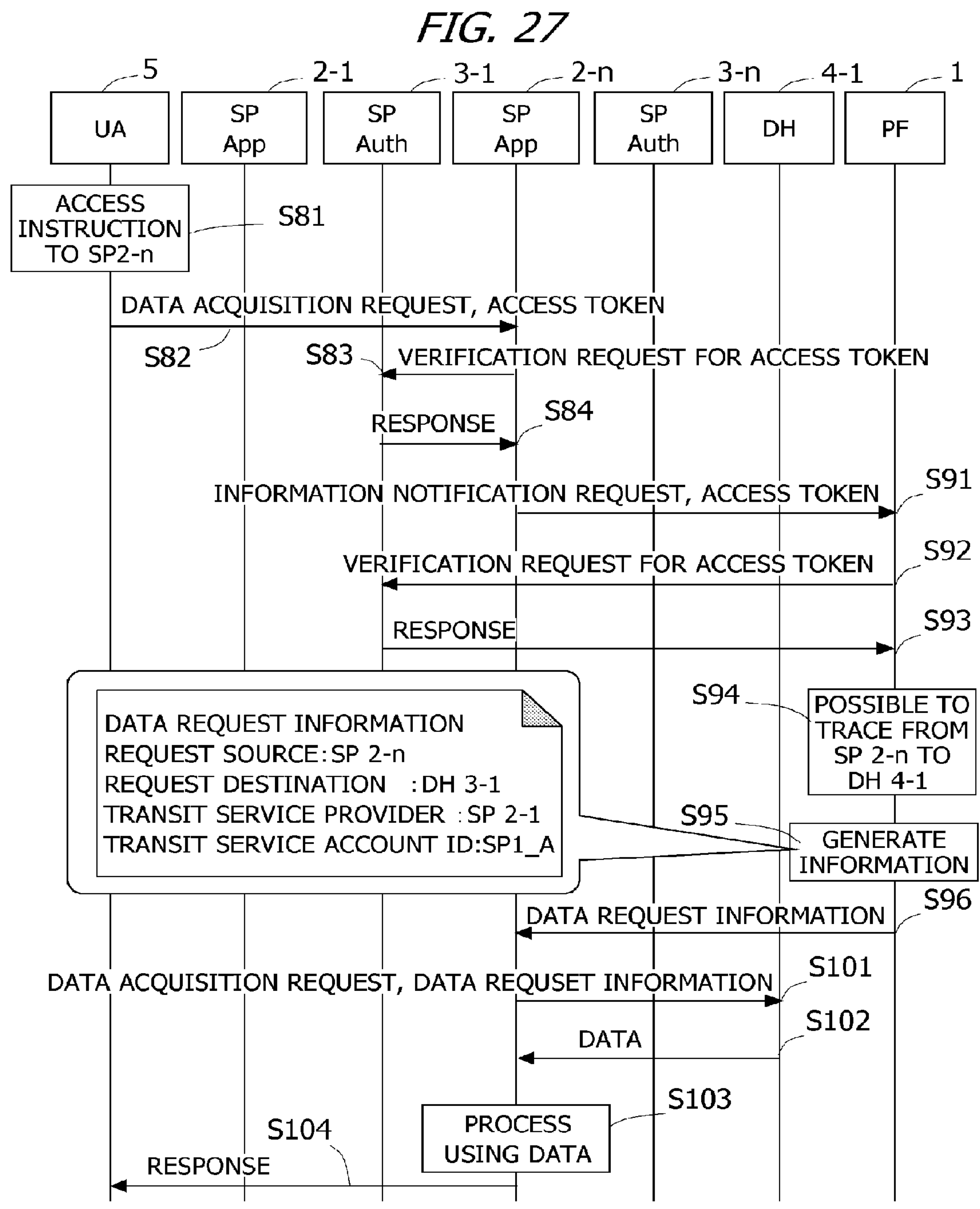
FIG. 27 is a diagram illustrating an example of a sequence in a (4) data acquisition process.

FIG. 27 is a diagram illustrating an example of a sequence in the (4) data acquisition process. In FIG. 27, among the devices included in the account linkage system 100, the user terminal 5, the service provider 2-1, the authorization authentication server 3-1, the service provider 2-*n*, the authorization authentication server 3-*n*, the data holder 4-1, and the platform 1 are illustrated as devices related to the (4) data acquisition process. In FIG. 27, it is explained as an example that the service provider 2-*n* acquires the data held by the data holder 4-1. In FIG. 27, it is assumed that the user terminal 5 is logging in to the service provider 2-1 as the base service. In FIG. 27, it is assumed that an account linkage exists between the service provider 2-1 and the data holder 4-1 for the user of the user terminal 5. In FIG. 27, it is assumed that an account linkage exists between the service provider 2-1 and the service provider 2-*n* for the user of the user terminal 5. In FIG. 27, it is assumed that there is no account linkage between the service provider 2-*n* and the data holder 4-1 for the user of the user terminal 5.

In S81, the user terminal 5 receives, for example, input of a user operation of an instruction for acquiring data of a user of the user terminal 5 held by the data holder 4-1 to the service provider 2-*n*. In S82, the user terminal 5 transmits a data acquisition request and an access token for an account of a user of the user terminal 5 at the service provider 2-1 to the service provider 2-*n*.

In S83, the service provider 2-*n* receives the data acquisition request from the user terminal 5 (OP901: YES in FIG. 20) and transmits a verification request for the access token received from the user terminal 5 to the authorization authentication server 3-1 which is the issuer (OP902 in FIG. 20). In S84, the authorization authentication server 3-1 receives the verification request for the access token from the service provider 2-*n*, and transmits the authorization information corresponding to the access token to the service provider 2-*n* as a response.

In S91, since the service provider 2-*n* determines that the scope of the authorization information received from the authorization authentication server 3-1 includes the identification information of the service provider 2-*n* itself and that the access token is legitimate (OP903: YES in FIG. 20), the service provider 2-*n* transmits the information notification request and the access token of the user of the user terminal 5 to the platform 1 (OP904 in FIG. 20). Along with the information notification request, the identification information of the service provider 2-*n* which is the request source, the account information at the service provider 2-*n*, and the identification information of the data holder 4-1 which is the data request destination are also transmitted.

In S92, the platform 1 receives an information notification request from the service provider 2-*n* (OP1001: YES in FIG. 21), and transmits a verification request to the authorization authentication server 3-1 which is the issuer for the received access tokens together with the information notification request. In S93, the authorization authentication server 3-1 receives the verification request for an access token for an account of a user terminal 5 at the service provider 2-1 from the platform 1, and transmits the authorization information corresponding to the account to the platform 1.

In S94, the platform 1 determines that the access token is legitimate because "comprehensive consent" is recorded in the scope of the authorization information received from the authorization authentication server 3-1 (OP1004: YES in FIG. 21). In the service account graph of which the base point is the account at the service provider 2-*n* that is the data request source, the platform 1 determines that it is possible to trace from the account at the service provider 2-*n* which is the data request destination to the data holder 4-1 which is the data request destination (OP1006: YES in FIG. 21).

In S95, the platform 1 generates data request information (OP1007 in FIG. 22). The data request information at this time includes the identification information of the service provider 2-*n* as the request source, the identification information of the data holder 4-1 as the request destination, the identification information of the service provider 2-1 as the transit service provider, and the account ID of the user terminal 5 of the user at the service provider 2-1 as the transit service account ID. In S96, the platform 1 transmits the data request information to the service provider 2-*n* (OP1008 in FIG. 21).

In S101, the service provider 2-*n* receives the data request information from the platform 1 (OP905: YES in FIG. 20) and transmits the data acquisition request and the data request information to the data holder 4-1 (OP906 in FIG. 20). In S102, the data holder 4-1 receives the data acquisition request and the data request information from the service provider 2-*n* (OP1201: YES in FIG. 22). The data holder 4-1 identifies the account at the data holder 4-1 corresponding to the transit service account ID included in the data request information (OP1102 in FIG. 22), reads out the data associated with the identified account (OP1103), and transmits the data to the service provider 2-*n* (OP1104 in FIG. 22).

In S103, the service provider 2-*n* receives data from the data holder 4-1 (OP907: YES in FIG. 20), and executes a predetermined process using the data. In S104, the service provider 2-*n* transmits the result of the processing as a response to the user terminal 5.

Operations and Effects of the First Embodiment

According to the first embodiment, even if there is no account linkage between the service provider 2 and the data holder 4, if there are account linkage between any other service provider 2 and the data holder 4 and between the other service provider 2 and the service provider 2, the service provider 2 can acquire data of the user to which the account is linked from the data holder 4. As a result, it is possible to reduce the number of executions of account linkage setting operations between the service providers 2 and between the service provider 2 and the data holder 4 by the user. In addition, by reducing the number of executions of account linkage setting operations between the service providers 2 and between the service providers 2 and the data holder 4, the usage band of the communication in the account linkage system 100 related to the account linkage setting can be reduced. Further, in each service provider 2, each authorization authentication server 3, and each data holder 4, it is possible to reduce the amount of use of a storage area such as an auxiliary storage device for storing information related to account linkage.

In the first embodiment, the platform 1 collects account information from each service provider 2 at a service in which account linkage is set as linkage information. When the service provider 2 acquires data from the data holder 4, the data request information includes the account information at the service provider 2 which is the request source and the account information at the transit service provider which is the transit service account ID, and is exchanged among the platform 1, the service provider 2, and the data holder 4. OpenID Connect, etc. stipulates that the account ID, which is one of the account information, is not personal information. Therefore, according to the first embodiment, the accounts can be linked between different services without disclosing the personal information of the user.

According to the first embodiment, the service provider 2 and the data holder 4 can participate in the account linkage system 100 while maintaining the account management mechanism originally used. As a result, more service providers 2 and data holders 4 can participate in the account linkage system 100 on a scale-free basis.

In the first embodiment, even if the user holds a plurality of accounts at one service, by the user performing account linkage setting operation for each account, the similar operations and effect is obtained.

Second Embodiment

The account linkage system 100 according to the first embodiment is a central management system in which the platform 1 collects linkage information of each service provider 2 and manages the service account graph. Instead, the account linkage system 100B according to the second embodiment is a distributed management system in which each service provider 2 and each data holder 4 manage a service account graph, respectively. In the second embodiment, the description common to the first embodiment is omitted.

Figure 28:
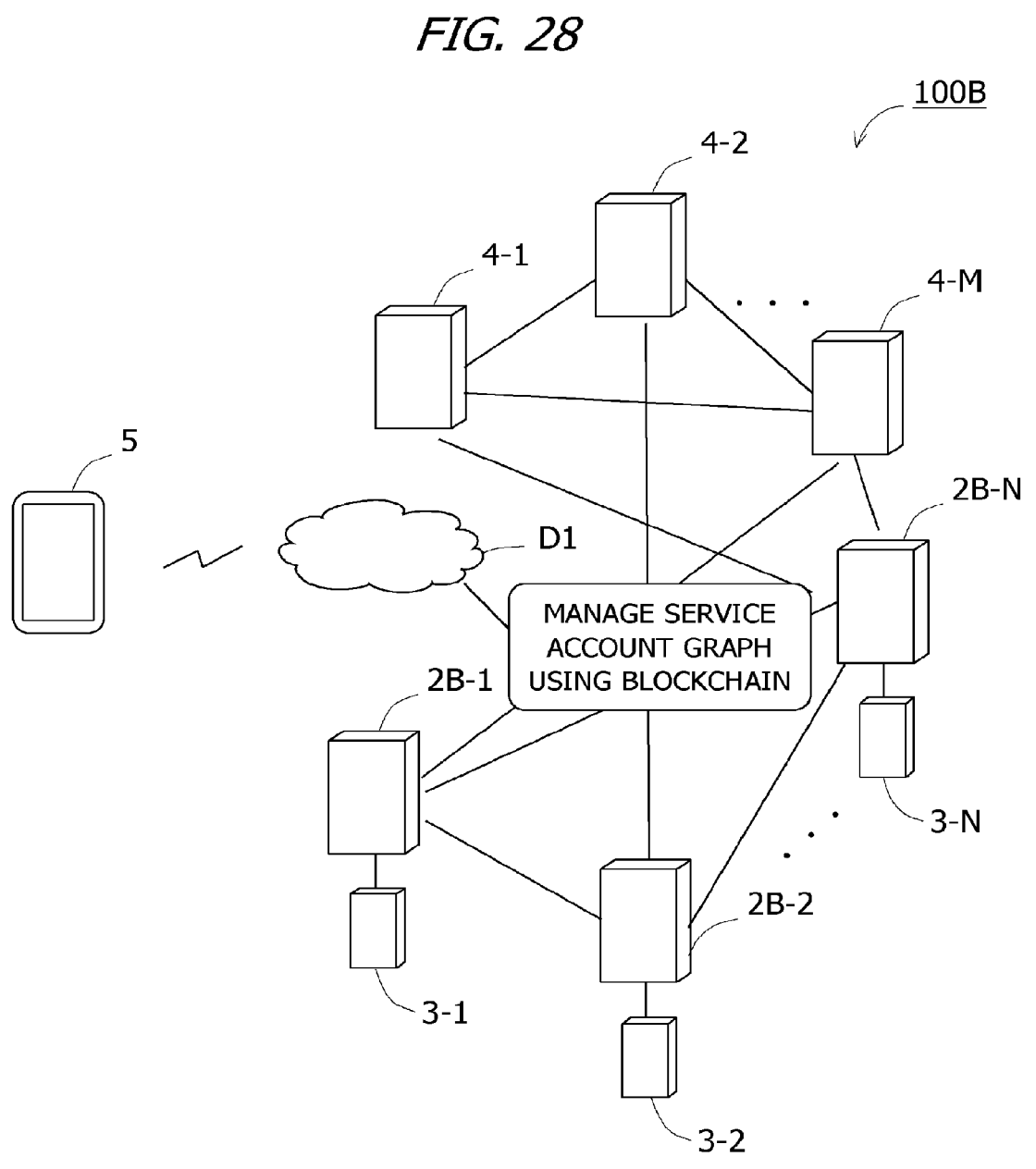

FIG. 28 is a diagram illustrating an example of a system configuration of the account linkage system 100B according to the second embodiment. Unlike the account linkage system 100 according to the first embodiment, the account linkage system 100B does not include the platform 1, but includes a plurality of service providers 2B and authorization authentication servers 3, and a plurality of data holders 4. In the second embodiment, it is assumed that each service provider 2B has the function of the platform 1 according to the first embodiment, manages the service account graph, generates data request information, and notifies. The service provider 2B manages the service account graph using, for example, an algorithm of the blockchain. In the second embodiment, the service provider 2B is an example of an "information processing apparatus" including a "processor".

In the second embodiment, the (1) login and comprehensive consent acquisition process, and the (2) account linkage process are the similar as in the first embodiment. In the second embodiment, the (3) service account graph creation process is a process in which the service provider 2B creates a block including the configuration information of the service account graph based on the linkage information of the account linkage when the account linkage is newly set between the services, and shares the block between the service providers 2B. In the second embodiment, in the (4) data acquisition process, each service provider 2B restores the configuration information of the service account graph from the block, creates a service account graph, and generates and notifies the data request information to be used by itself based on the service account graph. In the second embodiment, the configuration of the service account graph, the determination method of whether or not the data request information can be generated, the content of the data request information, and the usage method are the similar as those in the first embodiment.

Figure 29:
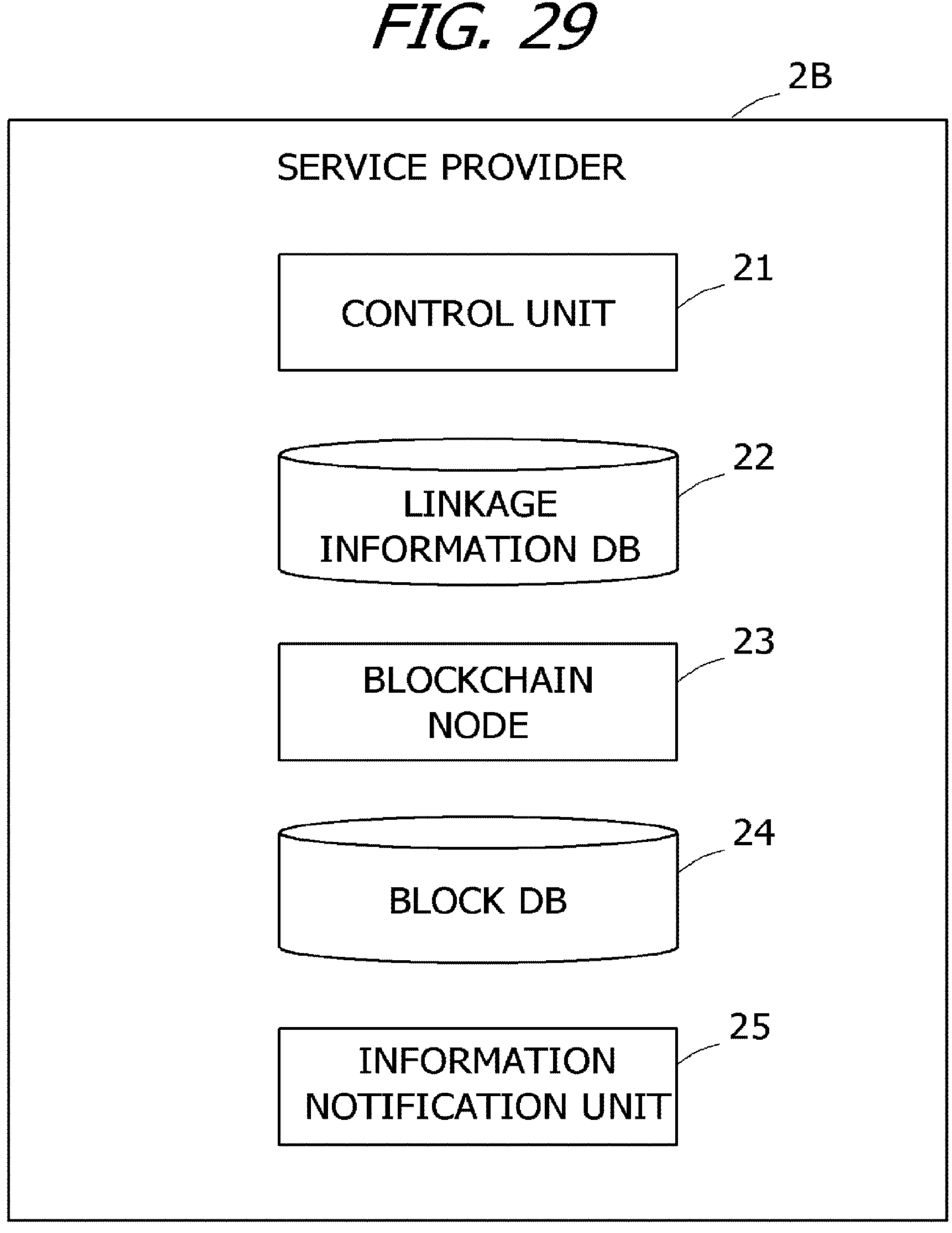
FIG. 29 is a diagram illustrating an example of a functional configuration of the service provider according to the second embodiment.

FIG. 29 is a diagram illustrating an example of a functional configuration of the service provider 2B according to the second embodiment. The service provider 2B includes a control unit 21, a linkage information DB 22, a blockchain node 23, a block DB 24, and an information notification unit 25 as functional configurations. The blockchain node 23 and the block DB 24 are achieved by the CPU of the service provider 2 executing a program for the node of the blockchain. The information notification unit 25 is achieved by executing a program for the platform.

The control unit 21 and the linkage information DB 22 are the similar as those in the first embodiment. However, in the second embodiment, the other party to which the control unit 21 transmits the information notification request and receives the service account information is the information notification unit 25.

For example, when the linkage information is newly registered in the linkage information DB 22 at a predetermined period, the blockchain node 23 creates the difference information of the configuration information of the service account graph from the difference information of the linkage information. The blockchain node 23 creates a block including the difference information of the configuration information of the service account graph, transmits it to each service provider 2B, and shares it. Further, the block chain node 23 stores the created block and the block received from the other service provider 2B in the block DB 24.

The block DB 24 is created in the storage area of the auxiliary storage device of the service provider 2. The block DB 24 holds a block of the blockchain that records the configuration information of the service account graph. For example, in accordance with instructions from the information notification unit 25, the blockchain node 23 arranges blocks held in the block DB 24 in sequence number order, restores the configuration information of the service account graph, and passes it to the information notification unit 25.

When the information notification request is input from the control unit 21, the information notification unit 25 creates a service account graph based on the account of the user of the user terminal 5 at the service provider 2B. At this time, the information notification unit 25 acquires the configuration information of the service account graph restored from the blockchain node 23 and creates the service account graph. Hereinafter, similarly to the information notification unit 12 according to the first embodiment, when it is possible to reach the data holder 4 which is a data request destination from the account of the user of the user terminal 5 at the service provider 2B in the service account graph, the information notification unit 25 notifies the data request information and outputs the data request information to the control unit 21.

Figure 30:
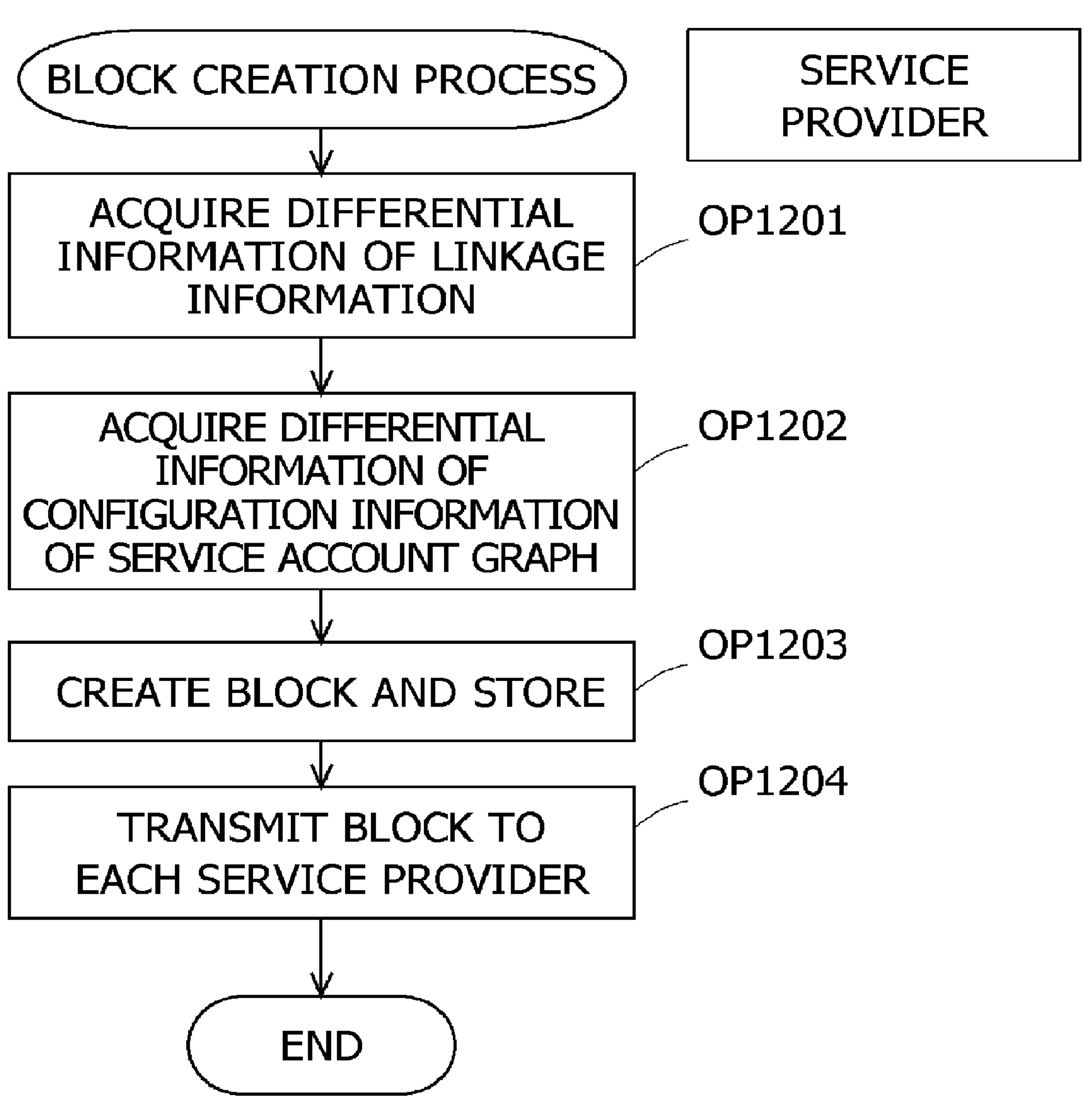
FIG. 30 is a block creation process by a block node of the service provider according to the second embodiment.

FIG. 30 is a block creation process by the block node 23 of the service provider 2B according to the second embodiment. The process illustrated in FIG. 30 is one of the processes executed by the service provider 2B in the (3) service account graph creation process in the second embodiment. The process illustrated in FIG. 30 is executed, for example, at a predetermined period or when the linkage information held in the linkage information DB 22 is updated.

In OP1201, the blockchain node 23 acquires differential information of linkage information from the linkage information DB 22. In OP1202, the blockchain node 23 acquires differential information of the configuration information of the service account graph from the acquired differential information of the linkage information. In OP1203, the blockchain node 23 creates a block including differential information of the configuration information of the service account graph and stores it in the block DB 24. The method of creating a block follows the method of creating a blockchain. In OP 1204, the blockchain node 23 transmits the created block to each service provider 2B (node). Thereafter, the process illustrated in FIG. 30 ends. Although it is described here with a focus on distributed management of the service account graph, in addition to this, processing executed on the blockchain is also executed in parallel in the account linkage system 100B.

Figure 31:
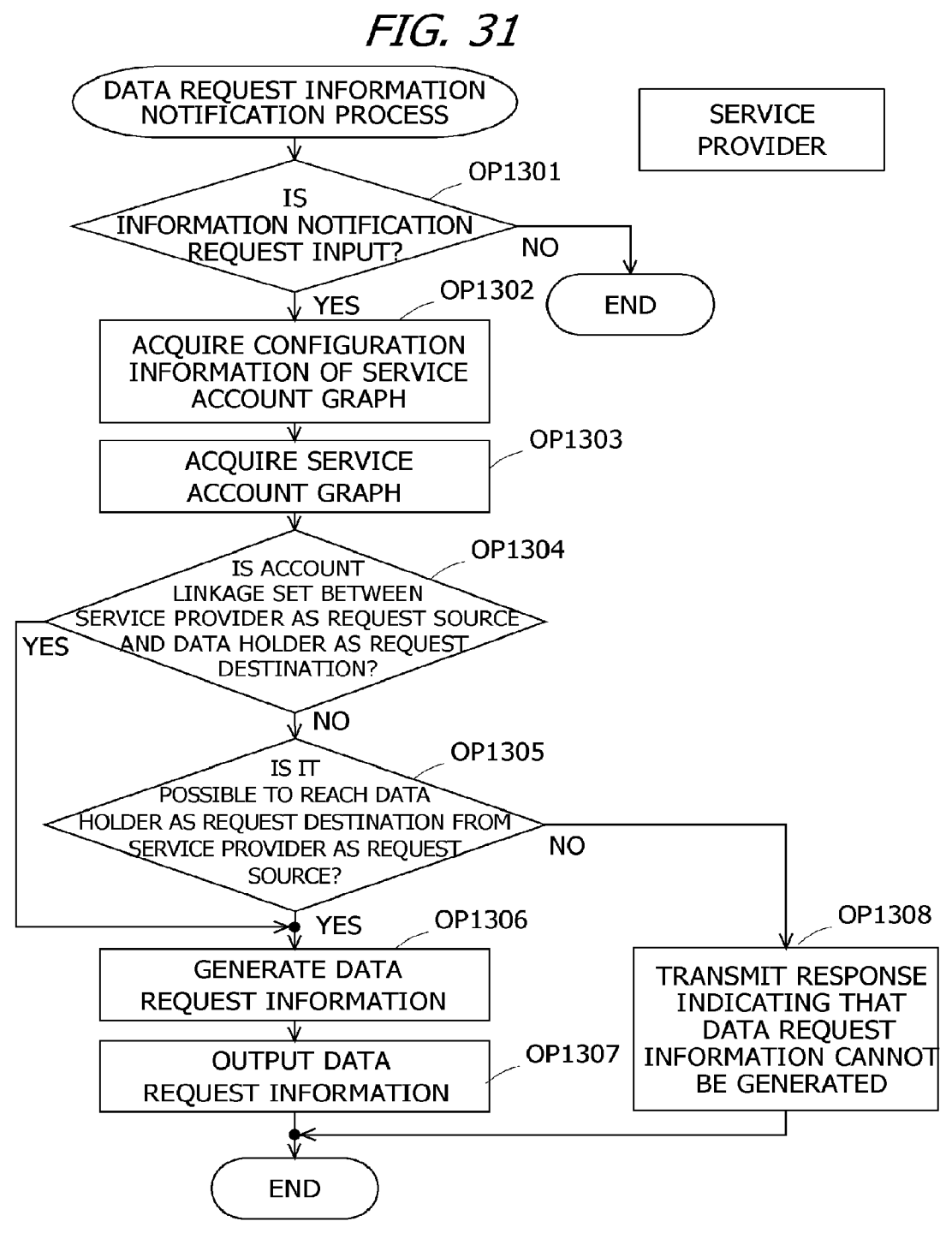

FIG. 31 is an example of a flowchart of the data request information notification process by the information notification unit 25 of the service provider 2B according to the second embodiment. The process illustrated in FIG. 31 is one of the processes executed in the (4) data acquisition process in the second embodiment. The process illustrated in FIG. 31 is repeatedly executed at a predetermined period, for example.

In OP 1301, the information notification unit 25 determines whether or not the information notification request has been input from the control unit 21. Along with the information notification request, the identification information of the data holder 4 which is the data request destination, the identification information of the service provider 2B itself as the data request source, and the account information of the service provider 2B itself as the data request source are also received. If the information notification request is input (OP1301: YES), the process proceeds to OP1302. If the information notification request is not input (OP1301: NO), the process illustrated in FIG. 31 ends.

In OP1302, the information notification unit 25 acquires configuration information of a service account graph from the blockchain node 23. In OP1303, the information notification unit 25 acquires the service account graph of which the base point is the corresponding account at the service provider 2B itself from the configuration information of the service account graph.

In OP1304, the information notification unit 25 refers to the service account graph of which the base point is the account at the service provider 2B itself, which is the data request source, and determines whether account linkage is set between the service provider 2B itself, which is the data request source, and the data holder 4 which is the data request destination. When the account linkage is set between the service provider 2B itself, which is the data request source, and the data holder 4, which is the data request destination (OP1304: YES), the process proceeds to OP1306. When the account linkage is not set between the service provider 2B which is the data request source and the data holder 4 which is the data request destination (OP1304: NO), the process proceeds to OP1305.

In OP1305, the information notification unit 25 refers to the service account graph and determines whether or not it is possible to reach the data holder 4 which is the data request destination from the account at the service provider 2B which is the data request source. When it is possible to reach the data holder 4 which is the data request destination from the service provider 2B itself, which is the data request source, (OP1305: YES), the process proceeds to OP1306. In OP1306, the information notification unit 25 generates data request information. In OP1307, the information notification unit 25 outputs the data request information to the control unit 21. Thereafter, the process illustrated in FIG. 31 is terminated.

If it is not possible to reach the data holder 4 which is the data request destination from the service provider 2B itself, which is the data request source, cannot (OP1305: NO), the process proceeds to OP1308. In the OP1308, the information notification unit 25 outputs a response indicating that the data request information cannot be generated to the control unit 21. Thereafter, the process illustrated in FIG. 31 is terminated.

According to the second embodiment, even in a system in which operates the distributed management of service account graphs by a plurality of devices, account linkage between services can be archived. In the second embodiment, the service provider 2B participates in the blockchain that manages the service account graph. Devices other than the service provider 2B may also participate.

In the second embodiment, each service provider 2B includes a function of the platform 1, and performs creation of a service account graph and notification of data request information, but is not limited thereto. The creation of the service account graph and the generation and notification of the data request information may be performed on different devices. For example, the service provider may manage the service account graph on the blockchain, create the service account graph, and other devices may obtain the service account graph from the service provider to generate data request information. In this case, if the service provider 2 wants to be notified of the data request information, the service provider 2 may solicit a device for generating the data request information by candidacy. When a plurality of devices are candidates, the service provider 2 selects the device with the lowest incentive or the device with the fastest response speed, and transmits an information notification request.

Other Embodiments

The embodiments described above are examples, and the present disclosure may be changed and carried out as appropriate without departing from the gist of the present disclosure.

In the first embodiment, when the service provider 2 receives a request for acquiring linkage information from the platform 1, the service provider 2 transmits the linkage information to the platform 1. Not limited to this, and when a new account linkage is set, the service provider 2 may transmit the linkage information regarding the new account linkage to the platform 1. In this case, the platform 1 may update the configuration information of the service account graph each time the linkage information is received from the service provider 2. As a result, the change in the state of account linkage can be reflected in real time in the service account graph in the platform 1.

In the first embodiment, the apparatus is different from the service provider 2 and the authorization authentication server 3, but is not limited thereto. One device may execute processing of the service provider 2 and the authorization authentication server 3.

In the first embodiment, it is assumed, but not limited to, that the data holder 4 does not implement functions such as an Open ID provider of OpenID Connect 1.0 or an authorization server of OAuth 2.0. The data holder 4 may also have functions such as an Open ID provider of OpenID Connect 1.0 or an authorization server of OAuth 2.0. In that case, in login authentication and the setting of account linkage, the data holder 4 may execute the similar processing as the authorization authentication server 3.

The account linkage system 100 according to the first embodiment and the account linkage system 100B according to the second embodiment may be applied to, for example, a service in which a service provider proposes insurance by acquiring data from, for example, a data holder that holds information on a user's health condition, a data holder that holds information on a financial asset, and a data holder that holds information on a vehicle or the like. Further, for a product produced by combining a plurality of parts produced by a plurality of companies, data is collected from a plurality of data holders who hold information on the parts held by the production company of each part. It is applicable to a service in which the service provider acquires information on the traceability of the product.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A system comprising:

a plurality of service providing servers that are configured to provide services;

a plurality of data holding servers that are configured to hold data; and a processor configured to:

acquire a graph created for a first user, the graph having an account as a node, a first linkage set between accounts at different service providing servers as a first edge, and a second linkage set between an account at a service providing server and an account at a data holding server as a second edge, wherein the graph includes a first account of the first user at a first service providing server, a second account of the first user at a first data holding server, a third account of the first user at a second service providing server, one or more first edges and one second edge, the one or more first edges connecting the first account of the first user at the first service providing server to the third account of the first user at the second service providing server, the one second edge connecting the third account of the first user at the second service providing server to the second account of the first user at the first data holding server;

trace the one or more first edges and the one second edge;

notify, when it is possible to reach the second account of the first user at the first data holding server from the first account of the first user at the first service providing server via the third account of the first user at the second service providing server by tracing the one or more first edges and the one second edge in the graph, the first service providing server of first information enabling the first service providing server to acquire data corresponding to the second account from the first data holding server; and not notify, when it is not possible to reach the second account of the first user at the first data holding server from the first account of the first user at the first service providing server via the third account of the first user at the second service providing server by tracing the one or more first edges and the one second edge in the graph, the first service providing server of the first information.

2. The system according to claim 1, wherein the processor is further configured to notify the first service providing server of the third account of the first user at the second service providing server as the first information, the third account being able to be reached, in the graph for the first user, from the first account of the first user at the first service providing server by tracing the one or more first edges and connected to the second account at the first data holding server by the one second edge, and the first service providing server notifies the first data holding server of the third account at the second service providing server to acquire data corresponding to the second account from the first data holding server.

3. The system according to claim 1, wherein each of the plurality of service providing servers is further configured to hold, for an account of the first user, first linkage information regarding the first linkage with an account at another service providing server, and second linkage information regarding the second linkage with an account at a data holding server, the processor is further configured to acquire the first linkage information and the second linkage information from the plurality of service providing servers to create the graph, the first linkage information includes two pieces of identification information of two service providing servers between which the first linkage for a user is set and two pieces of account information of the user at the two service providing servers, and the second linkage information includes identification information of a service providing server in which the second linkage for a user is set, account information of the user at the service providing server, and identification information of a data holding server in which the second linkage for the user with the service providing server is set.

4. The system according to claim 2, wherein the processor is further configured to:

notify the first information when it is determined that second information indicating that comprehensive consent is obtained from the first user is held in the second service providing server at which the third account of the first user exists, the comprehensive consent indicating that the first user allows another service providing server to acquire, by using the third account, data corresponding to an account of the first user at a data holding server in which the second linkage with the third account is set, and the third account being able to be reached, in the graph for the first user, from the first account of the first user at the first service providing server by tracing the one or more first edges and connected to the second account at the first data holding server by the one second edge; and not notify the first information when it is determined that the second information is not held in the second service providing server.

5. The system according to claim 4, further comprising an authorization server configured to perform authorization corresponding to the second service providing server, wherein the authorization server is configured to issue an access token associated with the second information to a terminal of the first user, the first service providing server is further configured to transmit the access token together with a request for notification of the first information when receiving an access accompanied by the access token from the terminal of the first user, and the processor is further configured to transmit a request for verification of the access token to the authorization server, when the access token is received from the first service providing server together with the request for notification of the first information, and determine whether the second information is held in the second service providing server based on a response from the authorization server to the request for verification.

6. The system according to claim 1, wherein the processor is provided in an information processing apparatus that is independent of the plurality of service providing servers and the plurality of data holding servers.

7. The system according to claim 1, wherein the processor is provided in each of the plurality of service providing servers or in each of a plurality of information processing apparatuses including the plurality of service providing servers and the plurality of data holding servers.

8. The system according to claim 7, wherein each of the plurality of service providing servers and each of the plurality of information processing apparatuses including the processor is configured to acquire the graph from a blockchain, and the plurality of service providing servers are further configured to create a block including information on difference of the graph generated by addition or deletion of the first linkage or the second linkage, and add the block to the blockchain.

9. A method executed by a computer, comprising:

acquiring a graph created for a first user, the graph having, as a node, an account at each of a plurality of service providing servers that are configured to provide services and a plurality of data holding servers that are configured to hold data, a first linkage set between accounts at different service providing servers as a first edge, and a second linkage set between an account at a service providing server and an account at a data holding server as a second edge, wherein the graph includes a first account of the first user at a first service providing server, a second account of the first user at a first data holding server, a third account of the first user at a second service providing server, one or more first edges and one second edge, the one or more first edges connecting the first account of the first user at the first service providing server to the third account of the first user at the second service providing server, the one second edge connecting the third account of the first user at the second service providing server to the second account of the first user at the first data holding server;

tracing the one or more first edges and the one second edge;

notifying, when it is possible to reach the second account of the first user at the first data holding server from the first account of the first user at the first service providing server via the third account of the first user at the second service providing server by tracing the one or more first edges and the one second edge in the graph, the first service providing server of first information enabling the first service providing server to acquire data corresponding to the second account from the first data holding server; and not notifying, when it is not possible to reach the second account of the first user at the first data holding server from the first account of the first user at the first service providing server via the third account of the first user at the second service providing server by tracing the one or more first edges and the one second edge in the graph, the first service providing server of the first information.

10. The method according to claim 9, further comprising:

notifying, via the computer, the first service providing server of the third account of the first user at the second service providing server as the first information, the third account being able to be reached, in the graph for the first user, from the first account of the first user at the first service providing server by tracing the one or more first edges and connected to the second account at the first data holding server by the one second edge; and notifying, via the first service providing server, the first data holding server of the third account at the second service providing server to acquire data corresponding to the second account from the first data holding server.

11. The method according to claim 9, further comprising;

holding, via each of the plurality of service providing servers, for an account of the first user, first linkage information regarding the first linkage with an account at another service providing server, and second linkage information regarding the second linkage with an account at a data holding server; and acquiring, via the computer, the first linkage information and the second linkage information from the plurality of service providing servers to create the graph, wherein the first linkage information includes two pieces of identification information of two service providing servers between which the first linkage for a user is set and two pieces of account information of the user at the two service providing servers, and the second linkage information includes identification information of a service providing server in which the second linkage for a user is set, account information of the user at the service providing server, and identification information of a data holding server in which the second linkage for the user with the service providing server is set.

12. The method according to claim 10, further comprising:

notifying, via the computer, the first information when it is determined that second information indicating that comprehensive consent is obtained from the first user is held in the second service providing server at which the third account of the first user exists, the comprehensive consent indicating that the first user allows another service providing server to acquire, by using the third account, data corresponding to an account of the first user at a data holding server in which the second linkage with the third account is set, and the third account being able to be reached, in the graph for the first user, from the first account of the first user at the first service providing server by tracing the one or more first edges and connected to the second account at the first data holding server by the one second edge; and not notifying, via the computer, the first information when it is determined that the second information is not held in the second service providing server.

13. The method according to claim 12, further comprising;

performing, via an authorization server, authorization corresponding to the second service providing server issues an access token associated with the second information to a terminal of the first user;

transmitting, via the first service providing server, the access token together with a request for notification of the first information when receiving an access accompanied by the access token from the terminal of the first user; and transmitting, via the computer, a request for verification of the access token to the authorization server, when the access token is received from the first service providing server together with the request for notification of the first information, and determining whether the second information is held in the second service providing server based on a response from the authorization server to the request for verification.

14. The method according to claim 9, wherein the computer is provided in an information processing apparatus that is independent of the plurality of service providing servers and the plurality of data holding servers.

15. The method according to claim 9, wherein the computer is provided in each of the plurality of service providing servers or in each of a plurality of information processing apparatuses including the plurality of service providing servers and the plurality of data holding servers.

16. The method according to claim 15, further comprising:

acquiring, via each of the plurality of service providing servers and each of the plurality of information processing apparatuses including the processor, the graph from a blockchain; and creating, via the plurality of service providing servers, a block including information on difference of the graph generated by addition or deletion of the first linkage or the second linkage, and add the block to the blockchain.

17. An information processing apparatus comprising:

a processor configured to:

acquire a graph created for a first user, the graph having, as a node, an account at each of a plurality of service providing servers that are configured to provide services and a plurality of data holding servers that are configured to hold data, a first linkage set between accounts at different service providing servers as a first edge, and a second linkage set between an account at a service providing server and an account at a data holding server as a second edge, wherein the graph includes a first account of the first user at a first service providing server, a second account of the first user at a first data holding server, a third account of the first user at a second service providing server, one or more first edges and one second edge, the one or more first edges connecting the first account of the first user at the first service providing server to the third account of the first user at the second service providing server, the one second edge connecting the third account of the first user at the second service providing server to the second account of the first user at the first data holding server;

trace the one or more first edges and the one second edge;

notify, when it is possible to reach the second account of the first user at the first data holding server from the first account of the first user at the first service providing server via the third account of the first user at the second service providing server by tracing the one or more first edges and the one second edge in the graph, the first service providing server of first information enabling the first service providing server to acquire data corresponding to the second account from the first data holding server; and not notify, when it is not possible to reach the second account of the first user at the first data holding server from the first account of the first user at the first service providing server via the third account of the first user at the second service providing server by tracing the one or more first edges and the one second edge in the graph, the first service providing server of the first information.

18. The information processing apparatus according to claim 17, wherein the processor is further configured to notify the first service providing server of the third account of the first user at the second service providing server as the first information, the third account being able to be reached, in the graph for the first user, from the first account of the first user at the first service providing server by tracing the one or more first edges and connected to the second account at the first data holding server by the one second edge, and the first service providing server is further configured to notify the first data holding server of the third account at the second service providing server to acquire data corresponding to the second account from the first data holding server.

19. The information processing apparatus according to claim 17, wherein each of the plurality of service providing servers is further configured to hold, for an account of the first user, first linkage information related to the first linkage with an account at another service providing server, and second linkage information related to the second linkage with an account at a data holding server, the processor is further configured to acquire the first linkage information and the second linkage information from the plurality of service providing servers to create the graph, the first linkage information includes two pieces of identification information of two service providing servers between which the first linkage for a user is set and two pieces of account information of the user at the two service providing servers, and the second linkage information includes identification information of a service providing server in which the second linkage for a user is set, account information of the user at the service providing server, and identification information of a data holding server in which the second linkage for the user with the service providing server is set.

20. The information processing apparatus according to claim 18, wherein the processor is further configured to:

notify the first information when it is determined that second information indicating that comprehensive consent is obtained from the first user is held in the second service providing server at which the third account of the first user exists, the comprehensive consent indicating that the first user allows another service providing server to acquire, by using the third account, data corresponding to an account of the first user at a data holding server in which the second linkage with the third account, and the third account being able to be reached, in the graph for the first user, from the first account of the first user at the first service providing server by tracing the one or more first edges and connected to the second account at the first data holding server by the one second edge; and not notify the first information when it is determined that the second information is not held in the second service providing server.

* * * * *